US007885996B2

(12) United States Patent  
Mukundan et al.

(10) Patent No.: US 7,885,996 B2
(45) Date of Patent: **\*Feb. 8, 2011**

(54) METHOD, APPARATUS, AND SYSTEM FOR IMPLEMENTING NOTIFICATIONS IN A FRAMEWORK TO SUPPORT WEB-BASED APPLICATIONS

(75) Inventors: Anil Mukundan, San Jose, CA (US); John Coker, Hillsborough, CA (US); Sing Yip, Castro Valley, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1233 days.

This patent is subject to a terminal disclaimer.

(21) Appl. No.: 09/969,798

(22) Filed: Sep. 29, 2001

(65) Prior Publication Data

US 2007/0033597 A1    Feb. 8, 2007

(51) Int. Cl.
    *G06F 15/16* (2006.01)
(52) U.S. Cl. .................. 709/203; 709/213; 709/201; 709/217; 709/223
(58) Field of Classification Search ............. 709/203, 709/213, 201, 217, 223; 719/330; 717/108, 717/157
    See application file for complete search history.

(56) References Cited

U.S. PATENT DOCUMENTS

| | | | |
|---|---|---|---|
| 5,287,507 A | 2/1994 | Hamilton et al. | 395/650 |
| 5,329,619 A | 7/1994 | Pagé et al. | 395/200 |
| 5,511,197 A | 4/1996 | Hill et al. | 395/700 |
| 5,613,124 A | 3/1997 | Atkinson et al. | 395/133 |
| 5,630,066 A | 5/1997 | Gosling | 395/200.09 |
| 5,678,007 A | 10/1997 | Hurvig | 395/200.12 |
| 5,706,502 A | 1/1998 | Foley et al. | 395/610 |
| 5,721,908 A | 2/1998 | Lagarde et al. | 395/610 |
| 5,727,203 A | 3/1998 | Hapner et al. | 395/614 |
| 5,742,768 A | 4/1998 | Gennaro et al. | 295/200.33 |
| 5,745,110 A | 4/1998 | Ertemalp | 345/340 |
| 5,754,173 A | 5/1998 | Hiura et al. | 345/333 |

(Continued)

FOREIGN PATENT DOCUMENTS

WO    WO 99/44123    9/1999

(Continued)

OTHER PUBLICATIONS

Leff et al., "Web-Application Development Using the Model/View/Controller Design Pattern", 2001, publishing by IBM U.J. Watson Research Center.*

(Continued)

*Primary Examiner*—Thu Nguyen
*Assistant Examiner*—Lan-Dai T Truong
(74) *Attorney, Agent, or Firm*—Campbell Stephenson LLP

(57) ABSTRACT

According to one aspect of the present invention, a system is provided for implementing notifications in a framework to support web-based applications. The system comprising a set of server-side objects managed by an object manager (OM). The system further comprises a set of browser-side objects running on a browser. The system also comprises a remote procedure call (RPC) mechanism to enable re-targeting of methods from browser-side objects to server-side objects. The system additionally comprises a data transmission mechanism to facilitate transmission of notifications from server-side objects to browser-side objects.

23 Claims, 41 Drawing Sheets

U.S. PATENT DOCUMENTS

| | | | |
|---|---|---|---|
| 5,778,228 A | 7/1998 | Wei | 395/684 |
| 5,799,156 A | 8/1998 | Hogan et al. | 395/200.67 |
| 5,801,701 A | 9/1998 | Koppolu et al. | 345/352 |
| 5,818,447 A | 10/1998 | Wolf et al. | 345/335 |
| 5,870,759 A | 2/1999 | Bauer | 1/1 |
| 5,890,137 A | 3/1999 | Koreeda | 705/26 |
| 5,905,862 A | 5/1999 | Hoekstra | 709/202 |
| 5,920,725 A * | 7/1999 | Ma et al. | 717/171 |
| 5,926,636 A | 7/1999 | Lam et al. | 395/683 |
| 5,935,211 A * | 8/1999 | Osterman | 709/228 |
| 5,956,509 A | 9/1999 | Kevner | 395/684 |
| 5,963,915 A | 10/1999 | Kirsch | 705/26 |
| 5,963,952 A | 10/1999 | Smith | 707/102 |
| 5,970,248 A | 10/1999 | Meier | 395/704 |
| 5,974,430 A | 10/1999 | Mutschler, III et al. | 707/505 |
| 5,978,842 A | 11/1999 | Noble et al. | 709/218 |
| 5,983,227 A | 11/1999 | Nazem et al. | 707/10 |
| 5,995,756 A | 11/1999 | Herrmann | 395/712 |
| 5,999,972 A | 12/1999 | Gish | 709/219 |
| 6,002,852 A | 12/1999 | Birdwell et al. | 395/200.33 |
| 6,006,278 A | 12/1999 | Cottrill | 709/300 |
| 6,018,343 A | 1/2000 | Wang et al. | 345/356 |
| 6,029,175 A * | 2/2000 | Chow et al. | 707/104.1 |
| 6,031,904 A | 2/2000 | An et al. | 379/201 |
| 6,058,401 A * | 5/2000 | Stamos et al. | 707/201 |
| 6,061,695 A | 5/2000 | Slivka et al. | 707/513 |
| 6,064,406 A | 5/2000 | Atkinson et al. | 345/515 |
| 6,065,041 A | 5/2000 | Lum et al. | 709/203 |
| 6,065,054 A | 5/2000 | Dutcher et al. | 709/226 |
| 6,073,163 A | 6/2000 | Clark et al. | 709/203 |
| 6,076,070 A | 6/2000 | Stack | 705/20 |
| 6,098,108 A | 8/2000 | Sridhar et al. | 709/239 |
| 6,105,059 A | 8/2000 | Al-Karmi et al. | 709/219 |
| 6,108,330 A | 8/2000 | Bhatia et al. | 370/352 |
| 6,122,403 A | 9/2000 | Rhoads | 382/233 |
| 6,126,328 A | 10/2000 | Mallory et al. | 717/114 |
| 6,144,991 A | 11/2000 | England | 709/205 |
| 6,175,877 B1 | 1/2001 | Zerber | 709/310 |
| 6,182,127 B1 | 1/2001 | Cronin, III et al. | 709/219 |
| 6,205,482 B1 | 3/2001 | Navarre et al. | 709/227 |
| 6,230,160 B1 | 5/2001 | Chan et al. | 707/103 |
| 6,237,024 B1 | 5/2001 | Wollrath et al. | 709/203 |
| 6,237,092 B1 | 5/2001 | Hayes, Jr. | 713/100 |
| 6,249,773 B1 | 6/2001 | Allard et al. | 705/26 |
| 6,297,819 B1 | 10/2001 | Furst | 715/733 |
| 6,298,391 B1 | 10/2001 | Kennedy et al. | 709/328 |
| 6,317,143 B1 | 11/2001 | Wugofski | 345/765 |
| 6,321,274 B1 * | 11/2001 | Shakib et al. | 719/330 |
| 6,324,568 B1 | 11/2001 | Diec | 709/203 |
| 6,330,566 B1 | 12/2001 | Durham | 1/1 |
| 6,336,135 B1 | 1/2002 | Niblett et al. | 709/215 |
| 6,336,137 B1 | 1/2002 | Lee et al. | 709/219 |
| 6,339,826 B2 | 1/2002 | Hayes, Jr. et al. | 713/166 |
| 6,363,398 B1 | 3/2002 | Andersen | 1/1 |
| 6,366,958 B1 | 4/2002 | Ainsworth et al. | 709/230 |
| 6,385,642 B1 | 5/2002 | Chlan et al. | 709/203 |
| 6,389,028 B1 | 5/2002 | Bondarenko et al. | 370/401 |
| 6,401,134 B1 | 6/2002 | Razavi et al. | 709/310 |
| 6,404,441 B1 | 6/2002 | Chailleux | 345/704 |
| 6,418,471 B1 | 7/2002 | Shelton et al. | 709/227 |
| 6,421,673 B1 | 7/2002 | Caldwell et al. | 707/10 |
| 6,433,795 B1 | 8/2002 | MacNaughton et al. | 715/738 |
| 6,442,564 B1 | 8/2002 | Frey et al. | 707/103 R |
| 6,446,135 B1 | 9/2002 | Koppolu et al. | 709/313 |
| 6,446,137 B1 | 9/2002 | Vasudevan et al. | 709/330 |
| 6,460,084 B1 | 10/2002 | Van Horne et al. | 709/227 |
| 6,487,457 B1 | 11/2002 | Hull et al. | 700/17 |
| 6,490,547 B1 | 12/2002 | Atkin et al. | 704/8 |
| 6,490,601 B1 | 12/2002 | Markus et al. | 715/207 |
| 6,523,027 B1 | 2/2003 | Underwood | 1/1 |
| 6,526,513 B1 | 2/2003 | Shrader et al. | 713/200 |
| 6,529,940 B1 | 3/2003 | Humble | 709/204 |
| 6,553,563 B2 | 4/2003 | Ambrose et al. | 717/116 |
| 6,563,522 B1 | 5/2003 | Rosen et al. | 345/854 |
| 6,567,798 B1 * | 5/2003 | Hollberg et al. | 707/2 |
| 6,574,617 B1 | 6/2003 | Immerman et al. | 707/1 |
| 6,574,635 B2 | 6/2003 | Stauber et al. | 707/103 R |
| 6,574,661 B1 | 6/2003 | Delano et al. | 709/223 |
| 6,589,290 B1 | 7/2003 | Maxwell et al. | 715/507 |
| 6,591,272 B1 | 7/2003 | Williams | 1/1 |
| 6,594,664 B1 | 7/2003 | Estrada et al. | 1/1 |
| 6,598,056 B1 | 7/2003 | Hull et al. | 707/104.1 |
| 6,598,094 B1 * | 7/2003 | Wollrath et al. | 719/330 |
| 6,604,128 B2 | 8/2003 | Diec | 709/203 |
| 6,629,098 B2 | 9/2003 | McGeorge, Jr. | 1/1 |
| 6,629,135 B1 | 9/2003 | Ross, Jr. et al. | 709/218 |
| 6,631,402 B1 * | 10/2003 | Devine et al. | 709/217 |
| 6,631,405 B1 | 10/2003 | Kobata | 709/219 |
| 6,633,919 B1 | 10/2003 | Marcotte | 709/237 |
| 6,636,863 B1 | 10/2003 | Friesen | 1/1 |
| 6,662,340 B2 | 12/2003 | Rawat et al. | 715/236 |
| 6,678,691 B1 * | 1/2004 | Kikkers | 707/102 |
| 6,678,726 B1 | 1/2004 | Moshaiov | 709/221 |
| 6,687,816 B1 | 2/2004 | Frayman et al. | 713/1 |
| 6,704,906 B1 | 3/2004 | Yankovich et al. | 715/222 |
| 6,718,364 B2 | 4/2004 | Connelly et al. | 709/203 |
| 6,728,788 B1 | 4/2004 | Ainsworth et al. | 709/330 |
| 6,745,368 B1 | 6/2004 | Boucher et al. | 715/500.1 |
| 6,745,382 B1 | 6/2004 | Zothner | 717/107 |
| 6,751,657 B1 | 6/2004 | Zothner | 709/220 |
| 6,769,022 B1 * | 7/2004 | DeKoning et al. | 709/223 |
| 6,772,169 B2 | 8/2004 | Kaplan | 1/1 |
| 6,775,658 B1 | 8/2004 | Zothner | 706/47 |
| 6,789,126 B1 | 9/2004 | Saulpaugh et al. | 709/245 |
| 6,807,564 B1 | 10/2004 | Zellner et al. | 709/206 |
| 6,832,239 B1 | 12/2004 | Kraft et al. | 709/203 |
| 6,857,124 B1 | 2/2005 | Doyle | 719/316 |
| 6,874,142 B1 | 3/2005 | Ogura | 717/170 |
| 6,901,595 B2 | 5/2005 | Mukundan et al. | 719/316 |
| 6,901,596 B1 | 5/2005 | Galloway | 719/330 |
| 6,907,451 B1 | 6/2005 | Mukundan et al. | 709/204 |
| 6,910,066 B1 | 6/2005 | Pohl | 709/203 |
| 6,944,660 B2 | 9/2005 | Eshghi et al. | 709/224 |
| 6,944,669 B1 | 9/2005 | Saccocio | 709/229 |
| 6,950,980 B1 | 9/2005 | Malcolm | 715/207 |
| 7,035,864 B1 | 4/2006 | Ferrari et al. | 1/1 |
| 7,079,649 B1 | 7/2006 | Bramhill et al. | 380/21 |
| 7,080,321 B2 | 7/2006 | Aleksander et al. | 715/708 |
| 7,107,268 B1 | 9/2006 | Zawadzki et al. | 1/1 |
| 7,131,122 B1 | 10/2006 | Lakhdhir | 717/168 |
| 7,146,617 B2 | 12/2006 | Mukundan et al. | 719/330 |
| 7,164,422 B1 * | 1/2007 | Wholey et al. | 345/440.1 |
| 7,171,455 B1 * | 1/2007 | Gupta et al. | 709/219 |
| 7,181,438 B1 | 2/2007 | Szabo | 707/2 |
| 7,203,948 B2 | 4/2007 | Mukundan et al. | 710/330 |
| 7,206,998 B2 | 4/2007 | Pennell et al. | 715/224 |
| 7,346,649 B1 | 3/2008 | Wong | 709/203 |
| 7,454,759 B2 | 11/2008 | Mukundan et al. | 719/316 |
| 7,461,119 B2 | 12/2008 | Mukundan et al. | 709/203 |
| 2001/0011341 A1 | 8/2001 | Hayes Jr., et al. | 712/11 |
| 2001/0016882 A1 * | 8/2001 | Kim et al. | 709/330 |
| 2001/0035972 A1 | 11/2001 | Wurmfeld | 358/1.13 |
| 2001/0042058 A1 * | 11/2001 | Harrington et al. | 707/1 |
| 2001/0047308 A1 | 11/2001 | Kaminsky et al. | 705/26 |
| 2001/0049682 A1 * | 12/2001 | Vincent et al. | 707/100 |
| 2001/0049713 A1 * | 12/2001 | Arnold et al. | 709/105 |
| 2001/0055017 A1 | 12/2001 | Ording | 145/440 |
| 2001/0056475 A1 * | 12/2001 | Anderson et al. | 709/217 |
| 2002/0002603 A1 * | 1/2002 | Vange | 709/219 |
| 2002/0016814 A1 | 2/2002 | Convent et al. | 709/203 |
| 2002/0026491 A1 | 2/2002 | Mason et al. | 709/207 |
| 2002/0029183 A1 * | 3/2002 | Vlahoplus et al. | 705/37 |
| 2002/0029376 A1 | 3/2002 | Ambrose et al. | 717/113 |
| 2002/0032718 A1 * | 3/2002 | Yates et al. | 709/107 |

| | | | | |
|---|---|---|---|---|
| 2002/0038388 | A1 | 3/2002 | Netter | 709/318 |
| 2002/0042843 | A1 | 4/2002 | Diec | 709/246 |
| 2002/0052952 | A1 | 5/2002 | Yoshida et al. | 709/225 |
| 2002/0053012 | A1* | 5/2002 | Sugimoto et al. | 712/1 |
| 2002/0056087 | A1* | 5/2002 | Berezowski et al. | 725/9 |
| 2002/0065879 | A1 | 5/2002 | Ambrose et al. | 709/203 |
| 2002/0065912 | A1 | 5/2002 | Catchpole et al. | 709/224 |
| 2002/0065926 | A1* | 5/2002 | Hackney et al. | 709/231 |
| 2002/0065947 | A1 | 5/2002 | Wishoff et al. | 709/317 |
| 2002/0069204 | A1 | 6/2002 | Kahn et al. | 707/10 |
| 2002/0082857 | A1 | 6/2002 | Skordin et al. | 705/1.1 |
| 2002/0087583 | A1 | 7/2002 | Morgan et al. | 707/200 |
| 2002/0087657 | A1* | 7/2002 | Hunt | 709/217 |
| 2002/0099727 | A1* | 7/2002 | Kadyk et al. | 707/201 |
| 2002/0099739 | A1 | 7/2002 | Fischer | 707/515 |
| 2002/0103819 | A1 | 8/2002 | Duvillier et al. | 1/1 |
| 2002/0107755 | A1 | 8/2002 | Steed et al. | 705/26 |
| 2002/0109718 | A1 | 8/2002 | Mansour et al. | 715/744 |
| 2002/0112056 | A1 | 8/2002 | Baldwin et al. | 709/225 |
| 2002/0116418 | A1 | 8/2002 | Lachhwani et al. | 707/517 |
| 2002/0129129 | A1 | 9/2002 | Bloch et al. | 709/220 |
| 2002/0133400 | A1 | 9/2002 | Terry et al. | 705/14.17 |
| 2002/0161826 | A1* | 10/2002 | Arteaga et al. | 709/203 |
| 2002/0178187 | A1 | 11/2002 | Rasmussen et al. | 715/234 |
| 2002/0198935 | A1 | 12/2002 | Crandall et al. | 709/203 |
| 2003/0009476 | A1* | 1/2003 | Fomenko et al. | 707/103 R |
| 2003/0018705 | A1 | 1/2003 | Chen et al. | 709/202 |
| 2003/0020744 | A1* | 1/2003 | Ellis et al. | 345/723 |
| 2003/0056030 | A1 | 3/2003 | Gao et al. | 709/330 |
| 2003/0061279 | A1 | 3/2003 | Llewellyn et al. | 709/203 |
| 2003/0061286 | A1 | 3/2003 | Lin | 709/205 |
| 2003/0070000 | A1 | 4/2003 | Coker et al. | 719/318 |
| 2003/0126195 | A1 | 7/2003 | Reynolds et al. | 709/203 |
| 2003/0188262 | A1 | 10/2003 | Maxwell et al. | 715/507 |
| 2003/0208595 | A1 | 11/2003 | Gouge et al. | 709/225 |
| 2004/0031058 | A1 | 2/2004 | Reisman | 725/112 |
| 2004/0039993 | A1 | 2/2004 | Kougiouris et al. | 715/237 |
| 2004/0199575 | A1 | 10/2004 | Geller | 709/201 |
| 2005/0060280 | A1 | 3/2005 | Wolfston | 1/1 |
| 2005/0131925 | A1 | 6/2005 | Coker et al. | 1/1 |
| 2005/0273792 | A1 | 12/2005 | Inohara et al. | 719/330 |
| 2006/0075020 | A1 | 4/2006 | Seliger | 709/203 |
| 2006/0242583 | A1 | 10/2006 | MacNaughton et al. | 715/733 |
| 2008/0082603 | A1 | 4/2008 | Mansour et al. | 709/203 |
| 2009/0089398 | A1 | 4/2009 | Lambert | 709/217 |

FOREIGN PATENT DOCUMENTS

| | | |
|---|---|---|
| WO | WO 00/33217 | 6/2000 |
| WO | WO 00/52603 | 9/2000 |
| WO | WO 01/16856 | 3/2001 |
| WO | WO 01/18691 | 3/2001 |
| WO | WO 02/29969 | 4/2002 |

OTHER PUBLICATIONS

S. Floyd, RFC 2914, "Congestion Control Principles," Sep. 2000, available on the Internet at http://www.rfc-editor.org, pp. 1-15.

Richard Mortier et al., "Implicit Admission Control," IEEE Journal on Selected Areas in Communications, IEEE Press., vol. 18, Issue 12, Dec. 2000, pp. 2629-2639.

Frank Mueller, "Fault Tolerance for Token-based Synchronization Protocols," Proceedings on Parallel and Distributed Processing Symposium, IEEE Press., Apr. 2001, pp. 1257-1264.

Kraig Brockschmidt, "Inside OLE," 1995 Microsoft Press, pp. 187-188, paragraph 2.

Erich Gamma et al., "Design Patterns: Elements of Reusable Object-Oriented Software," 1995 Addison-Wesley, U.S.A., pp. 293-294.

Avraham Leff et al., "Web-Application Development Using the Model/View/Controller Design Pattern," Enterprise Distributed Object Computing Conference, 2001 Proceedings, 5th IEEE International, Sep. 4-7, 2001, pp. 118-127.

Using Layout Managers, available on the Internet at http://www.iam.ubc.ca/guides/javatut99/uiswing/layout/using.html, no date, printed on May 1, 2005, pp. 1-5.

Applet Caching in Java Plug-in, available via the Internet at http://www.java.sun.com/j2se/1.3/docs/guide/misc/appletcaching.html, no date, printed on May 1, 2005, pp. 1-3.

Applet Power!, available via the Internet at http//www.java.sun.com/features/1997/oct/applets.html, 1997, pp. 1-5.

Williams, Mickey and Bennett, David, Visual C++ 6 Unleashed, Sams Publishing, 2000, pp. 1-46.

Steflik, Richard and Sriharan, Prashant, "Advanced JAVA Networking, Chapter 5," Prentice-Hall, Inc., 2000, pp. 1-37.

Thomason, Larisa, "JavaScript Tip: Select and Go Menus in JavaScript," *Webmaster Tips*, vol. 3, No. 12, Sep. 2000, http://netmechanic.com/news/vol3/javascript_no12.htm, 3 pp.

PCT Search Report, International Application No. PCT/US02/30623, Filing date Sep. 27, 2002, mailed Jan. 2, 2003 (5 pp.).

PCT Search Report, International Application No. PCT/US02/31098, Filing date Sep. 27, 2002, mailed Apr. 8, 2003 (4 pp.).

McPherson, Scott, "RMI," Oct. 1999, Sun Microsystems, Inc., accessed May 10, 2007 via the Internet http://java.sun.com/developer/technical/Articles/RMI/rmi, 14 pp.

Orfaili, Robert and Harkey, Dan, "Client/Server Programming with JAVA and CORBA, Second Edition," John Wiley & Sons, Inc., pp. 3-32, 1998.

Gergeleit, Martin, "JRPC: Connecting Java Applications with Legacy ONC RPC Servers," Java-Informations-Tage, pp. 149-160, 1999.

Clinick, Andrew, "Remote Scripting," Microsoft Corp., Published in MSDN, Apr. 12, 1999.

Thistlewaite, Paul; Active FORMS; Fifth Int'l World Wide Web Conference; May 6-10, 1996; Paris, France.

John Ratcliff and Mathew Dwyer; Using The Bandera Tool Set to Model-Check Properties of Concurrent Java Software. Pub. CONCUR 2001, LNCS 2154, pp. 39-58, 2001. (cited Oct. 3, 2007).

* cited by examiner

Toolbar

Application Level Menus

Applet Menu Button

| TARGET 3110 | MENU TEXT 3120 | METHOD 3130 | BUSINESS SERVICE 3140 | SUPPRESS MENU ITEM 3150 | POSITION 3160 |

CLASS METHOD MENU ITEM

START → DEFINE A CLASS METHOD MENU ITEM OBJECT 3010 → SPECIFY CLASS METHOD MENU ITEM OBJECT PROPERTIES 3020 → END

METHOD, APPARATUS, AND SYSTEM FOR IMPLEMENTING NOTIFICATIONS IN A FRAMEWORK TO SUPPORT WEB-BASED APPLICATIONS

FIELD OF THE INVENTION

The present invention relates generally to the field of data processing. More specifically, the present invention relates to a method, apparatus, and system for implementing notifications in a framework to support web-based applications.

BACKGROUND OF THE INVENTION

As technology continues to advance and the business environments have become increasingly complex and diverse, more and more companies have relied on various customer relationship management (CRM) software and eBusiness applications to conduct and manage various aspects of their enterprise business. In general, eBusiness applications are designed to enable a company or enterprise to conduct its business over an interactive network (e.g., Internet, Intranet, Extranet, etc.) with its customers, partners, suppliers, distributors, employees, etc. eBusiness applications may include core business processes, supply chain, back-office operations, and CRM functions. CRM generally includes various aspects of interaction a company has with its customers, relating to sales and/or services. At a high level, customer relationship management is focused on understanding the customer's needs and leveraging this knowledge to increase sales and improve service. CRM application and software is generally designed to provide effective and efficient interactions between sales and service, and unify a company's activities around the customer in order to increase customer share and customer retention through customer satisfaction.

Typically, CRM implementation strategy needs to consider the following:

Knowledge Management: one of the important factors of an effective CRM implementation is the acquisition of information about a customer, its analysis, sharing and tracking. Also integral to the use of knowledge for competitive advantage is for employees to know what actions to take as a result of this knowledge.

Database Consolidation: another important aspect of an effective and efficient CRM solution is the consolidation of customer information in a single database and the re-engineering of business processes around the customer. The goal here is to have all interactions with a customer recorded in one place to drive production, marketing, sales and customer support activities.

Integration of Channels and Systems: it is very important for a CRM application/software to provide the capability to respond to customers in a consistent and high-quality manner through their channel of choice, whether that is the e-mail, the phone, web-based user interfaces, etc. This may require the seamless integration of various communication channels with the customer or enterprise database. It also may require the integration of CRM with other parts of a company's business systems and applications.

Technology and Infrastructure: to enhance customer services, a CRM application/software may include various tools to automate and streamline online customer service. For example, a self-help model typically can be implemented using a combination of tools (e.g. knowledge bases with an intuitive search capability, agent technology or automated email, etc.).

Generally, eBusiness applications are designed to allow organizations to create a single source of customer information that makes it easier to sell to, market to, and service customers across multiple channels, including the Web, call centers, field, resellers, retail, and dealer networks. Advanced eBusiness applications are typically built on a component-based architecture and are designed to be Web-based and to deliver support for various types of clients on multiple computing platforms including mobile clients, connected clients, thin clients, and handheld clients, etc.

With the recent proliferation of the Web, it is desirable to provide the functionalities of the eBusiness applications in a Web-based environment. Furthermore, it is desirable for the eBusiness applications operating in a Web-based environment to retain the look-and-feel of desktop-based eBusiness applications with which the users are already familiar.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be understood and practiced without these specific details.

I. System Overview and Overall Architecture

Figure 1:
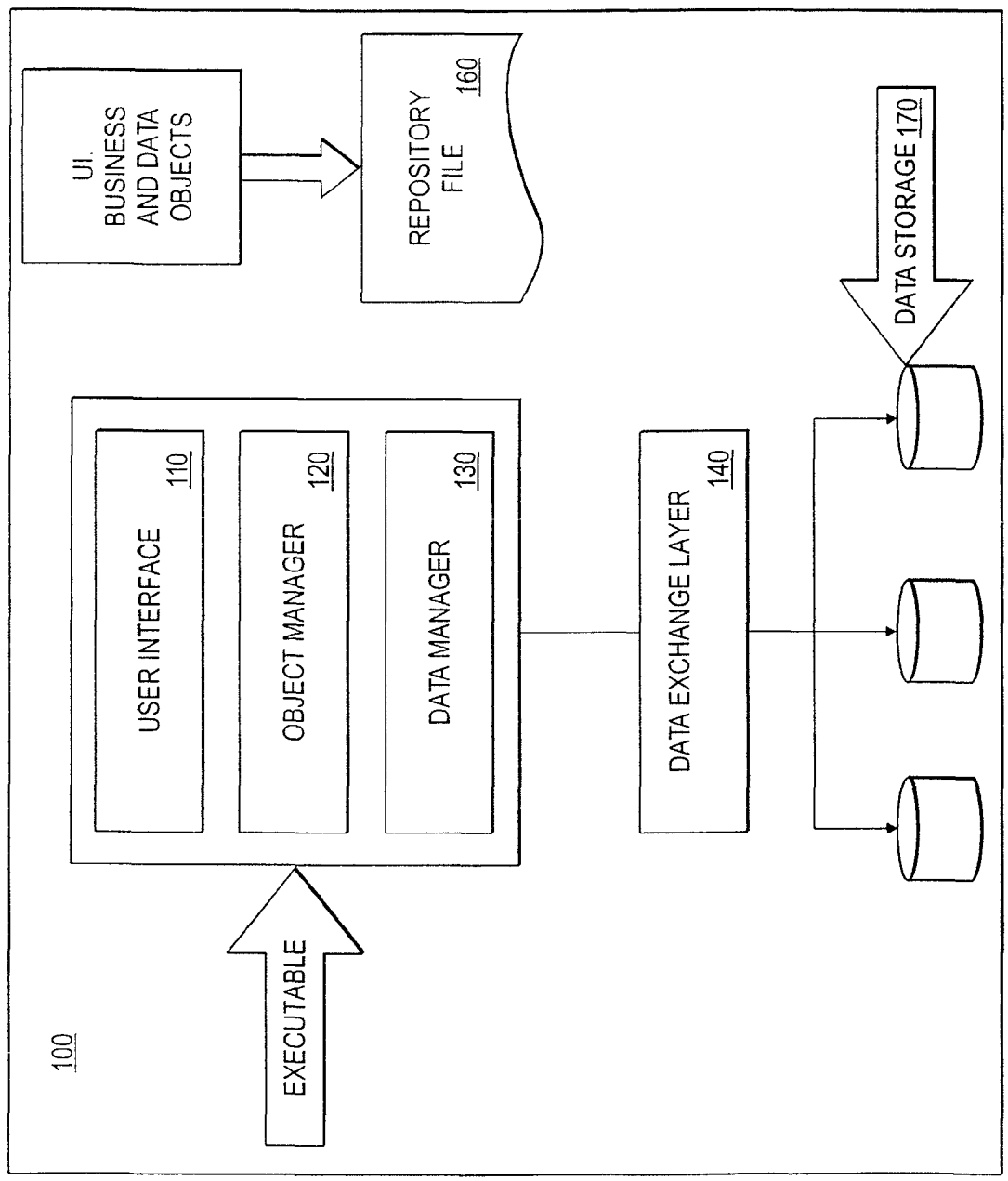
FIG. 1 shows a multi-layered system architecture in which the teachings of the present invention are implemented.

In one embodiment, a system in which the teachings of the present invention are implemented can be logically structured as a multi-layered architecture as shown in FIG. 1. In one embodiment, the logical multi-layered architecture as shown in FIG. 1 provides a platform for common services to support the various applications. These services may include a user interface layer 110, an object manager layer 120, a data manager layer 130, and a data exchange layer 140.

In one embodiment, the user Interface layer 110 may provide the applets, views, charts and reports, etc. associated with one or more applications. In one embodiment, various types of clients can be supported via the user interface layer 110. These various types of clients may include traditional connected clients, remote clients, thin clients over an intranet, Java thin clients or non-Windows-based operating systems, and HTML clients over the Internet, etc.

In one embodiment, the object manager layer 120 is designed to manage one or more sets of business rules or business concepts associated with one or more applications and to provide the interface between the user interface layer 110 and the data manager layer 130. In one embodiment, the business rules or concepts can be represented as business objects. In one embodiment, the business objects may be designed as configurable software representations of the various business rules or concepts such as accounts, contacts, opportunities, service requests, solutions, etc.

In one embodiment, the data manager layer 130 is designed to maintain logical views of the underlying data and to allow the object manager to function independently of underlying data structures or tables in which data are stored. In one embodiment, the data manager 130 may also provide certain database query functions such as generation of structure query language (SQL) in real time to access the data. In one embodiment, the data manager 130 is designed to operate on object definitions in a repository file 160 that define the database schema. In one embodiment, the data storage services 170 provide the data storage for the data model associated with one or more applications.

In one embodiment, the data exchange layer is designed to handle the interactions with one or more specific target databases and provide the interface between the data manager layer 130 and the underlying data sources.

Figure 2:
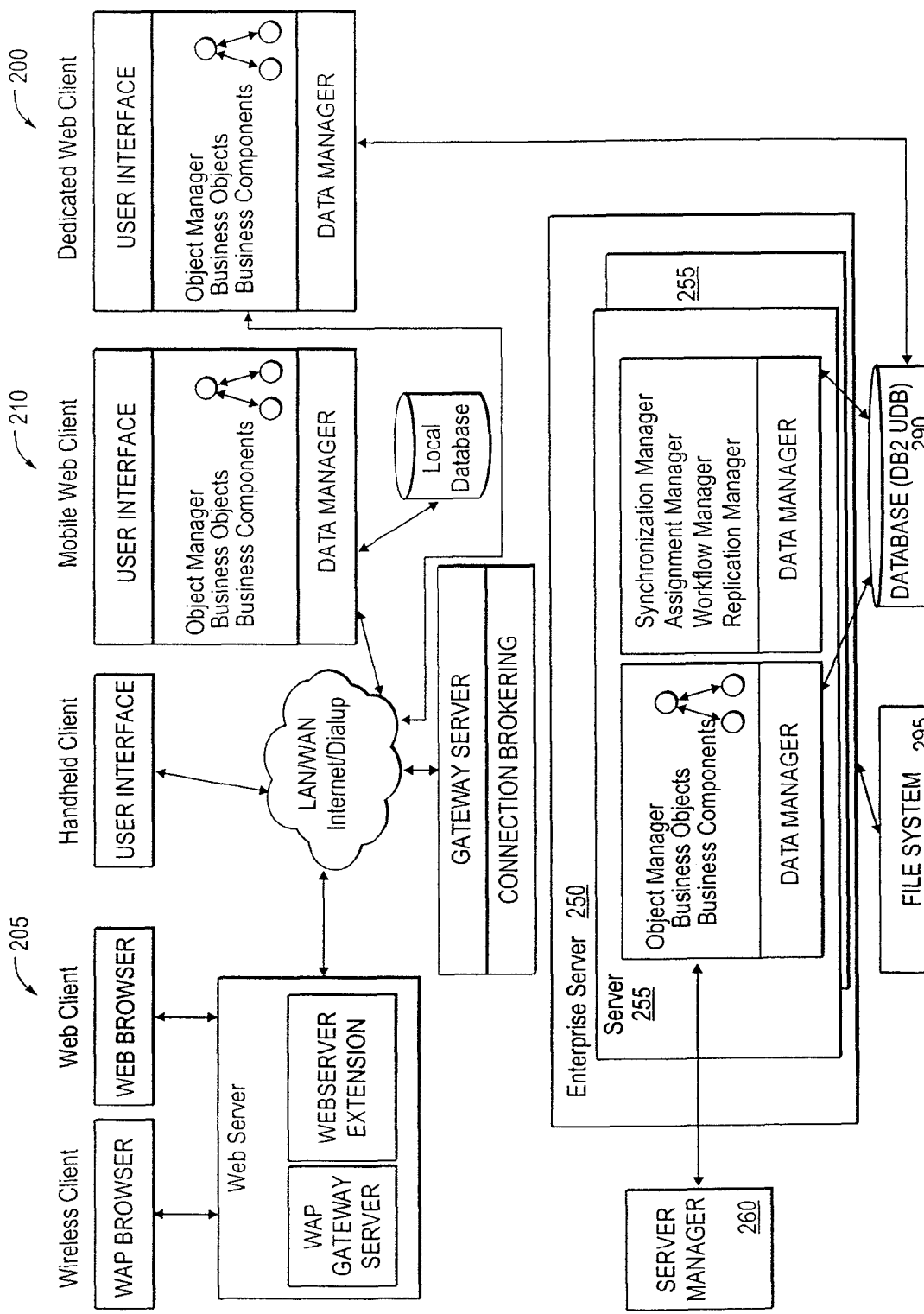
FIG. 2 shows a block diagram of one embodiment of a system configuration in which the teachings of the present invention are implemented.

FIG. 2 shows a block diagram of one embodiment of a system configuration in which the teachings of the present invention are implemented.

In one embodiment, the multi-layered architecture allows one or more software layers to reside on different machines. For example, in one embodiment, the user interface, the object manager, and the data manager can all reside on the dedicated web clients. For other types of clients such as the wireless clients, in one embodiment, the object manager and data manager can reside on a system server. It should be appreciated and understood by one skilled in the art that the system configuration shown in FIG. 2 is for illustrative and explanative purposes and may vary depending upon the particular implementations and applications of the teachings of the present invention.

In one embodiment, the system environment illustrated in FIG. 2 may include more than one database 290. One or more subsets of the database 290 can be created or replicated by a replication manager. In addition, mobile web clients can have additional remote databases (also called local databases). In one embodiment, unless the remote or local databases associated with the mobile web clients are defined as read-only databases, these mobile web clients can create and update data locally that will be ultimately propagated up to the primary database when each mobile web client synchronizes with the system server.

In one embodiment, the database 290 is designed to store various types of data including predefined data schema (e.g., table objects, index objects, etc.), repository objects (e.g., business objects and components, view definitions and visibility rules, etc.), and user's or customer's data. In one embodiment, dedicated web clients and server components, including those that operate in conjunction with the other types of clients, can connect directly to the database 290 and make changes in real time. In one embodiment, mobile web clients can download a subset of the server's data to use locally, and periodically synchronize with the server database through the system server to update both the local and the server database.

In one embodiment, various tables included in the database 290 may be logically organized into the following types: data tables, interface tables, and repository tables, etc.

In one embodiment, data tables may be used to store user business data, administrative data, seed data, and transaction data, etc. In one embodiment, these data tables may be populated and updated through the various applications and processes. In one embodiment, data tables may include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:
The client application configuration
The mapping used for importing and exporting data
Rules for transferring data to mobile clients In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated web clients can read and write files directly to and from the file system 295. In one embodiment, mobile web clients can have a local file system, which they synchronize with the server-based file system 290 periodically. In one embodiment, other types of client such as the wireless clients and the web clients can access the file system 290 via the system server.

In one embodiment, the enterprise server 250 is a logical grouping of the system servers 255 that share a common table owner or a database, point to a common gateway Server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing function such as directing client connection requests to an appropriate server (e.g., the least-busy server).

In one embodiment, as illustrated in FIG. 2, the various types of clients that can be supported by the system may include the following clients: dedicated web clients, mobile web clients, web clients, wireless clients, and handheld clients, etc.

In one embodiment, dedicated web clients (also called connected clients) are connected directly to a database server for data access via a LAN or WAN connection. In one embodiment, these connected or dedicated web clients do not store data locally. These dedicated web clients can also access the file system directly. In one embodiment, the user interface, the object manager, and the data manager layers of the multi-layered architecture reside on the dedicated web client.

In one embodiment, the mobile web clients are designed and configured for local data access and thus can have their own local database and/or local file system. In one embodiment, mobile web clients can interact with other components within the system via the gateway server. Through synchronization, the modifications from the local database and the server database can be exchanged. Mobile web clients are described in more detail below.

In one embodiment, a web client runs in a standard browser format from the client's machine. In one embodiment, the web client can connect to a system server 255 through a web server. In one embodiment, the system server 255 is designed and configured to execute business logic and access data from the database 290 and file system 295. In one embodiment, the web client described herein is designed and configured in accordance with the teachings of the present invention to operate in an interactive mode. In one embodiment, the interactive web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc. The web client is described in more details below.

In one embodiment, wireless clients are essentially thin clients enabled on wireless devices. The wireless clients can use a wireless application protocol (WAP)-based user interface to communicate and exchange information/data with the system server.

The system configuration illustrated in FIG. 2 is described in more details below with references to various structures, databases, tables, file systems, etc. as illustrating examples.

Figure 3:
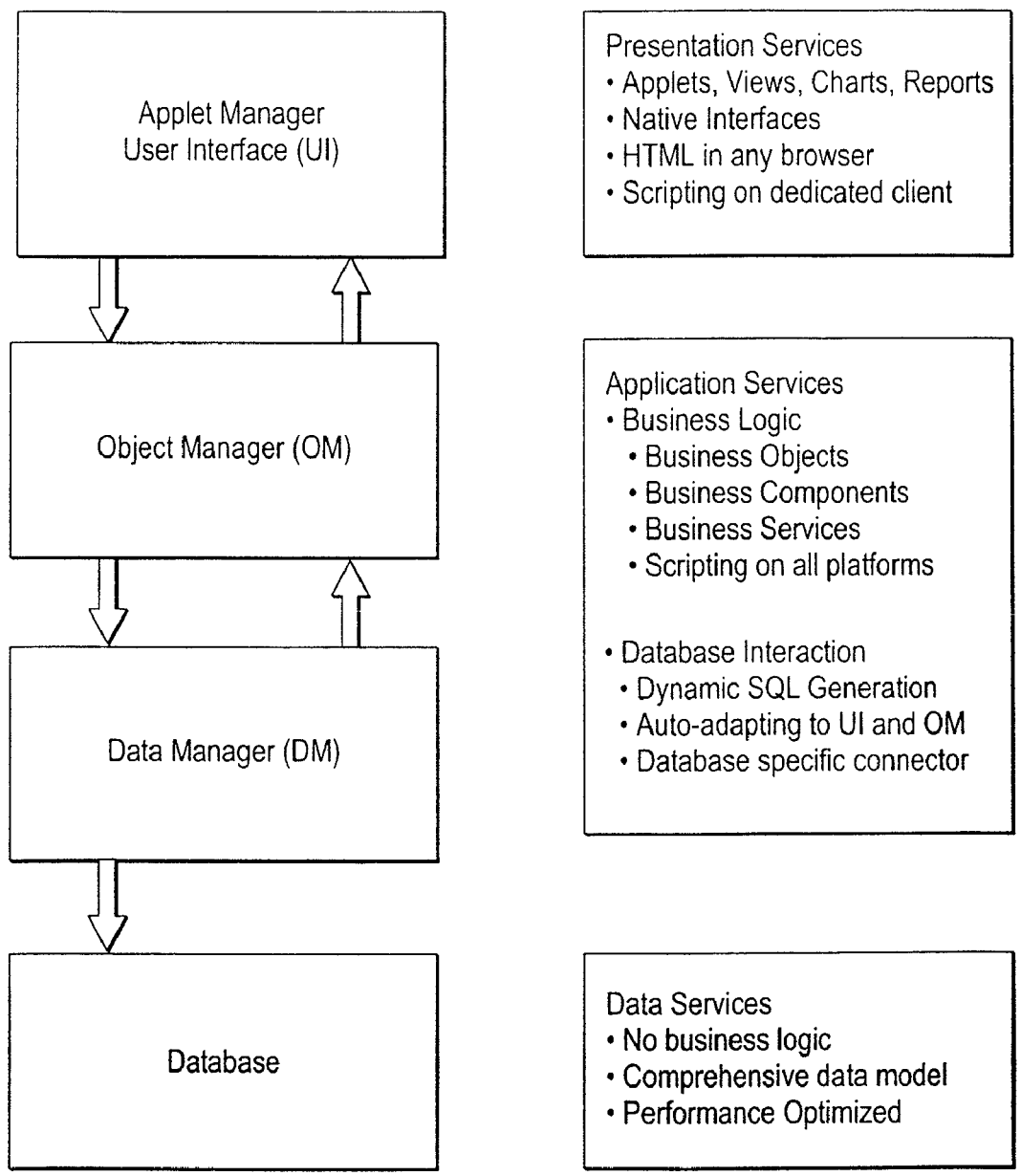
FIG. 3 shows a block diagram illustrating another logical representation of a multi-layered architecture in which applications can be built in accordance with the teachings of the present invention.

FIG. 3 shows a block diagram illustrating another logical representation of a multi-layered architecture in which applications can be built in accordance with the teachings of the present invention. Again, the multi-layered architecture as illustrated in FIG. 3 provides the platform for various common services designed and configured to support the various applications. In one embodiment, these various services may include presentation services logic layer 315 which corresponds to an applet manager and user interface layer 310, application services logical layer 325 which corresponds to an object manager (OM) layer 320 and a data manager (DM) layer 330, and data services logical layer 345 which corresponds to a database layer 340.

In one embodiment, the presentation services 315 may be designed and configured to support various types of clients and may provide them with user interface applets, views, charts, and reports, etc. As described above, a large variety of clients may be supported including wireless clients, handheld clients, web clients, mobile web clients, and dedicated (connected) clients, etc.

In one embodiment, the application services 325 may include business logic services and database interaction services. In one embodiment, business logic services provide the class and behaviors of business objects and business components. In one embodiment, database interaction services may be designed and configured to take the user interface (UI) request for data from a business component and generate the database commands (e.g. SQL queries, etc.) necessary to satisfy the request. For example, the data interaction services may be used to translate a call for data into DBMS-specific SQL statements.

In one embodiment, data storage services 345 may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
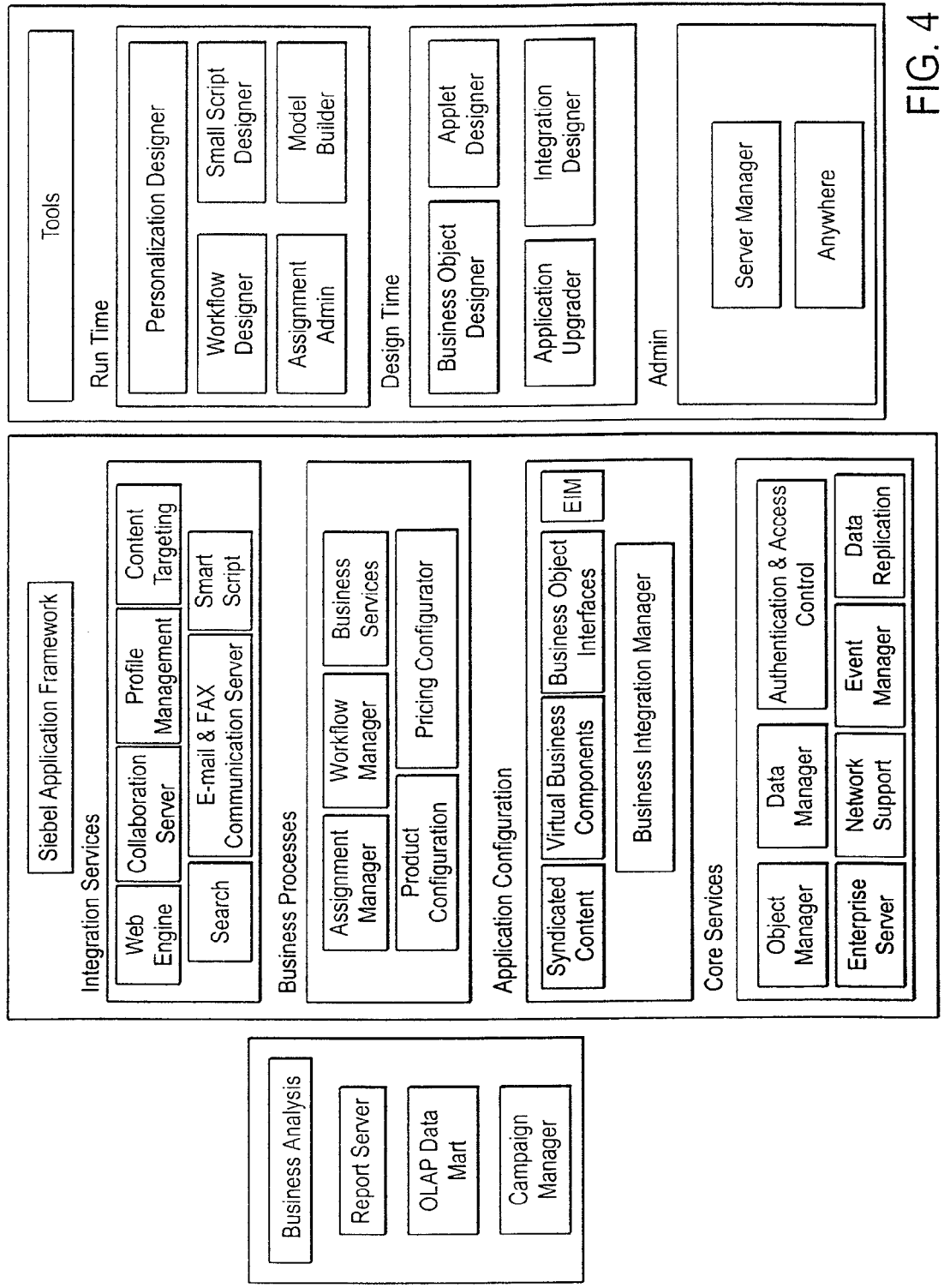
FIG. 4 illustrates a block diagram of one embodiment of an application framework in which the teachings of the present invention may be implemented.

FIG. 4 illustrates a block diagram of one embodiment of an application framework in which the teachings of the present invention may be implemented. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:

The enterprise server, which is the middle-tier application server

The networks that link all of these pieces together

Facilities like event manager and data replication, which allow sharing data between multiple installations of various applications as well as between the various applications and other external applications The authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information, and a server having information requested from it.

In one embodiment, business processes services are designed and configured to allow the client to automate business processes through the application. In one embodiment, these various business process services may include the following:

Assignment of tasks through Assignment Manager
Enforcement of business practices through Workflow Manager
Reuse of custom business logic through Business Services
Ensuring proper product configuration and pricing through the Product Configurator and Pricing Configurator In one embodiment, creation of these business processes can be done through Run-Time tools such as Personalization Designer, Workflow Designer, SmartScript Designer, Assignment Administration Views, and the Model Builder, etc.

In one embodiment, integration services may be designed and configured to provide the client with user interface and thin client support. In one embodiment, these may include capabilities for building and maintaining web-based applications, providing web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured provide one place to monitor and administer the application environment. In one embodiment, these services allow the user to administer the application either through a graphic user interface (GUI) or from a command line, etc.

II. System Framework or Infrastructure

Figure 5A:
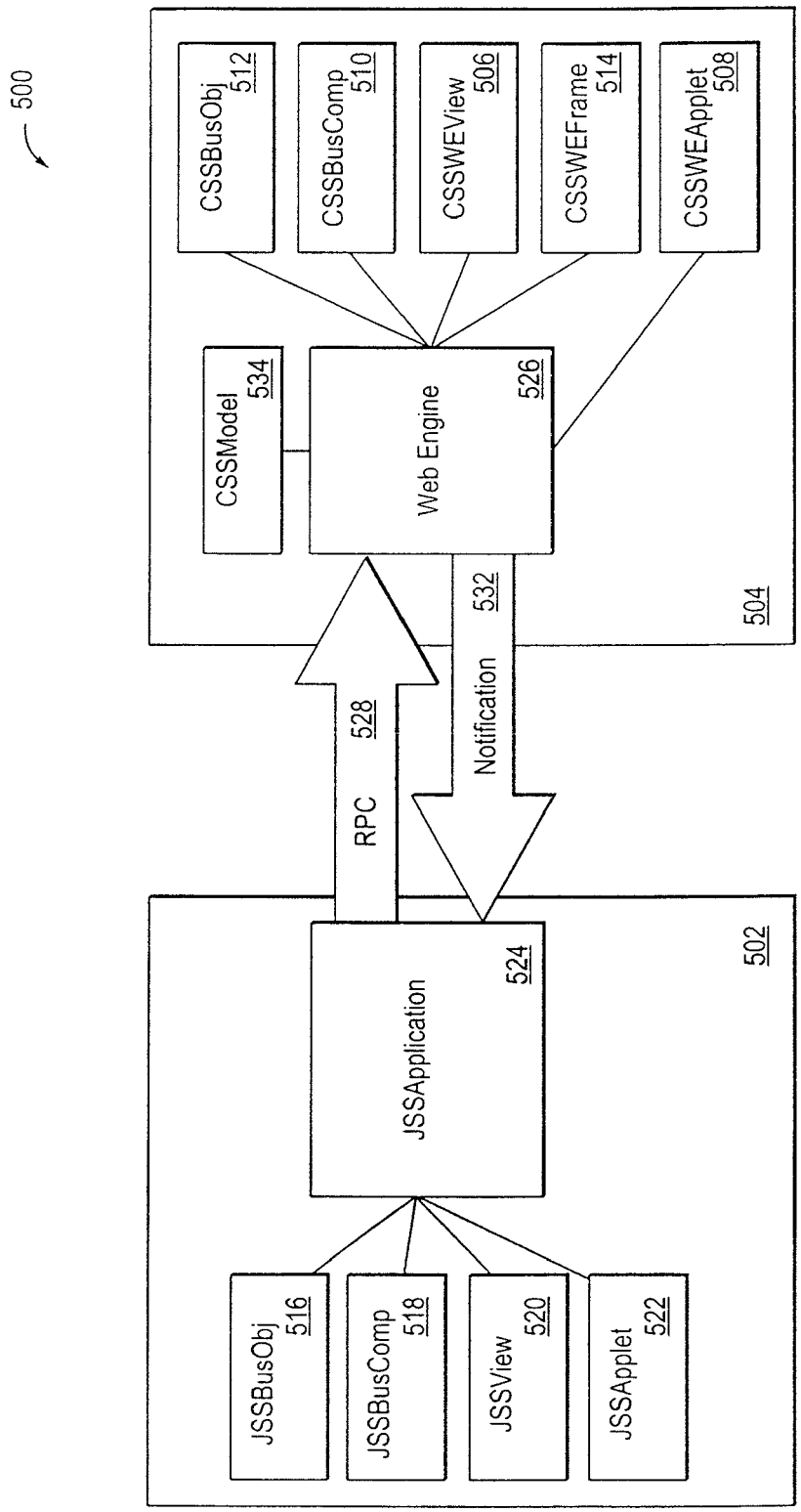
FIG. 5A illustrates an exemplary framework or infrastructure 500 to support an interactive web client and an mobile web client of FIG. 2.
Figure 5B:
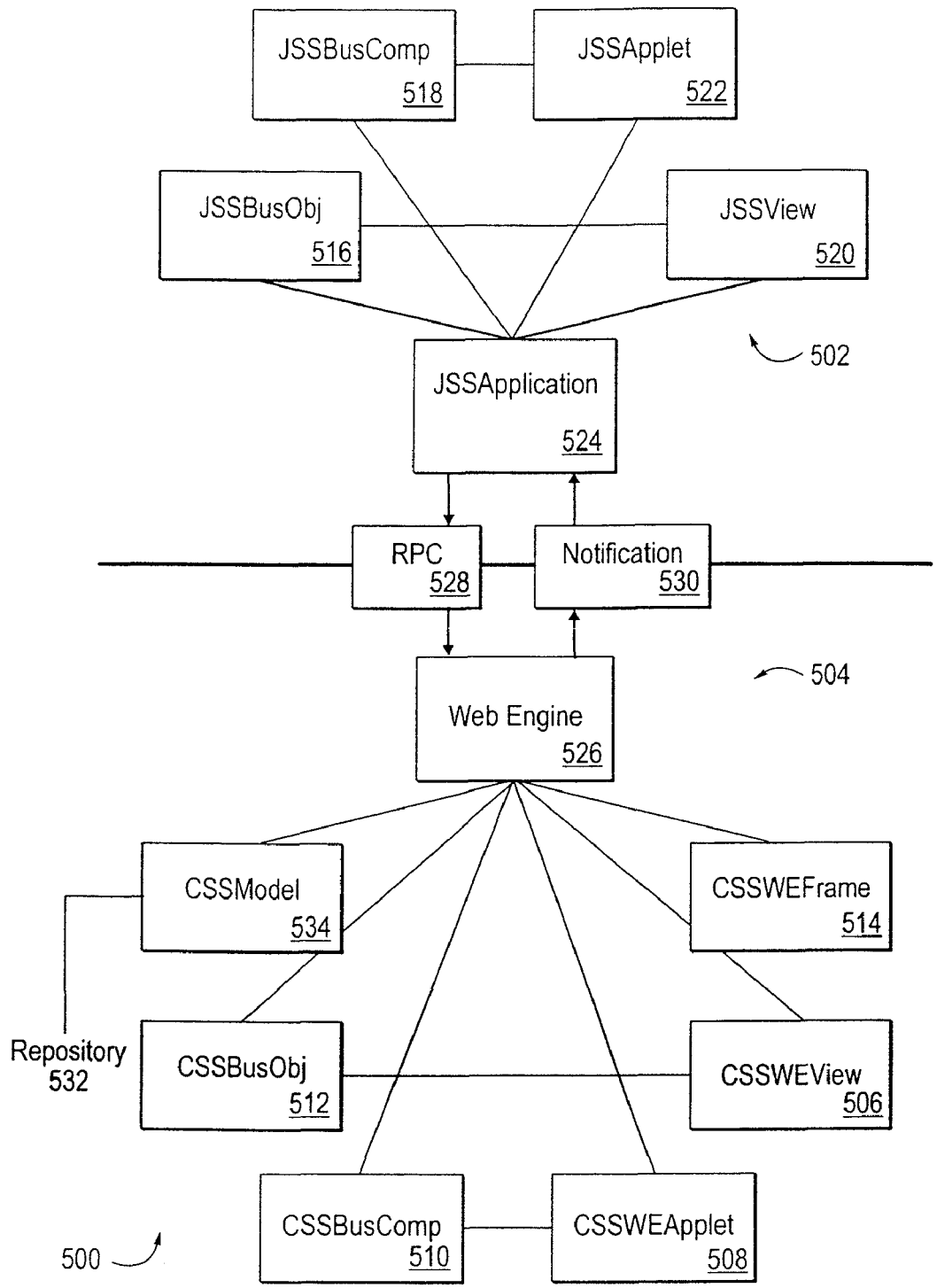
FIG. 5B illustrates an alternative view of the exemplary framework or infrastructure shown in FIG. 5A.

FIG. 5A illustrates an exemplary system framework or infrastructure 500 to support an interactive web client 205 and a mobile web client 210 of FIG. 2 in accordance with one embodiment of the present invention. FIG. 5B illustrates an alternative view of the exemplary system framework or infrastructure 500 shown in FIG. 5A.

The framework or infrastructure 500 can support the interactive web client 205 (shown in FIG. 2) and the mobile web client 210 (also shown in FIG. 2), and is capable of meeting certain criteria, such as increasing the interactivity and performance of the web client and the mobile web client, and reducing the number of page refreshes for common actions.

The framework or infrastructure 500 can include objects 502 that can be dynamically created on the browser to mimic corresponding objects 504 managed by the object-manager. In one embodiment, the objects 504 managed by the object manager (OM) can be built using a programming language, such as C+++, supporting the object-oriented paradigm.

As shown in FIGS. 5A and 5B, exemplary objects 504 managed by the OM can include an object 506 representing a view, CSSWEView 506. A view is generally a display panel consisting of a particular arrangement of applets. In one embodiment, one active view can be displayed at any given time. Another exemplary object managed by the OM can be an object 508 representing an applet, CSSWEApplet 508. An applet is generally a visual application unit that appears on the screen as part of a view. Other exemplary objects managed by the OM can include an object 510 representing a business component (CSSBusComp 510), an object 512 representing a business object (CSSBusObj 512), and an object 514 representing a frame (CSSWEFrame 514). In one embodiment, the business object may be designed as configurable software representations of the various business rules or concepts such as accounts, contacts, opportunities, service requests, solutions, etc. In this embodiment, the business components typically provide a layer of wrapping over tables, and the applets reference business components rather than the underlying tables. In addition, a frame is generally a sub-component of a view and may comprise of one or more applets.

In one embodiment, objects 502 on the browser can be built using JavaScript. As shown in FIGS. 5A and 5B, exemplary objects 502 on the browser side may include JSSBusObj 516, JSSBusComp 518, JSSView 520, and JSSApplet 522 to respectively mirror CSSBusObj 512, CSSBusComp 510, CSSWEView 506, and CSSWEApplet 508, which are objects 504 managed by the OM.

Figure 6A:
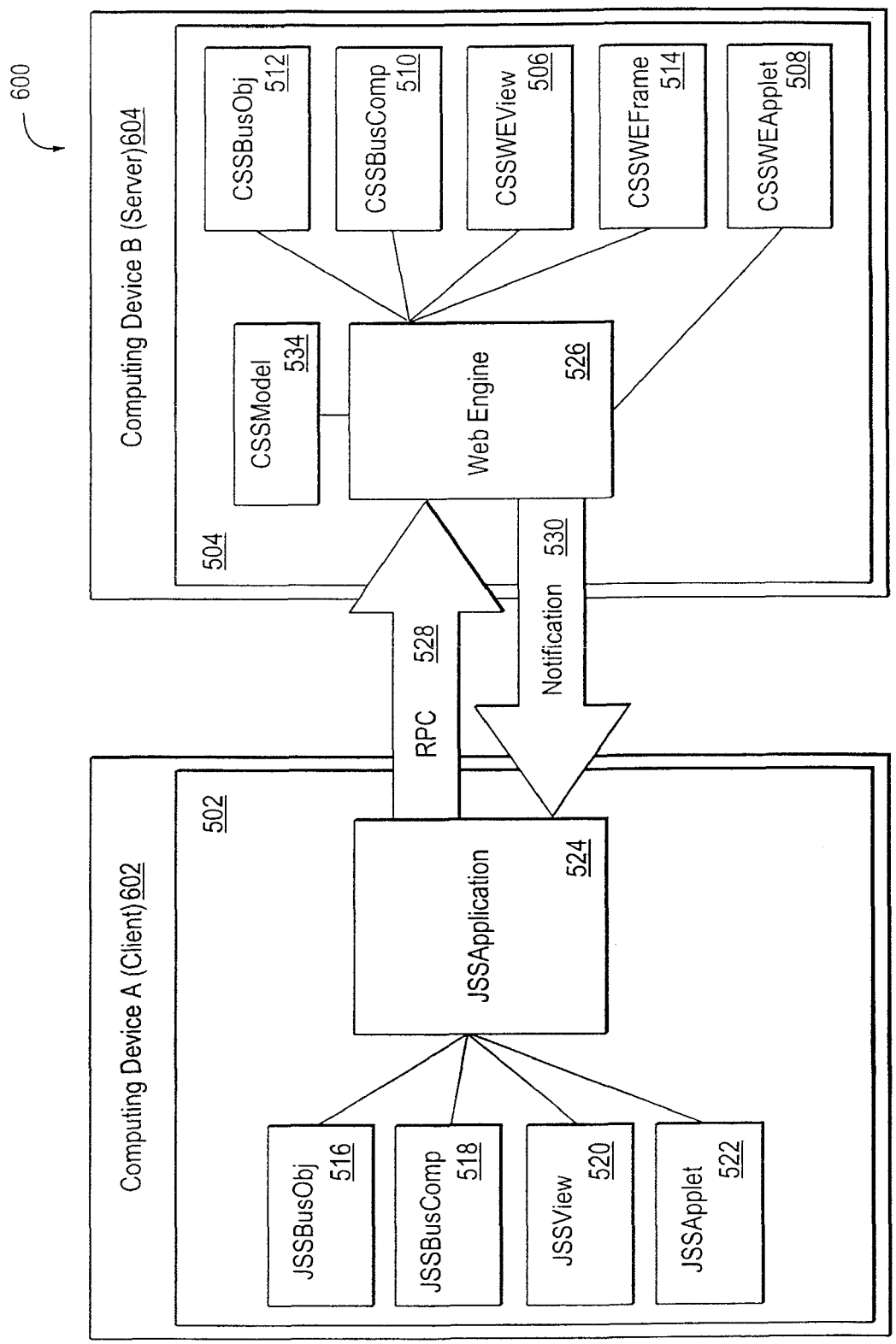
FIG. 6A illustrates an exemplary configuration in which objects on the browser and objects managed by the object manager (OM) reside and operate on multiple computing devices, including a client and a server.
Figure 6B:
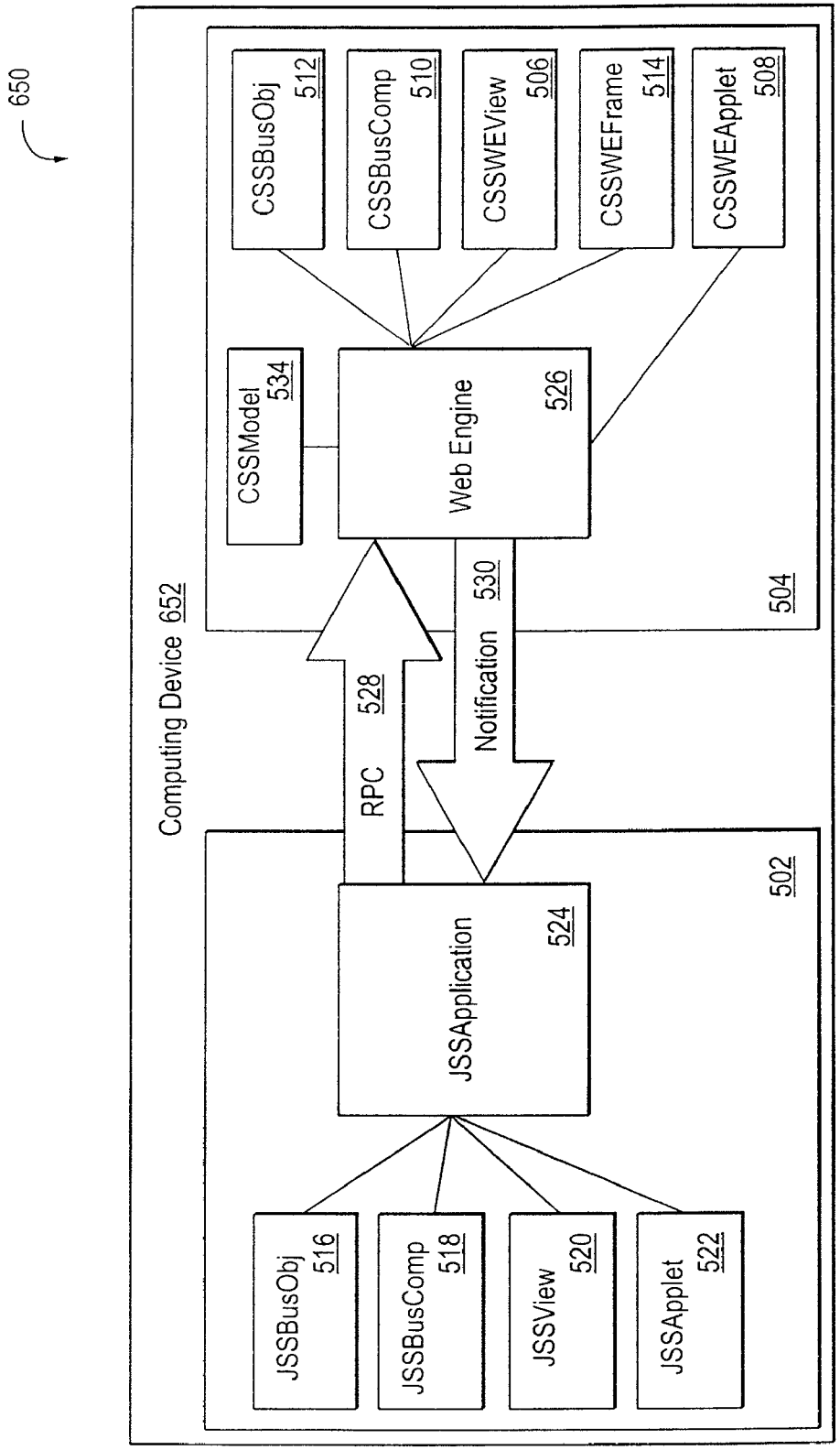
FIG. 6B illustrates an exemplary configuration in which objects on the browser and objects managed by the OM reside and operate on one computing device.

Objects 502 on the browser and objects 504 managed by the OM can be configured to reside and operate on one computing device or multiple computing devices. FIG. 6A illustrates an exemplary configuration 600 in which objects 502 on the browser and objects 504 managed by the OM reside and operate on multiple computing devices 602,604, including a client 602 and a server 604. FIG. 6B illustrates an exemplary configuration 650 in which objects 502 on the browser and objects 504 managed by the OM reside and operate on one computing device 652.

Returning to FIGS. 5A and 5B, objects 502 on the browser are generally synchronized with corresponding or mirrored objects 504 managed by the OM. Synchronization can be accomplished through a remote procedure call (RPC) mechanism 528 and a notification mechanism 530. The RPC mechanism 528 and the notification mechanism 530 will be described below in more details.

Of the objects 502 on the browser, the JSSApplication object 524 typically exists throughout a user-session. The JSSApplication object 524 should be initially loaded when the user starts an application. An application would generally be started when the user invokes a subset of the application from an icon on the desktop or from the Start menu. The JSSApplication object 524 generally performs a role similar to that of the CSSModel object 534. The CSSModel object 534 is generally a global session object that provides access to repository objects that are in use, the current business object instance in memory, the relationships between the current business object and the business components contained in it, and the user's global state information. The CSSModel object 534 generally accesses a repository 532 to obtain needed information. The repository 532 is generally a set of object definitions used to define an application or a suite of applications. However, the JSSApplication object 524 is generally scaled down to track one view, applets associated to the tracked view, one business object, and the business components that are in use in the view.

Unlike the JSSApplication object 524, the JSSView object 520, the JSSApplet object 522, the JSSBusObj object 516 and the JSSBusComp object 518 are typically temporary or impermanent entities, and are generally replaced when a page refresh occurs. For example, a request to navigate to a new view may cause a new set of JSSView 520, JSSApplet 522, JSSBusObj 516, and JSSBusComp 518 objects to be created to run on the browser.

Accordingly, objects 502 on the browser can be generally described as lightweight representations of mirrored or corresponding objects 504 managed by the OM. Each object 502 on the browser would typically include a subset of the functionalities included in corresponding objects 504 managed by the OM. For example, the JSSView object 520, similar to a CSSView object 506, generally represents a collection of applets. The JSSBusObj object 516, similar to a CSSBusObj object 512, generally manages the various one-to-many relationships between active business components so that correct relationships are employed when these active business components are populated via queries. The JSSBusObj object 516 generally exists on the browser for the life of the current view, and should be kept in sync with the corresponding CSSBusObj object 512.

In one embodiment, when the browser submits a request to navigate to a new view to the web engine 526, the web engine 526 would send a response containing the view layout that is devoid of data. Then the web engine 526 would send a response containing a string of data to populate the view.

The JSSApplication object 524 generally manages communications flowing into and out from objects on the browser. In one embodiment, a method invoked on an object on the browser would typically be directed to the JSSApplication object 524 if the invoked method should be retargeted to an object 504 managed by the OM. The JSSApplication object 524 would generally use the RPC mechanism 528 to route the invoked method through the web engine 526 to the appropriate object 504 managed by the OM. The web engine 526 would typically be employed to send return notifications and data from objects 504 managed by the OM to objects 502 on the browser. The web engine 526 would generally use the notification mechanism 530 to route notifications and data through the JSSApplication object 524 to objects 502 on the browser.

The browser objects 502 generally use the remote procedure calls 528 to invoke methods on the objects 504 managed by the OM. These remote procedure calls 528 are generally packaged as HTTP requests. Responses from the objects 504 managed by the OM are packaged as HTTP responses containing notifications and associated status information and data. In one embodiment, remote procedure calls are made with blocking enabled to ensure synchronization between the objects 502 on the browser and the objects 504 managed by the OM. With blocking enabled, control would typically not be passed back to the calling code until the called remote procedure finishes executing.

Remote Procedure Call (RPC)

Figure 7:
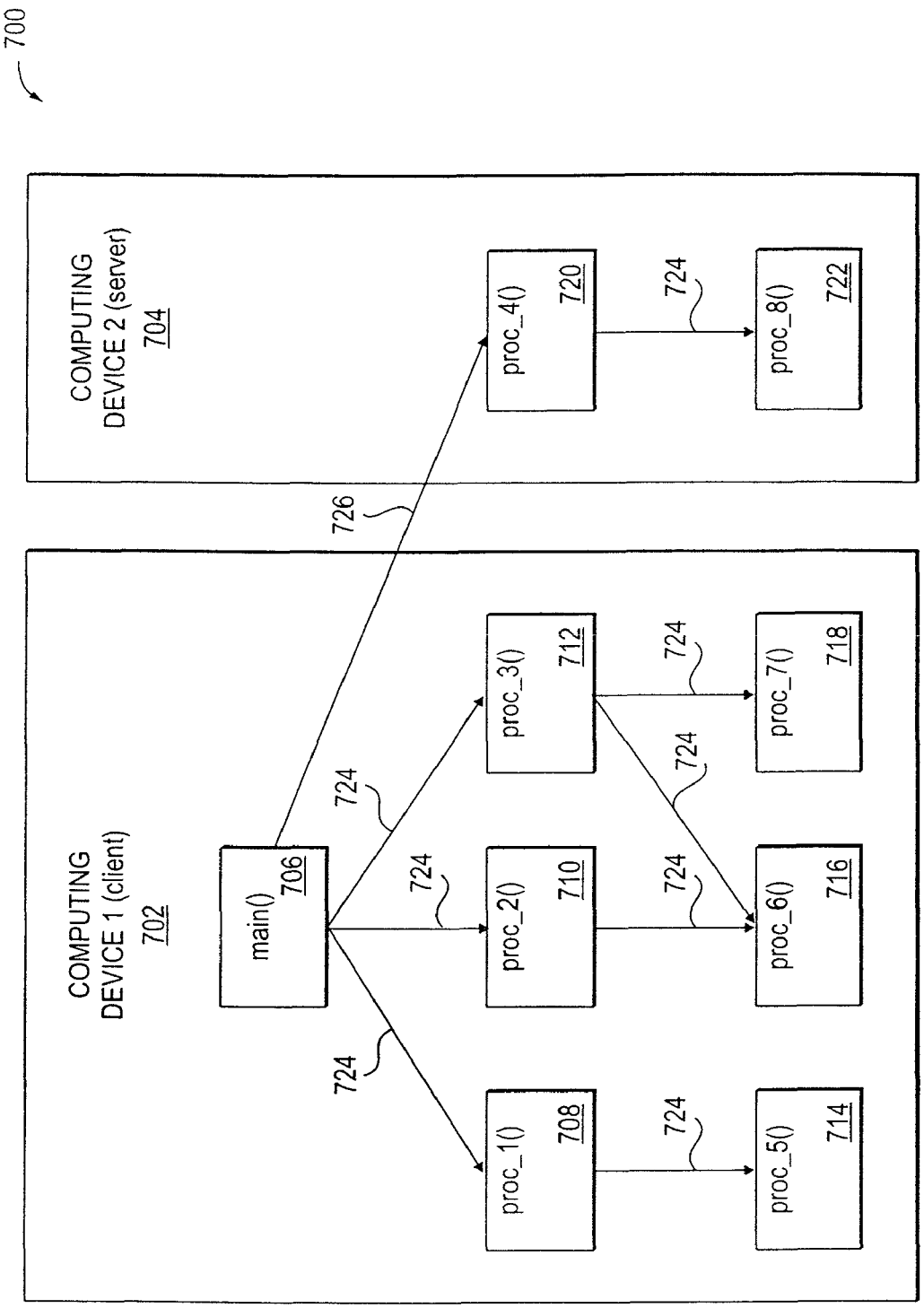
FIG. 7 illustrates an example of how the remote procedure call (RPC) paradigm can be used to divide a program into pieces that can be executed on separate computing devices.

The RPC model generally uses the same procedural abstraction as a conventional program, but allows a procedure call to span the boundary between two computers. FIG. 7 illustrates an example of how the RPC paradigm can be used to divide a program 700 into pieces that can be executed on separate computing devices 702, 704. This figure generally shows a distributed program having multiple procedures. Main( ) 706, proc_1( ) 708, proc_2( ) 710, proc_3( ) 712, proc_5( ) 714, proc_6( ) 716, and proc_7( ) 718 reside and operate in the first computing device or the client 702; and proc_4( ) 720 and proc_8( ) 722 reside and operate in the second computing device or the server 704. A solid line 724 from procedure n to procedure m denotes a call from n to m. A dashed line 726 shows how control passes from one computing device to another computing device during a remote procedure call.

Figure 8:
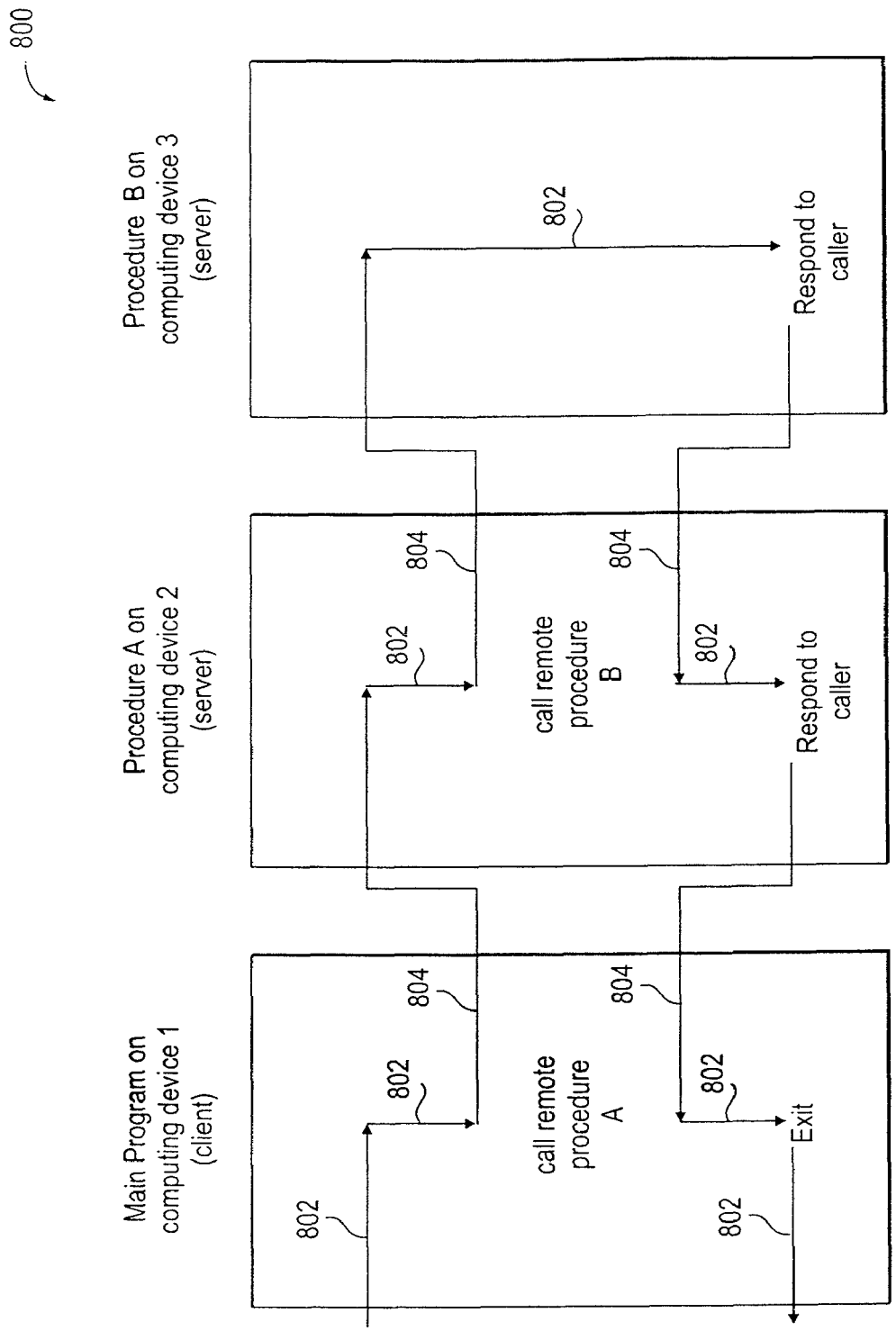
FIG. 8 illustrates an exemplary model of execution used with remote procedure calls.

FIG. 8 illustrates an exemplary model 800 of execution used with remote procedure calls. In this figure, solid lines 724 are generally used to denote flow control within a computing device; and dashed lines 726 are generally used to show how control passes from one computing device to another computing device during a remote procedure call.

As such, a remote procedure call generally executes a procedure located in a separate address space from the calling code. The RPC model is generally derived from the programming model of local procedure calls and takes advantage of the fact that every procedure contains a procedure declaration. The procedure declaration defines the interface between the calling code and the called procedure. The procedure declaration defines the call syntax and parameters of the procedure. Calls to a procedure should typically conform to the procedure declaration.

Applications that use remote procedure calls look and behave much like local applications. However, an RPC application is divided into two parts: a server, which offers one or more sets of remote procedures, and a client, which makes remote procedure calls to RPC servers. A server and its client(s) generally reside on separate systems and communicate over a network. RPC applications depend on the RPC runtime library to control network communications for them. The RPC runtime library generally supports additional tasks, such as finding servers for clients and managing servers.

A distributed application generally uses dispersed computing resources such as central processing units (CPU), databases, devices, and services. The following applications are illustrative examples of distributed applications:

A calendar-management application that allows authorized users to access the personal calendars of other users;

A graphics application that processes data on CPUs and displays the results on workstations; and A manufacturing application that shares information about assembly components among design, inventory, scheduling, and accounting programs located on different computers.

RPC software should generally meets the basic requirements of a distributed application including:

Clients finding the appropriate servers;

Data conversion for operating in a heterogeneous environment; and

Network communications

Distributed applications include tasks such as managing communications, finding servers, providing security, and so forth. A standalone distributed application needs to perform all of these tasks itself. Without a convenient mechanism for these distributed computing tasks, writing distributed applications is difficult, expensive, and error-prone.

RPC software typically provides the code, called RPC stubs, and the RPC runtime library that performs distributed computing tasks for applications. The RPC stubs and the RPC runtime library should be linked with client and server application code to form an RPC application.

Table 1 generally shows the basic tasks for the client and server of a distributed application. Calling the procedure and executing the remote procedure, shown in italicized text, are performed by the application code Oust as in a local application) but here they are in the client and server address spaces. As for the other tasks, some are performed automatically by the stubs and RPC runtime library, while others are performed by the RPC runtime library via API calls in the application code.

TABLE 1

Basic Tasks of an RPC Application

| Client Tasks | Server Tasks |
|---|---|
| | 1. Select network protocols |
| | 2. Register RPC interfaces |
| | 3. Register endpoints in endpoint map |
| | 4. Advertise RPC interfaces and objects in the namespace |
| | 5. Listen for calls |
| 6. Find compatible servers that offer the procedures | |
| 7. Call the remote procedure | |
| 8. Establish a binding with the server | |
| 9. Convert input arguments into network data | |
| 10. Transmit arguments to the server's runtime | |
| | 11. Receive call |
| | 12. Disassemble network data and convert input arguments into local data |
| | 13. Locate and invoke the called procedure |
| | 14. Execute the remote procedure |
| | 15. Convert the output arguments and return value into network data |
| | 16. Transmit results to the client's runtime |
| 17. Receive results | |
| 18. Disassemble network data and convert output arguments into local data | |
| 19. Return results and control to calling code | |

Figure 9:
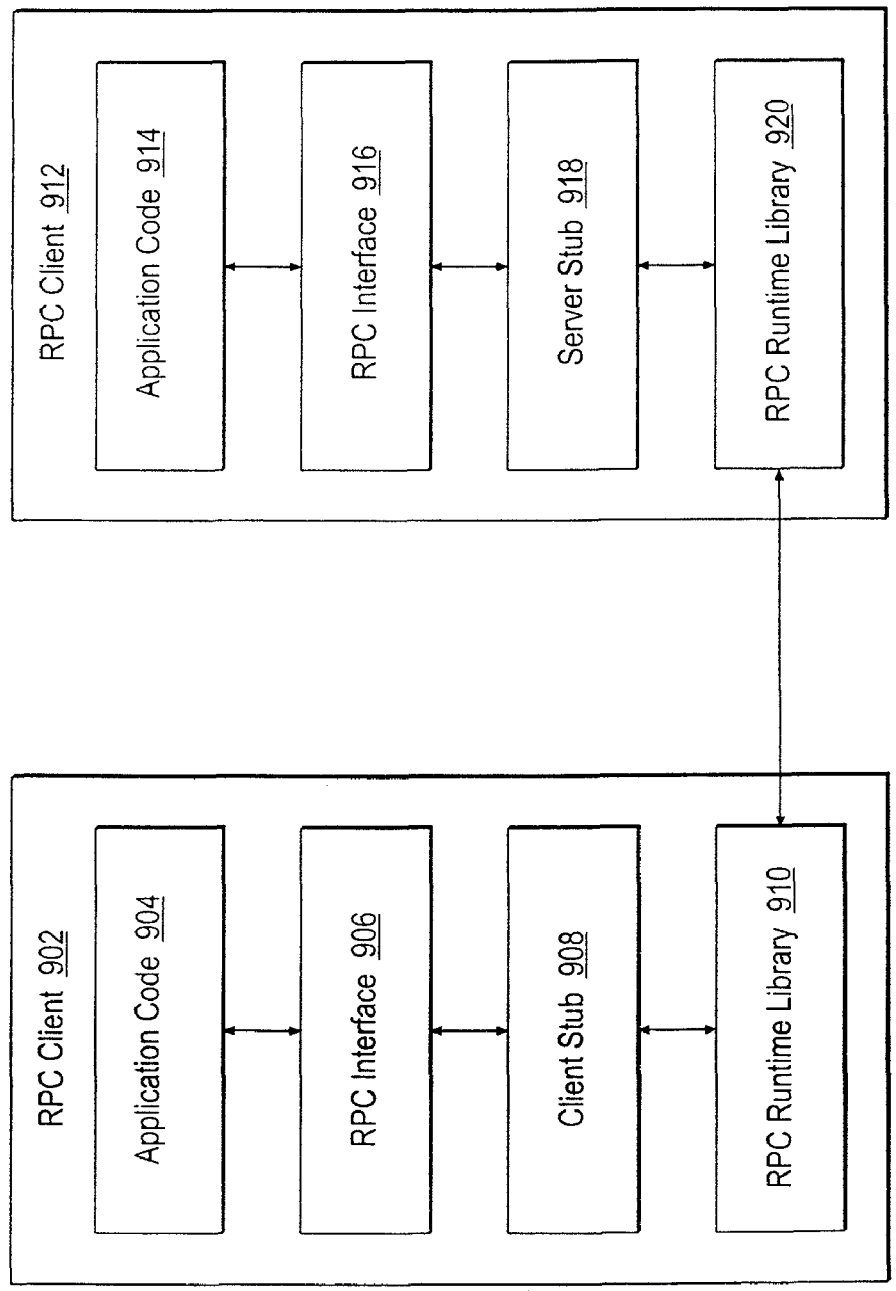
FIG. 9 generally shows an exemplary partitioning of RPC application code segments, RPC interfaces, client and server stubs, and the RPC runtime libraries in the RPC client and the RPC server.

FIG. 9 generally shows an exemplary partitioning 900 of RPC application code segments 904 and 914, RPC interfaces 906 and 916, client and server stubs 908 and 918, and the RPC runtime libraries 910 and 920 in the RPC client 902 and the RPC server 904.

The RPC client 902 or the RPC server 912 typically contains RPC application code segments 904 and 914, RPC interfaces 906 and 916, stubs 908 and 918, and the RPC runtime libraries 910 and 920. The RPC application code segments 904,914 are generally the code written for a specific RPC application by the application developer. The RPC application code segments 904,914 generally implement and call remote procedures, and also calls needed routines or procedures in the RPC runtime library. An RPC stub 908,918 is generally an interface-specific code module that uses an RPC interface 906,916 to pass and receive arguments. A client 902 and a server 912 typically contain complementary RPC stubs 906,916 for each shared RPC interface 906,916. The RPC runtime library 910,920 generally manages communications for RPC applications. In addition, the RPC runtime library 910,920 should support an Application Programming Interface (API) used by RPC application code to enable RPC applications to set up their communications, manipulate information about servers, and perform optional tasks such as remotely managing servers and accessing security information.

RPC application code segments 904,914 usually differ for clients and servers. RPC application code 914 on the server 912 typically contains the remote procedures that implement one RPC interface. RPC application code 904 on the corresponding client 902 typically contains calls to those remote procedures.

RPC stubs 908,918 generally perform basic support functions for remote procedure calls. For instance, RPC stubs 908,918 prepare input and output arguments for transmission between systems with different forms of data representation. RPC stubs 908,918 use the RPC runtime library 910,920 to handle the transmission between the client 902 and server 904. RPC stubs 908 on the client 902 can also use the local RPC runtime library 910 to find appropriate servers for the client 902.

Figure 10:
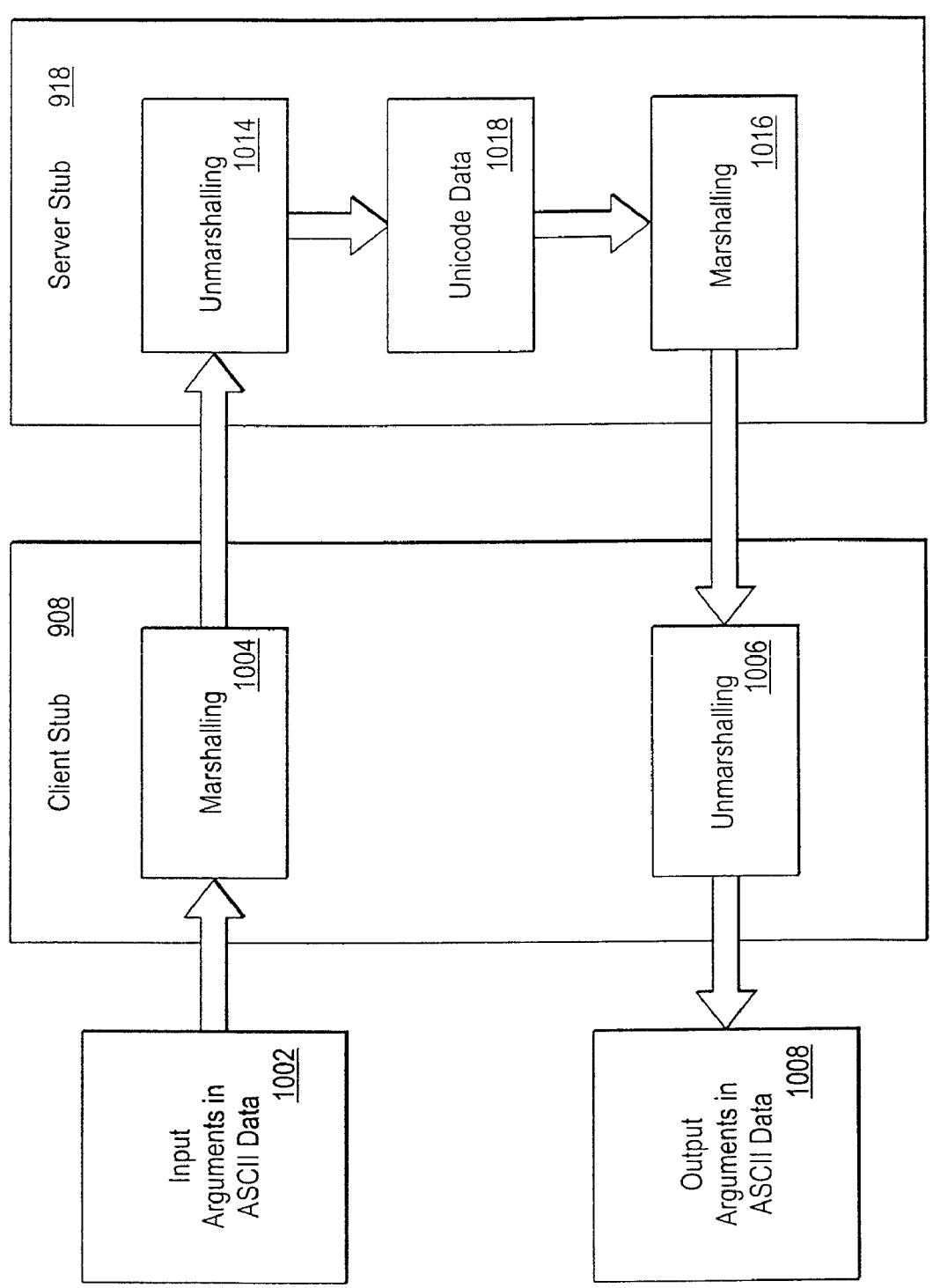
FIG. 10 generally shows an exemplary marshalling and unmarshalling between client data structures and server data structures.

FIG. 10 generally shows an exemplary marshalling and unmarshalling between client data structures and server data structures. When the client RPC application code calls a remote procedure, the client RPC stub 908 should prepare the input arguments 1002 for transmission. The process for preparing arguments for transmission is known as "marshalling."

Marshalling 1004 generally converts input or call arguments 1002 into a byte-stream format and packages them for transmission. Upon receiving call arguments, a server RPC stub 918 unmarshalls 1014 them. Unmarshalling 1014 is generally the process by which a stub disassembles incoming network data and converts it into application data using a format that the local system understands. Marshalling 1004, 1016 and unmarshalling 1014,1006 both occur twice for each remote procedure call. The client RPC stub 908 marshalls 1004 input arguments 1002 and unmarshalls 1006 output arguments 1008. The server RPC stub 918 unmarshalls 1014 input arguments 1006 and marshalls 1016 output arguments 1008. Marshalling and unmarshalling permit client and server systems to use different data representations for equivalent data. For example, the client system can use ASCII data 1002,1008 and the server system can use Unicode data 1018 as shown in FIG. 10.

The IDL compiler (a tool for application development) generates stubs by compiling an RPC interface definition written by application developers. The compiler generates marshalling and unmarshalling routines for platform-independent IDL data types. To build the client for an RPC application, a developer links client application code with the client stubs of all the RPC interfaces the application uses. To build the server, the developer links the server application code with the corresponding server stubs.

In addition to one or more RPC stubs, each RPC server and RPC client should be linked with a copy of the RPC runtime library. The RPC runtime library generally provides runtime operations such as controlling communications between clients and servers and finding servers for clients on request. RPC stubs in the client and the server typically exchange arguments through the RPC runtime library that is respectively local to the client and the server. The RPC runtime library on the client typically transmits remote procedure calls to the server. The RPC runtime library on the server generally receives the remote procedure calls from the client and dispatches each call to the appropriate RPC stub on the server. The RPC runtime library then sends the results of each call to the RPC runtime library on the client.

RPC application code on the server must also contain server initialization code that calls routines in the RPC runtime library on the server when the server is starting up and shutting down. RPC application code on the client can also call RPC runtime library routines for initialization purposes. Furthermore, RPC application code on the server and RPC application code on the client can also contain calls to RPC stub-support routines. RPC stub-support routines generally allow applications to manage programming tasks such as allocating and freeing memory.

Figure 11:
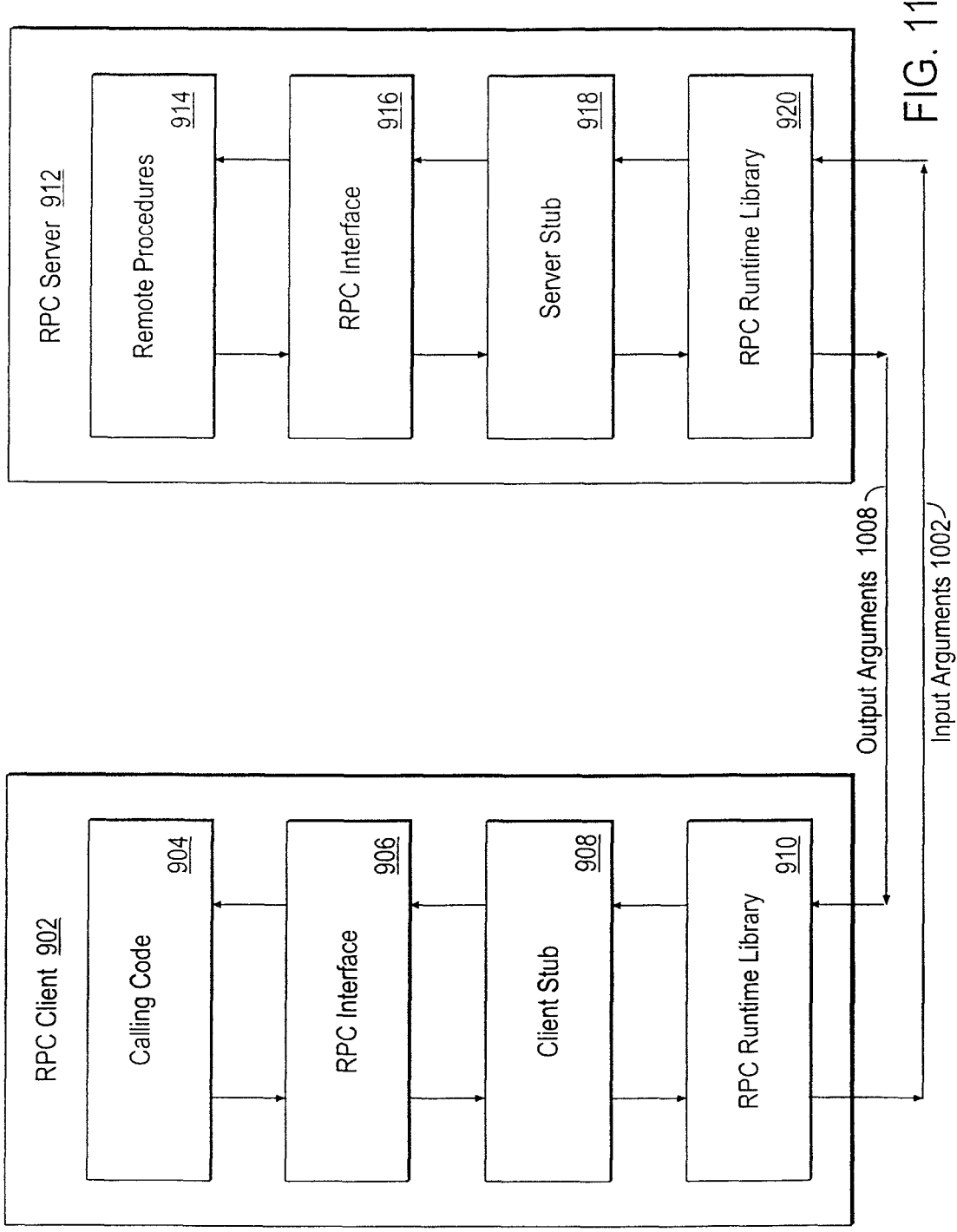
FIG. 11 generally shows exemplary roles of RPC application code segments, RPC interfaces, RPC stubs, and RPC runtime libraries during a remote procedure call.

FIG. 11 generally shows exemplary roles of RPC application code segments 904 and 914, RPC interfaces 906 and 916, RPC stubs 908 and 918, and RPC runtime libraries 910 and 920 during a remote procedure call. The client's application code or calling code 908 invokes a remote procedure call, passing the input arguments 1002 through the client's RPC interface 906 to the client stub 908. The client stub 908 marshalls the input arguments 1002 and dispatches the call to the client's RPC runtime library 910. The client's RPC runtime library 910 transmits the input arguments 1002 to the server's RPC runtime library 920, which dispatches the call to the server stub 918 for the RPC interface 916 of the called procedure. The server's stub 918 unmarshalls 490 the input arguments 1002 and passes them to the called remote procedure 914. The server's application code or remote procedure 914 executes and then returns any output arguments 1008 to the server stub 918. The server stub 918 marshalls the output arguments 1008 and returns them to the server's RPC runtime library 920. The server's RPC runtime library 920 transmits the output arguments 1008 to the client's RPC runtime library 910, which dispatches them to the client stub 901. The client's stub 908 unmarshalls output arguments 1008 and returns them to the calling code 904.

In one embodiment, remote procedure calls are made with blocking enabled to ensure synchronization between the objects 502 on the browser and the objects 504 managed by the OM (shown in FIGS. 5A and 5B). With blocking enabled, control would typically not be passed back to the calling code until the called remote procedure finishes executing.

Figure 12:
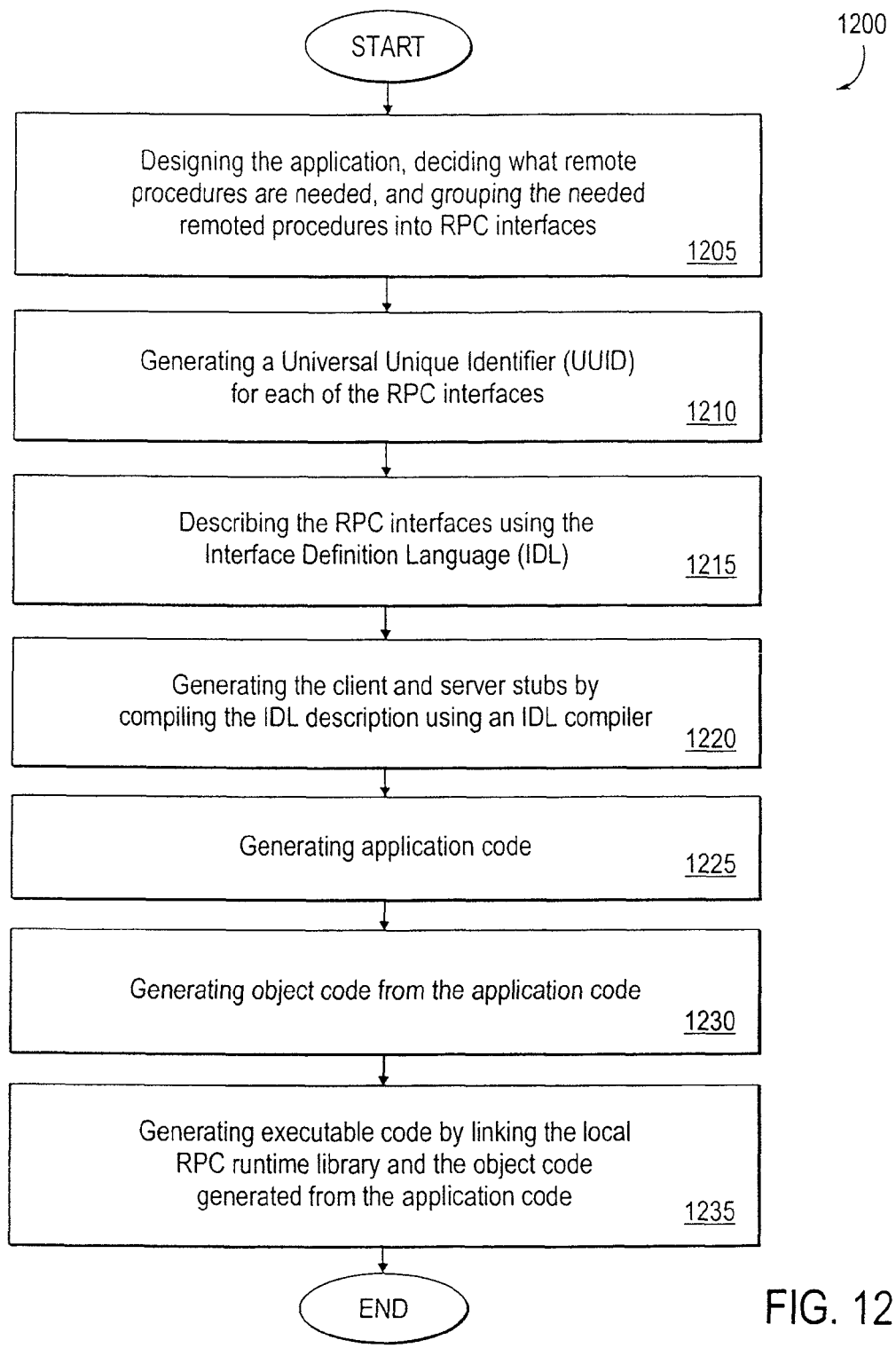
FIG. 12 generally outlines an exemplary process 1200 of building a distributed RPC application.

FIG. 12 generally outlines an exemplary process 1200 of building a distributed RPC application. The process generally includes the following basic tasks:

Designing the application, deciding what procedures are needed and which of the needed procedures will be remote procedures, and deciding how the remote procedures will be grouped into RPC interfaces (block 1205);

Using the Universal Unique Identifier (UUID) generator to generate a UUID for each of the RPC interfaces (block 1210);

Using the Interface Definition Language (IDL) to describe the RPC interfaces for planned data types and remote procedures (block 1215);

Generating the client and server stubs by compiling the IDL description using an IDL compiler (block 1220);

Writing or modifying application code using a programming language that is compatible with the RPC stubs, so that the application code works with the stubs (block 1225);

Generating object code from application code (block 1230); and

Linking the local RPC runtime library and the object code generated from the application code to generate executable code (block 1235).

Figure 13:
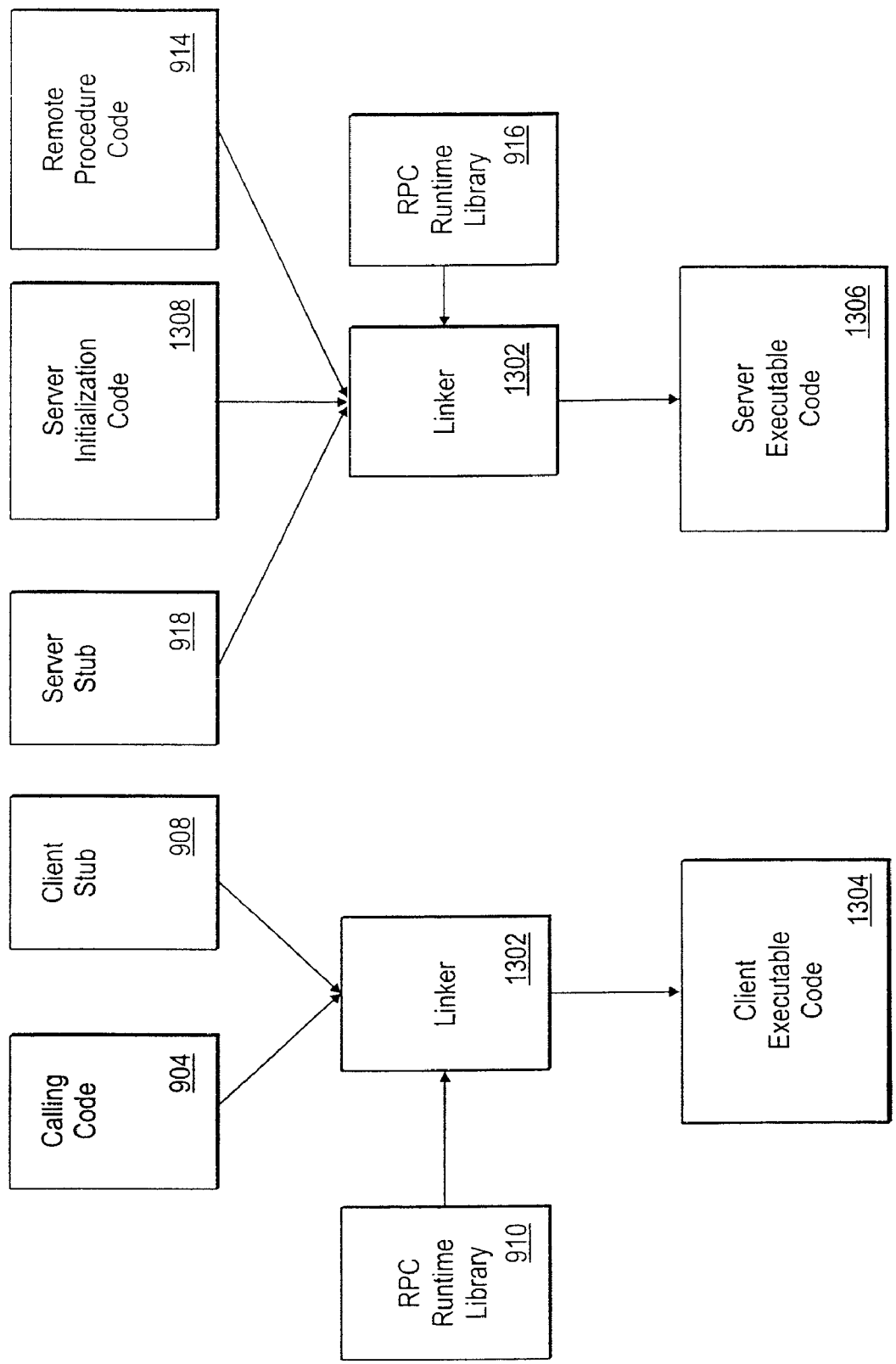
FIG. 13 generally illustrates the linking of the local RPC runtime library and the object code generated from the application code.

FIG. 13 generally illustrates the linking of the local RPC runtime library and the object code generated from the application code. For the client, object code of the client stub 908, the client application code or calling code 904, and the client's RPC runtime library 910 are linked using a linker 1302 to generate the client executable code 1304. For the server, object code for the server stub 918, the server's initialization code 1308, the server's application code or remote procedures 914, and the server's RPC runtime library 916 are linked using the linker 1302 to generate the server executable code 1306.

Traditionally, calling code and called procedures share the same address space. In an RPC application, the calling code and the called remote procedures are not linked; rather, they communicate indirectly through an RPC interface. An RPC interface is generally a logical grouping of operations, data types, and constants that serves as a contract for a set of remote procedures. RPC interfaces are typically compiled from formal interface definitions written by application developers using the Interface Definition Language (IDL).

In developing a distributed application, an interface definition should be defined in IDL. The IDL compiler generally uses the interface definition to generate a header file, a client stub file, and a server stub file. The IDL compiler can produce header files in a standard programming language, and stubs as source files or as object file. For some applications, an Attribute Configuration File (ACF) accompanying the interface definition may be defined. If an ACF exists, the IDL compiler interprets the ACF when it compiles the interface definition. Information in the ACF is used to modify the code that the compiler generates.

The header of each RPC interface typically contains a Universal Unique Identifier (UUID), which is a hexadecimal number that uniquely identifies an entity. A UUID that identifies an RPC interface is generally known as an interface UUID. The interface UUID ensures that the interface can be uniquely identified across all possible network configurations. In addition to an interface UUID, each RPC interface contains major and minor version numbers. Together, the interface UUID and version numbers form an interface identifier that identifies an instance of an RPC interface across systems and through time.

Notifications

Returning to FIGS. 5A and 5B, objects 502 on the browser are generally synchronized with corresponding or mirrored objects 504 managed by the OM so that changes can be reflected. Synchronization can be accomplished through a remote procedure call (RPC) mechanism 528 and a notification mechanism 530.

The notification mechanism 530 generally provides the means by which data in an object 502 on the browser (e.g., JSSBusComp 518) can be updated when data or status is changed in a corresponding object 504 managed by the OM (e.g., CSSBusComp 510). In one embodiment, the CSSSW-EView object 506 would collect one or more notifications, and send them to the objects 502 on the browser at the end of a view show cycle.

In one embodiment, the following exemplary or illustrative notifications can be transmitted. It should be noted that some of the notifications listed below require parameters. In other cases, the framework can understand the context for these notifications by simply knowing its current state.

NotifyBeginNotifys—Indicates the start of a set of notifications.

NotifyEndNotifys—Indicates the end of a set of notifications

NotifyStateChanged—Indicates that there has been a change of state. An exemplary scenario in which a change of state may occur is when the system goes into a query state (where the user can enter query conditions execute a query), and then goes into a commit pending state (where the user can update the data values).

NotifyBeginQuery—Indicates that the business component is in a state ready to accept query conditions NotifyExecute—Indicates that the business component has been executed (i.e., has executed a query on the database and repopulated itself with fresh data). This notification can include an optional parameter to provide query specifications.

NotifyEndQuery—Indicates that a query has been completed.

NotifyDeleteRecord—Indicates that a record has been deleted from the database.

NotifyDeleteWorkSet—Indicates that a record has been removed from the working set. This notification can include a parameter that provides the index of the working set row that needs to be removed.

NotifyInsertWorkSet—Indicates that a record has been added to the current working set. This notification can include parameters to provide the index of the new record in the working set.

NotifyInsertWSFieldVals—Indicates that certain value(s) need to be added to a field in the working set.

NotifyNewActiveField—Indicates that a new field is active or current.

NotifyNewActiveRow—Indicates that a new row (i.e., record) is active or current.

NotifyNewData—Indicates that there has been change(s) in the data.

NotifyNewDataWS—Indicates that there has been change(s) in the data in the working set.

NotifyNewFieldData—Indicates that a particular field has new data. This notification includes parameter that provides the name of the field.

NotifyNewFieldQuerySpec—Indicates that a particular field has a new query or search specification.

NotifyNewPrimary—Indicates that a new record has become the primary record.

NotifyNewRecord—Indicates that a new record has been created.

NotifyNewRecordData—Indicates that a newly created record has new data.

NotifyNewRecordDataWS—Indicates that a newly created record has new data that to be populated into the working set.

NotifyNewSelection—Indicates the selection and de-selection of a record.

NotifyNewSelIds—Indicates the selection of multiple records.

NotifyPageRefresh—Indicates that the UI needs to be refreshed. This notification is typically used when a generally substantial change in the UI is required rather than just updating data. This notification can cause a server trip to fetch a new page and display it in the browser.

NotifyScrollData—Indicates that the records need to be scrolled up or down. Certain User Interface objects, such as list applets, can use this notification to scroll up and down to show different rows.

NotifyChangeSelection—Indicates that there has been a change in record selection (i.e., the current row has either been selected or deselected).

NotifySelModeChange—Indicates a change in the selection mode. In one embodiment, there can be two modes of selection, including (i) selection of one record at a time and (ii) selection of multiple records simultaneously (e.g., deleting multiple records with one command).

NotifyTotalsChanged—Indicates that total values need to be changed. In some cases when multiple records are displayed, some fields may also display the summation of values in all the records. This notification indicates that total value has changed.

NotifyLongOpProgress—Indicates that a long (i.e. time consuming) action is in progress. This notification is used by the User Interface to provide feedback to the user, such as showing a progress or status bar showing how much of the task is currently complete.

NotifyGeneric—This is a generic notification used to notify the User Interface object of some special conditions that are not covered by set of notifications listed and described above. Each type of generic notification can include a parameter providing a name for the generic notification so that one type of generic notification can be distinguished from another type of generic specification. Each type of generic notification can include its unique parameters.

General Communication Processes

As stated above, objects on the browser and objects managed by the OM can be configured to reside and operate on one or multiple computing devices. As shown above, FIG. 6A illustrates an exemplary configuration 600 in which objects 502 on the browser and objects 504 managed by the OM reside and operate on multiple computing devices 602 and 604, including a client 602 and a server 604. FIG. 6B illustrates an exemplary configuration 650 in which objects 502 on the browser and objects 504 managed by the OM reside and operate on one computing device 652.

Figure 14:
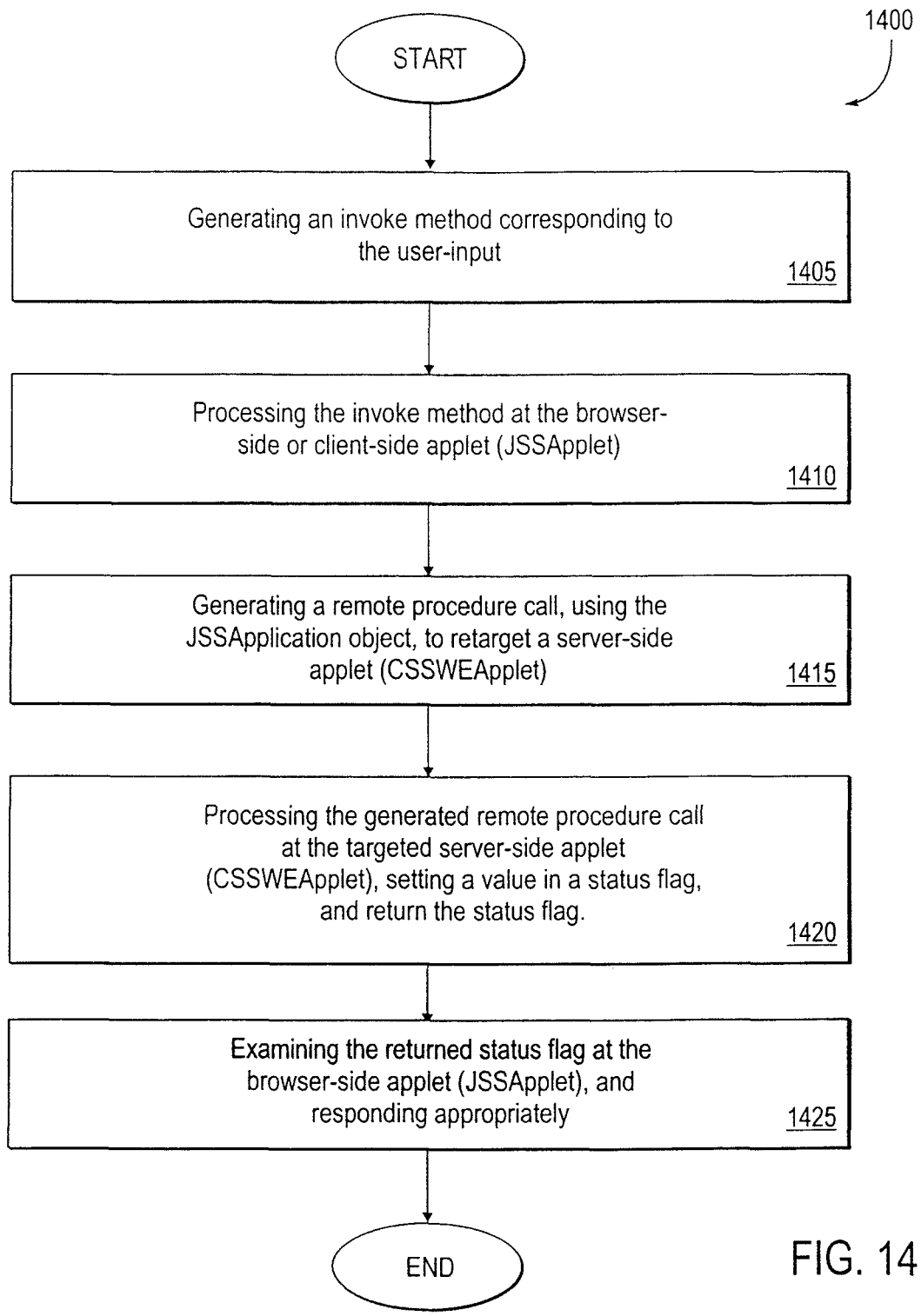
FIG. 14 generally illustrates an exemplary process of communication between the browser-side or client-side objects and server-side objects running on a multiple-devices configuration shown in FIG. 6A

FIG. 14 generally illustrates an exemplary process 1400 of communication between the browser-side or client-side objects 502 and server-side objects 504 running on a multiple-device configuration 600 shown in FIG. 6A. The exemplary process 1400 of communication of FIG. 14 is typically by user input and is handled first at browser-side applet, JSSApplet (block 1405). When the user clicks on a link or other user interface feature, an invoke method is generated. The JSSApplet is typically the first object to receive the generated invoke method (block 1410). The JSSApplet can then issue a remote procedure call, by way of the JSSApplication, to retarget the invoke method to the server-side applet, CSSWEApplet (block 1415). The targeted server-side applet, CSSWEApplet, can generally respond to an RPC invoke method from the browser-side applet, JSSApplet, by setting a status flag (block 1420). In one embodiment, the status flag can be set to one of the following values:

Continue—This value generally indicate that the server-side applet, CSSWEApplet, has performed its share of handling the invoke method (or has no role to perform), and that the JSSApplet on the browser needs to complete the action. Notifications are provided in the response, but are often empty.

Completed—This value generally indicates that the server-side applet has completed the handling of the invoke method, and that the browser needs to perform no further action other than to respond to notifications provided in the response.

NewPage—This value generally indicates that the response to the invoke request or other command requires a page refresh on the browser, including re-a generation all the temporary browser-side objects. A URL is sent to the browser, so that the new page can be obtained. However, there will no notifications. This value is typically set in cases such as when a drilldown to a different view is requested.

Error—This value generally indicates that the invoke method request failed. Upon receiving an Error status, the JSSApplet would typically display an error page.

When a browser-side applet, JSSApplet, calls the server through the RPC, the browser-side applet typically looks at the status flag in the response and then handles it (block 1425). If the returned status is Error, the browser-side applet would show an error page. If the returned status is Completed, the server is generally indicating that it had already handled the invoke method and that there's nothing left for the browser to do. If the returned status is Continue, the server is generally indicating that it is not handling the invoke method. The browser-side applet would generally respond to a returned status of Continue by redirecting the method to a JSSBusComp object by invoking the method directly on a JSSBusComp object. The JSSBusComp object may be able to satisfy the invoke method request, or may have to send its own RPC call through the JSSApplication to its corresponding server-side business component.

Figure 15:
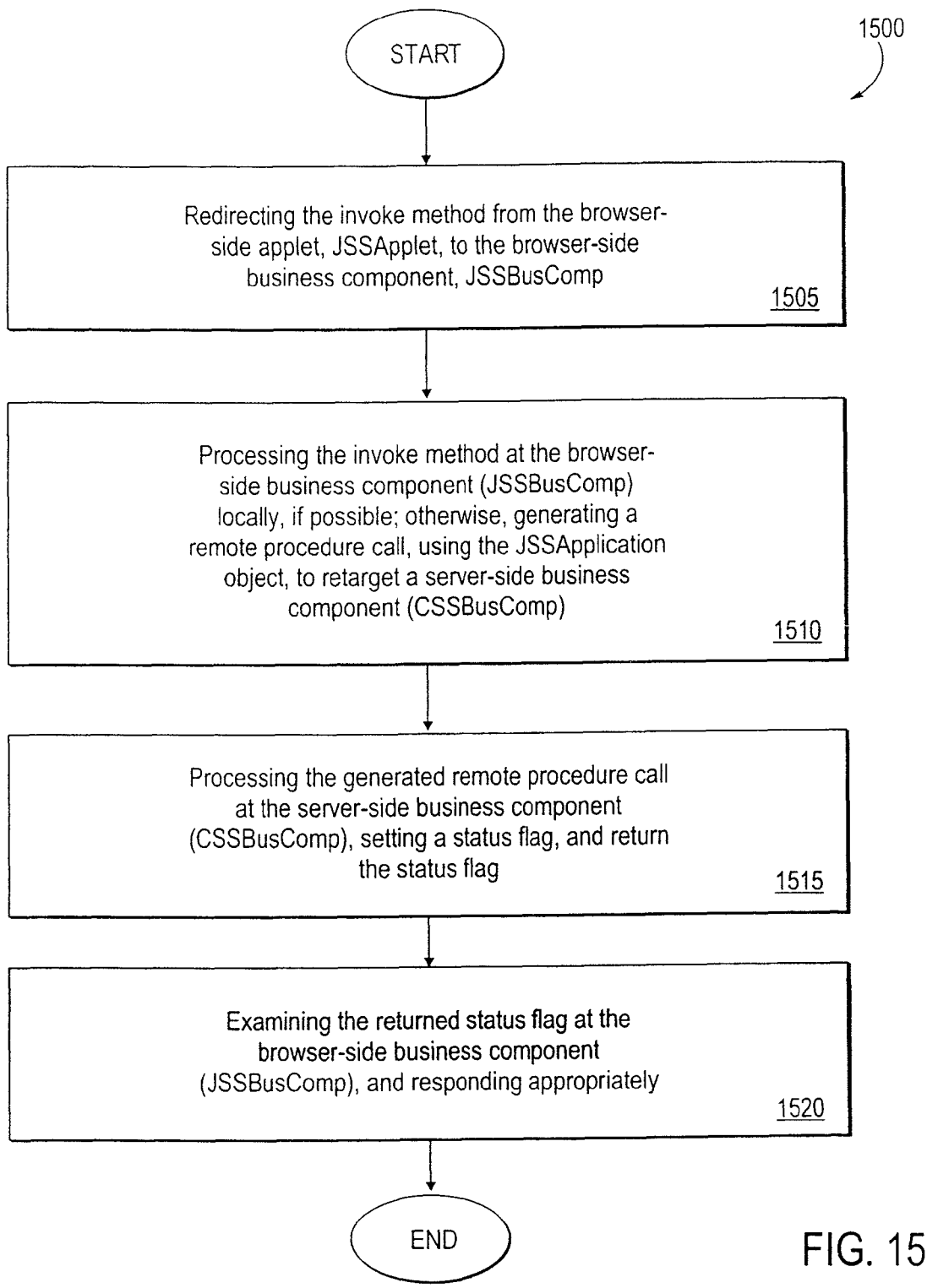
FIG. 15 shows an exemplary process of communication in which the browser-side applet invokes the method directly on the JSSBusComp object.

FIG. 15 shows an exemplary process 1500 of communication in which the browser-side applet invokes the method directly on the JSSBusComp object. It should be noted that the process 1500 of FIG. 15 will be described below as though the process had occurred in a multiple-device configuration shown in FIG. 6A. In block 1505, the browser-side applet, JSSApplet, redirects the method to the JSSBusComp object. In block 1510, the client-side business component object, JSSBusComp, would then issue a remote procedure call, through JSSApplication object, to a server-side business component, CSSBusComp. The server-side business component generally processes the RPC method call, sets and sends back a status, and also returns a set of notifications in appropriate cases (block 1515). In one embodiment, the status flag can have the following values:

Completed—This value generally indicates the server-side business component, CSSBusComp, had generally processed the invoke method successfully. Notifications will typically occur.

Error—This value generally indicates that the server-side business component, CSSBusComp, had unsuccessfully processed the invoke method call. Upon receiving a returned status of Error, the browser would typically display an error page.

In block 1520, the client-side business component (JSSBusComp) examines the returned status flag and responds appropriately. It should be noted that the server will be contacted if an invoke method call performs actions that would require synchronization between the browser and server business components. It should be further noted that there could be circumstances where the JSSBusComp object may be able to handle the request locally without needing to contact the server. An example of such circumstances is when the user performs a next record operation and then a previous record operation without changing any data.

Methods Potentially Supported by Browser-Side Objects

In one embodiment, the methods, which can be potentially supported by the browser-side objects, can be divided into the following categories: base object methods, application methods, service methods, business component methods, and applet methods. For illustrative purposes, exemplary methods in each category will be listed and general described below.

Most of the browser-side objects will typically inherit the following base object methods:

AddErrorMsg(errcode,params,append)
General Description: Adds an error message to the error chain for the current object.

AddErrorMsgText(errCode,errMsg,append)
General Description: Adds an error message to the error chain for the current object.

ClearErrorMsg( )
General Description: Clears out the error chain for the current object.

CopyErrormsg(inputObject)
General Description: Copies the error chain from the passed object, inputobject, to the current object.

FormatString(format,parameters)
General Description: Substitutes parameters into the format by replacing "% W" escapes in the format with the equivalent parameter as specified in the params array.

GetApplication( )
General Description: Returns the global application object.

GetErrorCode( )
General Description: Returns the top-most error code in the error chain. An error code is generally a string. An empty string typically indicates that there is no error.

GetErrorCount( )
General Description: Returns the length of the error chain for the current object.

GetErrorMsg(index)
General Description: Returns the nth error message text string from the error chain for the current object. Note that the index is zero-based.

GetNthErrorCode(index)
General Description: Returns the nth error code from the error chain for the current object.

HasErrorMsg( )
General Description: Checks to see whether the current object has any registered errors.

LockErrorMsg( )
General Description: Prevents additional errors from being registered or cleared for the current object.

SetErrorMog(errCode,params,child)
General Description: Registers an error on the current object. ErrCode is generally a key registered in the message table and mapped to an error message format string. Params can be null if the format takes no parameters, an array containing the string parameter values, or a single value substituted for "1%".

SetErrorMsgText(errCode, errmsg)
General Description: Registers an error on the current object.
TextToHTML(text)
General Description: Returns an HTML safe string for the inputted text.
TranslateError(errCode,params)
General Description: Returns a formatted string for the specified message key and parameters.
UnLockErrorMsg( )
General Description: Resumes handling error registration and clearing on the current object.

In one embodiment, each browser-side application object can typically support the following application methods:

AddBusobj(busObj)
General Description: Adds the BusObj for a view being instantiated. Called only by SWE.
AddRowCounterTemplate(key,templ)
General Description: Adds the string format template for one of the possible row counter formats.
AddView(view)
General Description: Adds a new view object.
CanInvokeMethod(name)
General Description: Verifies whether a given method can be invoked.
ClosePOPUP( )
General Description: Closes the active popup applet/control.
CreateObj(jssObjName)
General Description: Creates a JavaScript object given a type name.
DispatchBCNotifications(returnPropSet)
General Description: Routes the notifications returned by the RPC to the SWE server to the appropriate BusComp instances.
EnumBusObjs(first)
General Description: Iterates through the business objects that registered with the application.
EnumServices(first)
General Description: Iterates through the services loaded by the client.
EnumViews(first)
General Description: Iterates through the views registered with the application.
GetBusObj(name)
General Description: Returns a business object by name.
GetBusObjZone(zone)
General Description: Returns the Web Engine (WE) "zone" associated with a business object.
GetCommandMgr( )
General Description: Returns the top-level command manager that handles and dispatches UI commands for toolbars and menus.
GetEditCaption( )
General Description: Returns the caption for edit mode applets.
GetEditCtlType( )
General Description: Returns the control type for edit mode applets.
GetHtmlFrameMgr( )
General Description: Returns the object that manages frames for downloading new content.
GetJSSInfo(busObjZone,appletName,url)
General Description: Uses the HTML frame manager to load the URL specified.
GetLocalString(key)
General Description: Returns the translated string for the specified key. These translated strings are typically stored in the message table and downloaded to the client on startup.
GetLocale( )
General Description: Returns the locale object.
GetMainView( )
General Description: Returns the current view of the application.
GetPageURL( )
General Description: Returns the URL for the current top-level page.
GetProfileAttr(attrName)
General Description: Returns the value of the named profile attribute on the server.
GetRowCounterTemplate(key)
General Description: Return the string format template for one of the row counter formats.
GetService(name)
General Description: Loads a specified service object locally and on the server. If the specified service has already been loaded, just increment the reference count.
GetView(busObjZone)
General Description: Gets the view corresponding to a "zone" of a business object.
InvokeMethod(name,inputPropSet)
General Description: Invokes the named method on the application.
ProcessClosePopup(returnPropSet)
General Description: Closes the popup as posted.
ProcessConfirmDialog(errObj,returnPropSet)
General Description: Handles a confirmation dialog as posted.
ProcessError(object)
General Description: Brings up an error dialog for the error registered on the given object.
ProcessNewPage(returnPropSet)
General Description: Invokes a new page generation as posted.
ProcessRPCErrors(errObj,returnPropSet)
General Description: Handles errors returned by a call to the Web Engine on the server.
ProcessRPCNotifications(errObj,returnPropSet)
General Description: Handles notifications returned in a call to the Web Engine.
ProcessRPCRetPropSetStr(errObj,returnPropSetStr)
General Description: Handles returned property set from a call to Web Engine.
ReleaseService(service)
General Description: Releases the service immediately regardless of the reference count.
RemoveBusObj(busObj)
General Description: Remove a business object from the list of active ones.
RemoveObjFromArray(obj,arrayObj)
General Description: Removes an object from an array of objects.
WEAppletCanInvoke(appletName,viewName,busObjZone,method)
General Description: Calls the Web Engine to determine whether a method can be invoked on an applet.
WEApplicationCanInvoke(method)
General Description: Calls the Web Engine to determine whether a method can be invoked on the application.

WEBusCompCanInvoke(busCompName,busObjZone, method)
General Description: Calls the Web Engine to determine whether a method can be invoked on a business component.
WECallApplet(appName,viewName,busObjZone,method, inputPropSet)
General Description: Calls the Web Engine to invoke a specified remote procedure call on an applet.
WECallApplication(method,inputPropSet)
General Description: Calls the Web Engine to invoke a specified remote procedure call on the application.
WECallBusComp (busCompName,busObjZone,method,inputPropSet)
General Description: Calls the Web Engine to invoke a specified remote procedure call on a business component.
WECallService(serviceName,method,inputPropSet)
General Description: Calls the Web Engine to invoke a specified remote procedure call on a service.
WELoadService(name)
General Description: Calls the Web Engine to load a new service.
WEServiceCanInvoke(serviceName,method)
General Description: Calls the Web Engine to determine whether a method can be invoked on a service.
SetEditCaption(editCaption)
General Description: Sets up the caption used for edit mode.
SetEditCtlType(editCtlType)
General Description: Sets up the control type used for edit mode.
SetHtmlFrameMgr(htmlFrameMgr)
General Description: Sets up the HTML frame manager instance.
SetMainView(view)
General Description: Defines the main view.
SetPageURL(pageUrl)
General Description: Sets up the base URL for the application.
SetProfileAttr(attrName,value)
General Description: Changes the named user profile attribute to the specified value.
Set WSFrame(wsFrameName)
General Description: Defines a special frame for the HTML frame manager.
ShowPopup(url,height,width)
General Description: Raises a popup applet or control.
In one embodiment, each browser-side business component object can typically support the following business component methods:
AddField(name, . . . )
General Description: Specifies the configuration information for the fields when initializing the business component.
AddPickList(fieldName,picklist)
General Description: Specifies the pick list configuration for fields when initializing the business component.
AddRecord(record)
General Description: Specifies initial record data when initializing the business component.
AddUserProp(propName,value)
General Description: Specifies the configured user properties for the business component during its initialization.
AddFieldUserProp(fieldName,propName,value)
General Description: Specifies the configured user properties for a field during initialization of the business component.
CallServerBC(method,inputProps)
General Description: Sends a method to the business component on the server.
CanDelete( )
General Description: Determines whether the user can delete the current record from the current business component.
CanInsert(dynamic)
General Description: Determines whether a new record can be inserted in the current business component.
CanInvokeMethod(method)
General Description: Determines whether the named method can be invoked on the current business component.
CanMergeRecords( )
General Description: Determines the user can merge records in the current business component.
CanQuery( )
General Description: Determines whether the current business component supports queries.
CanUpdate(dynamic)
General Description: Determines whether the current record can be updated.
CanUpdateField(fieldName)
General Description: Determines whether a specified field can be updated.
Cleanup( )
General Description: Performs a clean up before objects are destroyed.
ClearUpdates( )
General Description: Removes pending updates to the current record that have not been sent to the server.
CopyRecord(before)
General Description: Creates a new record and copies the values of the current record into the new record.
DeleteRecord( )
General Description: Deletes the current record.
DisableNotify( )
General Description: Suspends notification messages.
EnableNotify( )
General Description: Resumes sending of notification messages.
End( )
General Description: Moves the current record to the last record.
EnumPields(first)
General Description: Iterates through the fields defined on the business component.
EnumUserProps(start)
General Description: Iterates through the user properties defined on the business component.
EnumFieldUserProps(start,fieldName)
General Description: Iterates through the user properties defined on the named field.
GetActiveFieldArray( )
General Description: Returns an array of names of currently active fields.
GetActiveRow( )
General Description: Returns the index into the working set of the current row.
GetBusObj( )
Description: Return the business object that owns the current business component.
GetFieldDef(fieldName)
General Description: Returns the field object for the named field.
GetFieldIndex(fieldName)
General Description: Returns the index into the field array and record arrays for the given field.

GetIdValue( )
General Description: Returns the row ID value for the current record.
GetFieldTotal(fieldName)
General Description: Returns the total for the named field.
GetFieldValue(fieldName)
General Description: Returns the value for the named field from the current row.
GetFormattedValue(fieldName,format)
General Description: Returns the value for the named field from the current row, formatted for the current locale settings and according to the field type.
GetLocale( )
General Description: Returns the locale object for the system.
GetName( )
General Description: Returns the name of the business component.
GetNotifyObj(ntfyId)
General Description: Returns the notification object for the given ID.
GetNumRows( )
General Description: Returns the count of the number of rows seen by the current business component.
GetParentBC( )
General Description: Returns the parent business component of the current business component, if available.
GetPickList(fieldName)
General Description: Returns the pick list object for the named field.
GetRowNum( )
General Description: Returns the row number.
GetSearchSpec( )
General Description: Returns the search specification effective for the current query.
GetFieldSearchSpec(fieldName)
General Description: Returns the search specification effective for the specified field.
GetSortSpec( )
General Description: Returns the sort specification effective for the current query.
GetUserProp(propname)
General Description: Returns the value of the named user property on the current business component.
GetFieldUserProp(fieldName,propName)
General Description: Returns the value of the named user property on the specified field.
HandleServerNotification(propSet)
General Description: Processes notification messages from the server for the current business component. This method collects additional information passed back from the server to update its internal state. It also propagates the notification messages as appropriate.
HasPickList(fieldName)
General Description: Determines whether the given field has a defined pick list.
HasFieldTotals( )
General Description: Determines whether the business component can calculates=totals for any fields.
Home( )
General Description: Sets the current row to the first row in the query.
Initialize( )
General Description: Sets up the state of the business component after it is fully loaded and before its first use.
InvokeMethod(name,inputPropSet)
General Description: Calls the named method on the current business component.
IsCurWSRecActive(ntfyId)
General Description: Determines whether the current record of this notification object is the current record in the working set of the business component.
IsCurWSRecSelected(ntfyId)
General Description: Determines whether the current record in this notification object has been selected in the business component.
IsNumRowsKnown( )
General Description: Determines whether the total number of records from the query is known.
NextRecord( )
General Description: Moves the current record in the business component to the next record in the query.
NextSet( )
General Description: Scrolls the working set down.
NewActiveRow(index)
General Description: Updates the internal state when the current row changes.
NewFieldData(fieldName,value)
General Description: Updates the internal state when a field value is changed on the server.
NewRecord(before)
General Description. Creates a new record in the business component with default field values.
PositionById(id)
General Description: Locates the record in the current query with the specified ROW-ID and make it the current record.
PriorRecord( )
General Description: Moves the current record back one row in the current query.
PriorSet( )
General Description: Scrolls the working set up.
RedoRecord( )
General Description: Re-applies changes previously removed.
RegNotifyObj(notify)
General Description: Registers a notification object with the business component.
SetActiveRow(row)
General Description: Sets the current row in the business component to the specified index into the working set.
SetBusObj(busObj)
General Description: Sets the business object that owns the current business component.
SetFieldValue(fieldName,value)
General Description: Changes the value of the specified field in the current record to the given value.
SetFormattedValue(fieldName,value,format)
General Description: Sets the value of the specified field in the current record to the given value.
SetName(name)
General Description: Sets the name of the business component.
SetParentBC(busComp)
General Description: Sets the parent business component for a child.
SetSearchSpec(spec)
General Description: Sets the search specification effective for the initial query.
SetFieldSearchSpec(fieldName,spec)
General Description: Sets the search specification effective for the specified field.
SetSortSpec(spec)
General Description: Sets the sort specification in effect for the initial query.

SetTotalsRecord(record)
General Description: Sets the record that contains the total values for the current query.
SetWorkSetSize(nthyId,size)
General Description: Sets the number of records displayed in the working set for a specified notification object.
toString( )
General Description: Returns a string that includes the name of the business component.
UndoRecord( )
General Description: Undoes all changes since the last WriteRecord( ) was invoked.
UnRegNotifyObj(ntfyId)
General Description: Removes registration of the notification object specified by the ID.
UpdateRecord( )
General Description: Puts the current record into a mode where a SetFieldValue( ) may be called.
WriteRecord( )
General Description: Sends any pending changes to the server and writes them out to the database.
WSEnd(ntfyId)
General Description: Moves the current record for the specified notification object to the end of the query.
WSGetFieldValue(ntfyId,fieldName)
General Description: Returns the field value from current record of the specified notification object.
WSGetFormattedValue(ntfyId,fieldName,format)
General Description: Returns the field value from current record for the current notification object.
WSGetBegRow(ntfyId)
General Description: Returns the row number that corresponds to the first record in the working set of the specified notification object.
WSGetCurrRow(ntfyId)
General Description: Returns the index of the current record within the specified notification object.
WSHome(ntfyId)
General Description: Moves the current record for the specified notification object to the beginning of the query.
WSNextRecord(ntfyId)
General Description: Moves the current record to the next record for the specified notification object.
WSSelectRow(ntfyId,row)
General Description: Moves the current record for the specified notification object to index specified within this working set.
WSSelectRowById(ntfyId,id)
General Description: Finds the row within this notification object by row ID and call WSSelectRow( ).
WSSetCurrRow(ntfyId,currrow)
General Description: Moves the current record for the notification object record in the query identified by the row ID.
In one embodiment, each browser-side service object can typically support the following service methods:
AddRef( )
General Description: Adds a reference to a service so that it will not be automatically released.
CanInvokeMethod(name)
General Description: Determines whether the named method can be invoked on the current service?
FindApplet(name)
General Description: Finds the named applet with the main view.
GetApplication( )
General Description: Returns a pointer to the global application object.
GetBusComp( )
General Description: Return the business associated with the current service.
GetName( )
General Description: Return the name of the current service.
InvokeMethodAsString(name,argString)
General Description: This method is generally a convenience interface to InvokeMethod( ) whenthestring is already a formatted property set. Calls InvokeMethod( ) for implementation.
Invokemethod(name,inputPropSet)
General Description: Invokes the method on the current service.
Release( )
General Description: Removes the reference created by AddRef( ) to allow the service to be released.
SetApplication(app)
General Description: Sets the application object pointer on the service.
SetBusComp(busComp)
General Description: Sets the business component with the current service.
SetName(name)
General Description: Set the name of the server during initialization. Called only by SWE.
StringToPropSet(string)
General Description: Converts the argument string into a property set
In one embodiment, each browser-side applet can typically support the following applet methods:
AddConditional(spanID, . . . )
General Description: Sets up the conditional to be implemented by the applet.
AddControl(name, . . . )
General Description: Sets up the controls on the applet.
AddMenu(menu)
General Description: Sets up the menu associated with the applet.
AddUserProp(propName,value)
General Description: Sets up the user properties for the applet.
AddControlUserProp(controlName,propName,value)
General Description: Sets up the user properties for a control.
ButtonMethod(name,inputPropSet)
General Description: This method is generally an interface to InvokeMethod( ) that first makes sure the applet is the active applet.
CallServerApplet(method,inputProps)
General Description: Forwards messages to the WE frame that corresponds to the current applet.
CanInvokeMethod(name)
General Description: Determines whether the given method can be invoked on the current applet.
DeletePopup( )
General Description: Closes a popup that is active from the current applet.
Close( )
General Description: Removes the current applet from the view. For a popup applet, restores the state in the parent applet.
Cleanup( )
General Description: Cleans up any state before an object is destroyed.
EnumUserProps(start)
General Description: Iterates through the user properties defined on the current applet.

EnumControlUserProps(start,controlName)
General Description: Iterates through the user properties on the named control.
GetBusComp( )
General Description: Returns the business component on which the current applet is based.
GetControl(controlName)
General Description: Returns the control data structure for the named control.
GetFieldControl(fieldName)
General Description: Returns the control object that sits on top of the named field.
GetFieldSorting(fieldName)
General Description: Returns the sort state for the named field.
GetId( )
General Description: Returns the ID associated with the current applet.
GetInputValue(input)
General Description: Returns the value contained in the, given INPUT (control) element.
GetInputValueByName(name)
General Description: Returns the value from the input for the named control.
GetName( )
General Description: Returns the applet name.
GetNotifyObj( )
General Description: Returns the notification object registered by the applet during initialization.
GetTitle( )
General Description: Returns the title of the applet.
GetVariable( )
General Description: Returns the HTML name of the variable that points to the current applet.
GetUserProp(propName)
General Description: Returns the value of the named user property.
GetControlUserProp(controlName,propName)
General Description: Returns the value of the named user property for the given control.
GetView( )
General Description: Returns the parent view for the current applet.
GetPopupMethod( )
General Description: Returns the internal state of the popup applet.
GetPopupControl( )
General Description: Returns the control of the popup applet. Called by JavaScript framework.
GetPopupApplet( )
General Description: Returns the internal state of the popup applet.
GetPopupBookmark( )
General Description: Returns the internal state of the popup applet.
GetParentApplet( )
General Description: Returns the parent applet of a popup applet.
Initialize( )
General Description: Sets up the state on the applet after it has been created and before it is used.
InvokeMethod(name,inputPropSet)
General Description: Invokes the specialized method on this applet. This is the primary way that specialize applets register new methods.

IsActiveApplet( )
General Description: Determines whether the current applet is the one active within the view.
LeaveField(field)
General Description: This method is typically called when focus leaves an input element that corresponds to a control.
Populate( )
General Description: Sets up all UI elements on the applet with state from the business component.
ProcessError(object)
General Description: Brings up an error dialog for the error registered on the given object.
SetAppletActive(isActive,newActiveApplet)
General Description: Sets the specified applet active or inactive. If the first argument is true, the specified applet is being made active.
SetBusComp(busComp)
General Description: Set up the business component on which the current applet is based.
SetDocument(doc)
General Description: Sets up the HTUL document object for the current applet.
SetHighlightClasses(elementID,activeClass,inactiveClass)
General Description: Sets up the state for displaying the active applet highlight.
SetId(id)
General Description: Sets the ID for the current applet to distinguish it from other applets in the view.
SetInputValue(input,value)
General Description: Sets the current value of the input element current value to a specified value.
SetName(name)
General Description: Sets the name of the applet.
SetNotifyObj(notifyObj)
General Description: Sets the given notification object as the active one for this applet.
SetTitle(title)
General Description: Sets the title of the applet.
SetPopupMethod(popupMethod)
General Description: Sets the state of the popup applet.
SetPopupControl(popupControl)
General Description: Sets the state of the popup applet.
SetPopupApplet(popupApplet)
General Description: Sets the state of the popup applet.
SetPopupBookmark(popupbookmark)
General Description: Sets the state of the popup applet.
SetparentApplet(parentApplet)
General Description: Set the parent applet of a popup applet.
SetVariable(variable)
General Description: Sets the HTML variable that refers to the applet object.
SetView(view)
General Description: Sets the parent view for the current applet.
toString( )
General Description: Returns a string that includes the applet name.
TryCondition(service,method,args)
General Description: Determines whether the given condition returns true. TryCondition( ) invokes the service method and returns the state.
UpdateConditionals( )
General Description: Re-evaluates conditionals now that some significant state has changed.
UpdateRowCounter( )
General Description: Re-generates the row counter string and updates the displayed row counter.

Command Manager

Figure 16:
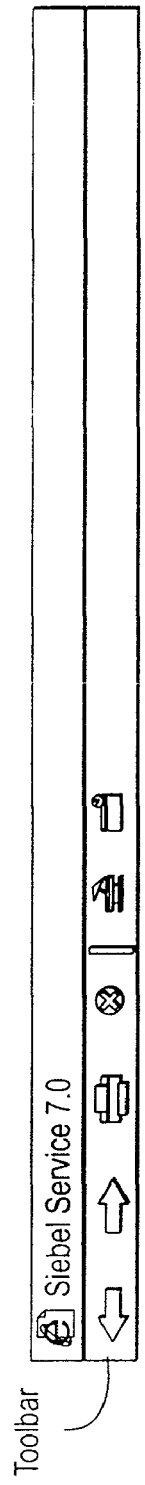
FIGS. 16, 17, and 18 illustrate examples of toolbars, application-level menus, and applet-level menus, respectively.
Figure 17:
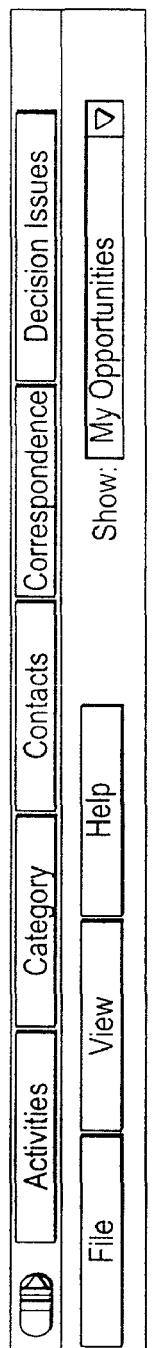
Figure 18:
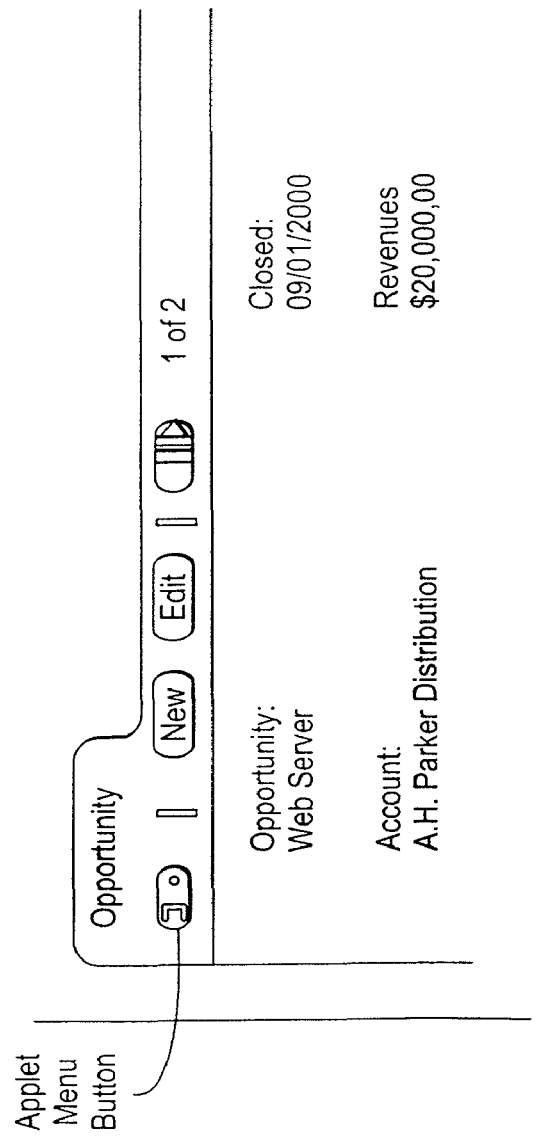

In one embodiment, various user interface items or controls such as toolbars, menus, keyboard controls (also called keyboard shortcuts or keyboard accelerators herein), etc. are used to provide the means for the user to initiate various actions or commands. In one embodiment, toolbars may be designed and configured to appear in their own frame near the top of the application in the browser window, and the application menus (e.g., File, View and Help, etc.) may be designed and configured to appear beneath the primary tab (e.g., 1st level navigation) bar. In one embodiment, the applet-level menus can be invoked from the applet menu button, in the control banner at the top of an applet. FIGS. 16, 17, and 18 illustrate examples of toolbars, application-level menus, and applet-level menus, respectively. In one embodiment, each user interface item or object in a toolbar, application-level menu, applet-level menu, or a particular keyboard shortcut or keyboard accelerator (e.g., CRTL+N) can be configure to be associated or mapped to a particular command to be executed in response to the user's selection or activation of the respective user interface item (e.g., clicking on a menu item, pressing a keyboard combination such as CTRL+N, etc.). In one embodiment, each command can be defined and configured to invoke one or more particular methods to perform one or more particular functions or actions requested by the user. In one embodiment, a data structure referred to herein as a command object can be defined and configured to represent a particular command the execution of which may result in the invocation of one or more particular methods associated with the respective command object. Command objects are described in more details below.

In one embodiment, a selection or activation of a toolbar icon or menu item (e.g., user's clicking on a toolbar icon or menu item, etc.) is normally translated into a call to an invoke method, which may reside in a service on the browser or server, or in classes in the browser application or server infrastructure (e.g., applet or business component classes, SWE frame manager, or model, etc.). In one embodiment, a user interface item such as a toolbar icon, a menu item, or a keyboard shortcut may be configured to target a method name, a method handler (from which it may be automatically re-targeted if not found), and optionally a service.

In one embodiment, application-level items (which may include both toolbar icons, application-level menus, and keyboard shortcuts, etc.) can be implemented through the use of command object definitions in Tools, which are then mapped to Toolbar Item or Menu Item object definitions. In one embodiment, applet-level menus do not utilize command object definitions, but the set of properties used for targeting and invoking the corresponding method are similar to those found in the command object type.

In one embodiment, in the web engine templates, the toolbar tag can be used to specify a named toolbar (where the name corresponds to the Name property in the Toolbar object definition in the repository), and the toolbaritem tag between the toolbar start and end tags recursively retrieves all of the toolbar items for that toolbar from the repository.

In one embodiment, a design-time menu activation/suppression feature is provided for applet-level menus. This feature provides the capability to make a menu item available globally for applets of a given class and its subclasses, and then suppress it in particular applets where it is not desired. In one embodiment, the design-time menu activation/suppression feature can be implemented using the Class Method Menu Item object type, which can be used to implement the menu item in the applet-level menu of all applets of the specified applet class, except where suppressed as defined by the Suppress Menu Item property. Applet method menu item, class method menu item, and the suppression of menu item are described in greater details below.

Figure 19:
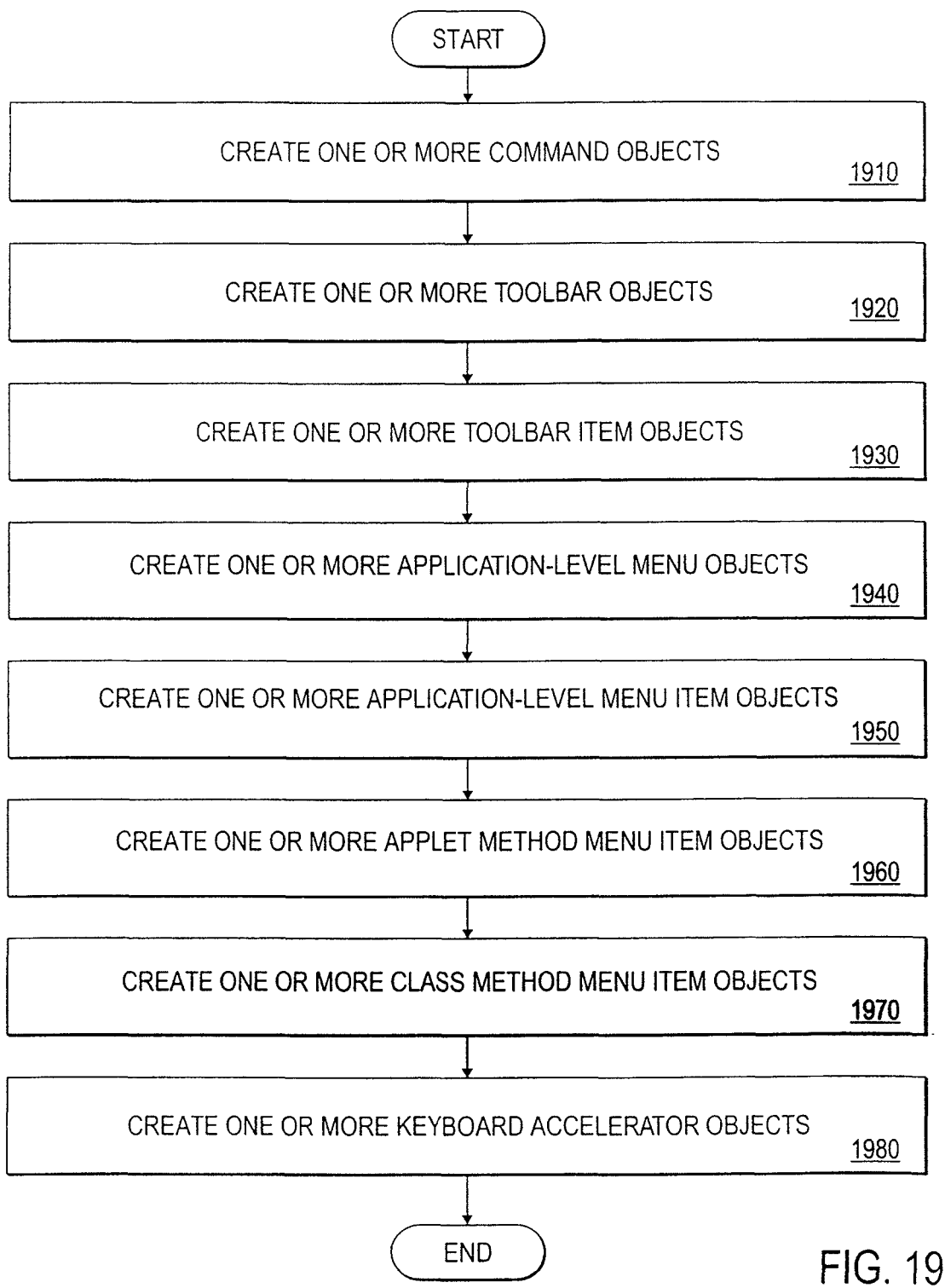
FIG. 19 shows a flow diagram of one embodiment of a process for creating various objects that are used for the configuration and execution of the various commands.

FIG. 19 shows a flow diagram of one embodiment of a process 1900 for creating various objects that are used for the configuration and execution of the various commands. As shown in FIG. 19, the process may include the following actions:

Creating one or more command objects (at block 1910)
Creating one or more toolbar objects (at block 1920)
Creating one or more toolbar item objects (at block 1930)
Creating one or more application-level menu objects (at block 1940)
Creating one or more application-level menu item objects (at block 1950)
Creating one or more applet method menu item objects (at block 1960)
Creating one or more class method menu item objects (at block 1970)
Creating one or more keyboard accelerator objects, also called keyboard shortcuts, shortcut keys herein (at block 1980)

Figure 20:
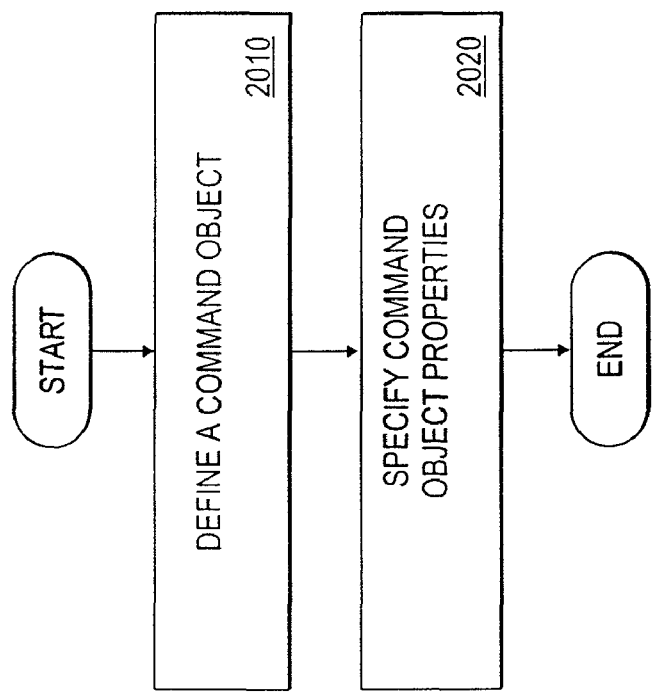
FIG. 20 shows a flow diagram of one embodiment of a process for creating a command object in accordance with the teachings of the present invention.

FIG. 20 shows a flow diagram of one embodiment of a process 2000 for creating a command object in accordance with the teachings of the present invention. Creating a command object can generally include defining a command object definition (at block 2010) and specifying the properties associated with the defined command object (at block 2020).

Figure 21:
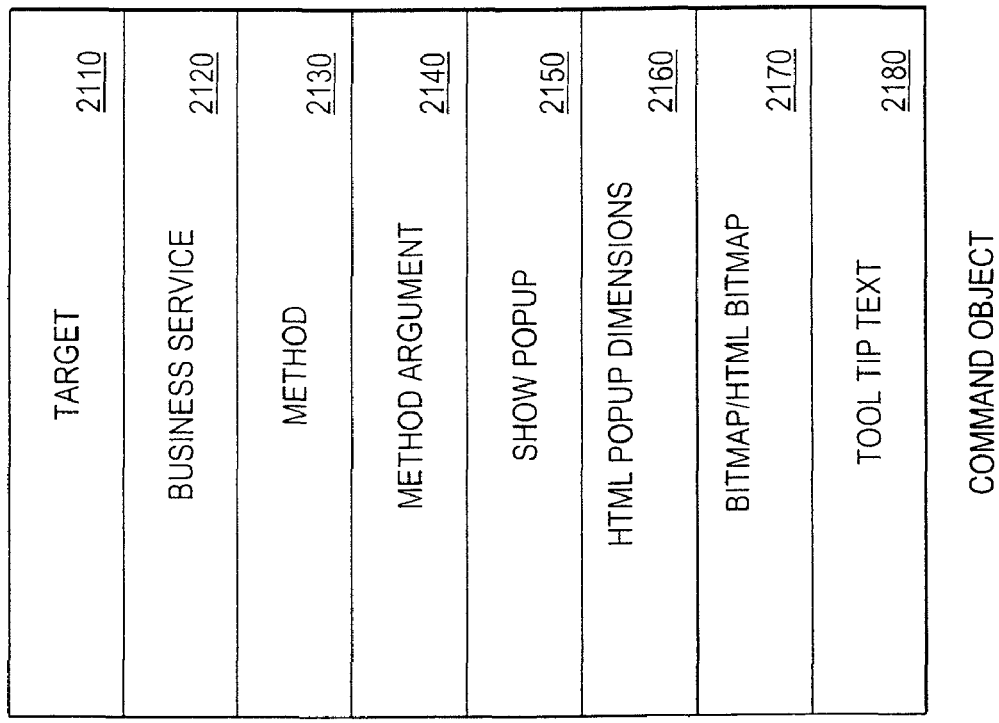
FIG. 21 illustrates one embodiment of the properties of a command object according to the teachings of the present invention.

FIG. 21 illustrates one embodiment of the properties of a command object according to the teachings of the present invention. In one embodiment, a command object may include the following properties: Target 2110, Business Service 2120, Method 2130, Method Argument 2140, Show Popup 2150, HTML Popup Dimensions 2160, Bitmap/HTML Bitmap 2170, and Tooltip Text 2180. Command objects and their properties are described in more details below.

In one embodiment, a command object definition is created and configured to specify which invoke method is called when a toolbar icon or application-level menu item associated with the command is executed. Furthermore, a command object definition may be used to specify which bitmap appears on the toolbar icon for toolbar items. In one embodiment, command object definitions are referenced by Toolbar Item or Menu Item object definitions. As illustrated in FIG. 21, a Command object definition generally has the following properties:

Target property 2110 generally specifies which entity handles the invoke method the command calls. In one embodiment, available options are the following:
  Browser: in this case, the method handler can be a JavaScript service on the browser, or the JavaScript application, depending on whether or not a service is specified in the Business Service property.
  Server: in this case, the method handler can be an object manager service on the server, or the object manager infrastructure (e.g., the SWE UDF loader, or secondarily the model), depending on whether or not a service is specified in the Business Service property.
Business Service property 2120 generally specifies the service (either on the browser or server, depending on the Target property) that handles the invoke method. In one embodiment, if the property is left blank, the browser or server infrastructure is targeted rather than a specific service. In one embodiment, if a service is specified, it handles CanInvokeMethod and InvokeMethod for the method specified in the Method property.

Method property 2130 generally is used to specify the name of the method to invoke when a user interface item (e.g., the menu item, toolbar icon, etc.) is selected. In one embodiment, this property is a required property.

Method Argument property 2140 generally is used to provide a mechanism to pass an argument to the invoke method specified in the Method property. For example, a command item that opens a new window and navigates to a URL in that window can specify the GotoURL method in Method property and the URL to navigate to in the Method Argument property.

Show Popup property 2150. In one embodiment, this property is set to TRUE to specify that a new browser window is opened before invoking the method. It is set to FALSE to specify that the method is invoked in the current browser window.

HTML Popup Dimensions property 2160. In one embodiment, this property is used to specify the dimensions, in pixels, of the popup window, when Show Popup property 2150 is TRUE. An example is 640×480 (specified with the "x" and without blank spaces).

Bitmap/HTML Bitmap property 2170.

Tooltip Text property 2180. In one embodiment, this property is used to specify the tooltip text which appears when the cursor lingers on a toolbar icon. In one embodiment, for built-in methods, the tooltip text should be left blank which indicates that the method will dynamically supply the text, and language localization takes place as a part of this process. For developer-defined methods, literal text can be entered for this property. In one embodiment, when the literal text is entered for this property, it turns off language localization for this tooltip text.

Figures 22, 23:
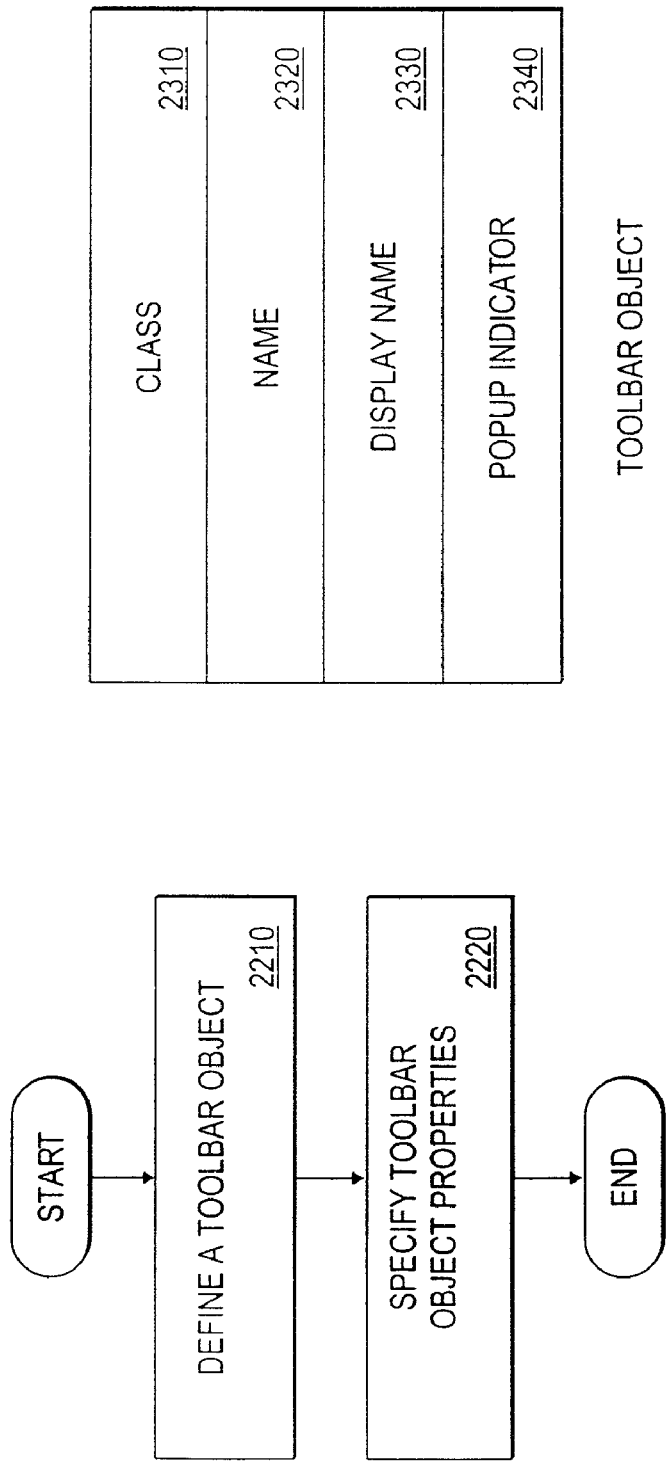
FIG. 22 shows a flow diagram of one embodiment of a process for creating a toolbar object in accordance with the teachings of the present invention.
FIG. 23 illustrates one embodiment of the properties of a Toolbar object according to the teachings of the present invention.

FIG. 22 shows a flow diagram of one embodiment of a process 2200 for creating a toolbar object in accordance with the teachings of the present invention. Creating a toolbar object can generally include defining a toolbar object (at block 2210) and specifying the properties associated with the defined toolbar object (at block 2220).

FIG. 23 illustrates one embodiment of the properties of a Toolbar object according to the teachings of the present invention. In one embodiment, a Toolbar object may include the following properties: Class 2310, Name 2320, Display Name 2330, and Popup Indicator Bitmap 2340. Toolbar objects and their properties are described in more details below.

In one embodiment, for each toolbar in the application, a Toolbar object definition can be created in the Object List Editor. This provides a named toolbar that the user can activate or deactivate in various applications, and to which toolbar icons (e.g., Toolbar Item object definitions) can be associated or removed. Toolbar functionality for applications can be implemented using HTML toolbars. In one embodiment, in an HTML toolbar, the buttons are static images, which may be dimmed to indicate unavailability, but otherwise are not manipulated by program logic on the browser. In contrast, CTI (computer telephony integration) applications may require toolbar icons that can be altered in response to events, such as blinking a particular toolbar icon when a call is incoming. In one embodiment, this may require the use of Java toolbars. In one embodiment, to specify that a toolbar is of the Java type, a class name is entered in the Class property. As shown in FIG. 23, a toolbar object may include the following properties:

Class property 2310. In one embodiment, this property is left blank for an HTML toolbar and specified for a Java toolbar (e.g., the name of the Java class that implements the toolbar is entered).

Name property 2320. In one embodiment, this property is referenced by other object definitions, and by the toolbar tag in the "name=" clause.

Display Name property 2330. In one embodiment, this property is used for the History button and to show or hide toolbars by name.

Popup Indicator Bitmap property 2340. In one embodiment, this property is used to specify a sideways toolbar popup.

Figure 24:
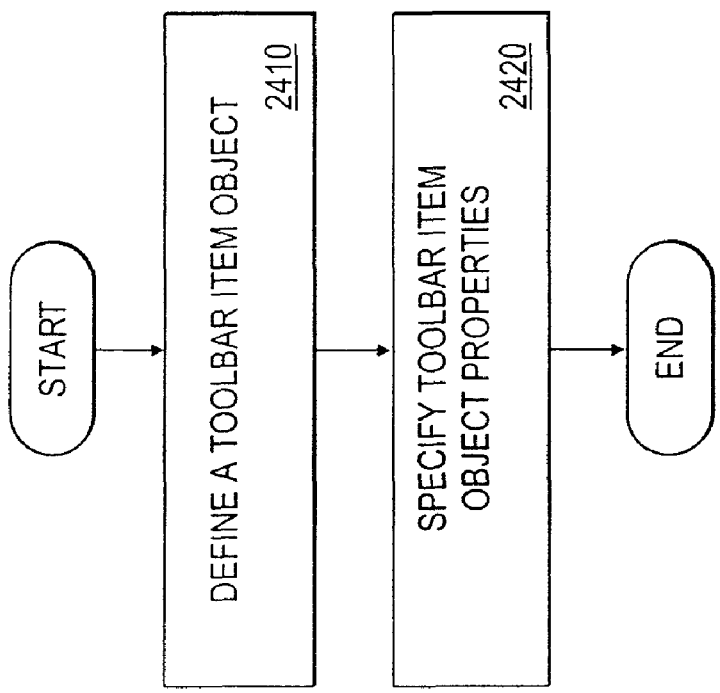
FIG. 24 shows a flow diagram of one embodiment of a process for creating a toolbar item object in accordance with the teachings of the present invention.

FIG. 24 shows a flow diagram of one embodiment of a process 2400 for creating a toolbar item object in accordance with the teachings of the present invention. Creating a toolbar item object can generally include defining a toolbar item object (at block 2410) and specifying the properties associated with the defined toolbar item object (at block 2420).

Figure 25:
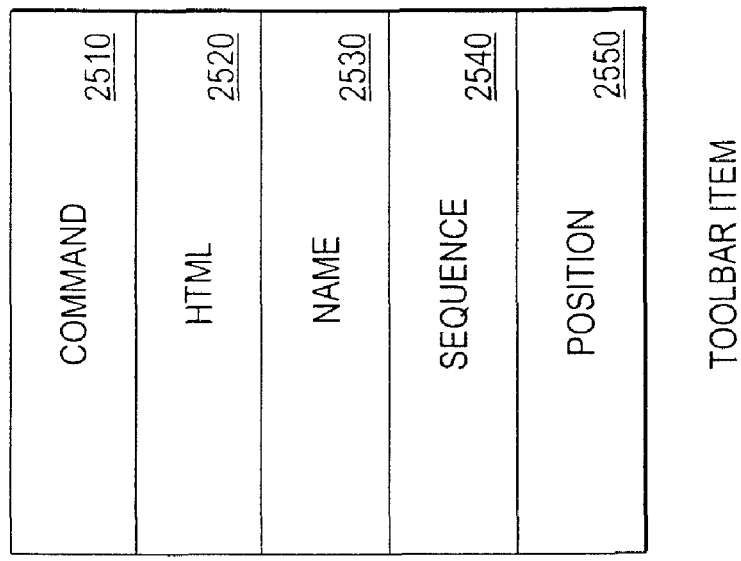
FIG. 25 illustrates one embodiment of the properties of a toolbar item object according to the teachings of the present invention.

FIG. 25 illustrates one embodiment of the properties of a toolbar item object according to the teachings of the present invention. In one embodiment, a toolbar item object may include the following properties: Command property 2510, HTML Type property 2520, Name property 2530, Sequence property 2540, and Position property 2550. Toolbar item objects and their properties are described in more details below.

In one embodiment, a Toolbar Item object is defined and configured to associate a Command object definition (which is identified by name as a property in the Command property of the toolbar item object) with a Toolbar object definition (which is the parent of the Toolbar Item object). In one embodiment, this association places a toolbar icon whose bitmap image, invoke method and target are specified in the Command object definition, on the specified toolbar in a given location (e.g., a position relative to the other toolbar icons on that toolbar). In one embodiment, as illustrated in FIG. 25, a toolbar item object may be defined to include the following properties:

Command property 2510. In one embodiment, this property specifies the name of the Command object definition that is to provide the bitmap, method and target for the respective toolbar item. In one embodiment, one or more hyphens can be specified instead of the name of a Command object to tell the system to insert a separator there between icons.

HTML Type 2520. In one embodiment, this property is used to identify the type of control to be displayed in the corresponding toolbar in the browser. In one embodiment, various options may include ComboBox, Button, Edit, Label, Hyperlink, MiniButton and Timer, etc.

Name property 2530. In one embodiment, this property specifies the name of the Toolbar Item. In one embodiment, the name property needs to be unique within the scope of a toolbar.

Sequence property 2540. In one embodiment, this property specifies an integer that orders the toolbar item in the parent toolbar from left to right. For example, a higher sequence number relative to other toolbar items places this icon further to the right than the others.

Position property 2550. In one embodiment, this property is used for sideways toolbars. For example, a value of 0.1, 0.2, etc. can be used.

In one embodiment, a menu object can be defined and configured for each application-level menu. In one embodiment, a menu object is considered a parent of corresponding menu item objects. A menu item object is used to define an application main menu or menu item within the parent menu object definition.

Figure 26:
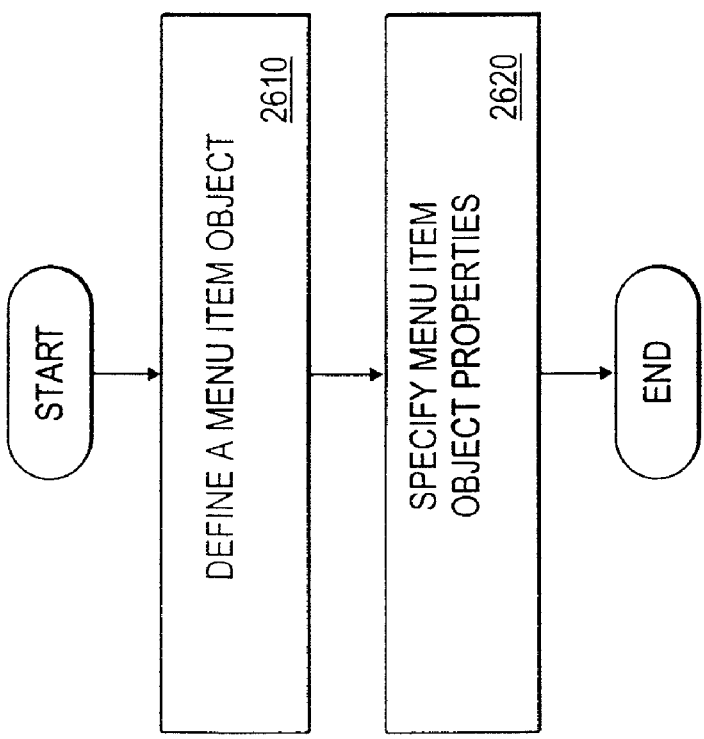
FIG. 26 shows a flow diagram of one embodiment of a process for creating a menu item object in accordance with the teachings of the present invention.

FIG. 26 shows a flow diagram of one embodiment of a process 2600 for creating a menu item object in accordance with the teachings of the present invention. Creating a menu item object can generally include defining a menu item object (at block 2610) and specifying the properties for the defined menu item object (at block 2620).

Figure 27:
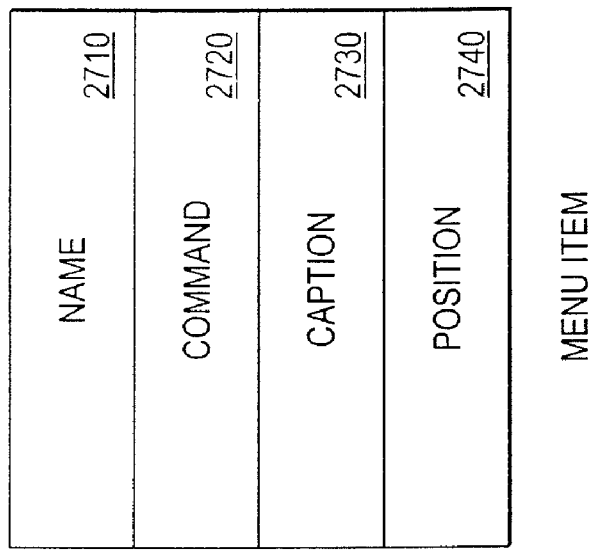
FIG. 27 illustrates one embodiment of the properties of a menu item object according to the teachings of the present invention.

FIG. 27 illustrates one embodiment of the properties of a menu item object according to the teachings of the present invention. In one embodiment, a menu item object may include the following properties: Name property 2710, Command property 2720, Caption property 2730, and Position property 2740. These properties are described in more details below:

Name property 2710. In one embodiment, this property is used to uniquely identify the menu or menu item.

Command property 2720. In one embodiment, this property specifies the name of the corresponding Command object definition that is used to provide the method and target for the respective menu item.

Caption property 2730. In one embodiment, this property specifies the text that is displayed in the menu or menu item.

Position property 2740. In one embodiment, this property specifies the position of the menu or menu item in the menu tree. For example, the top-level positions, for menus (rather than items within them) can be single integers such as 1, 2, and 3 (or 10, 20 and 30). Position values for menu items (e.g., 2nd level and below in the menu tree) can be specified using a dot notation, where the value to the right of the rightmost dot specifies the order of the item on its level, and the value or values to the left of that dot specify the parent menu or menu item. For example, 3.1 can be defined as the first item in the submenu of the third item of the top-level menu. It should be noted that values on a level are not required to be consecutive—for example, the values 1110, 1115, 1120 and 1130 may be used to indicate four menu items on the same level and their sequence determines their order of display in the menu.

Figure 28:
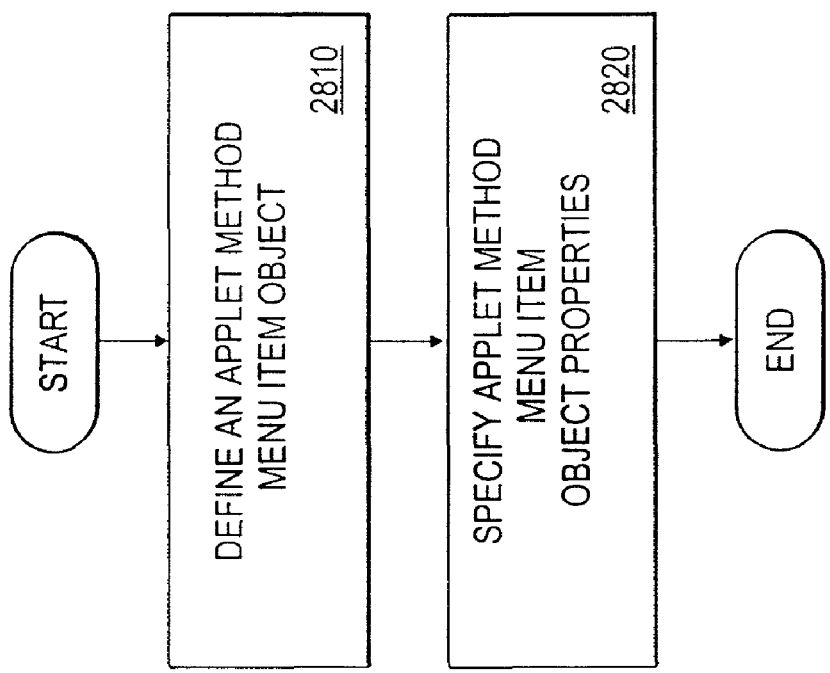
FIG. 28 shows a flow diagram of one embodiment of a process for creating an applet method menu item object in accordance with the teachings of the present invention.

In one embodiment, an applet method menu item object is used to define a menu item in the applet-level menu for the parent Applet object definition. In one embodiment, unlike application-level menus, applet menus are not based on Command objects. However, the set of properties used for targeting the method are similar to those found in the command object type. FIG. 28 shows a flow diagram of one embodiment of a process 2800 for creating an applet method menu item object in accordance with the teachings of the present invention. Creating an applet method menu item object can generally include defining an applet method menu item object (at block 2810) and specifying the properties for the defined applet method menu item object (at block 2820).

Figure 29:
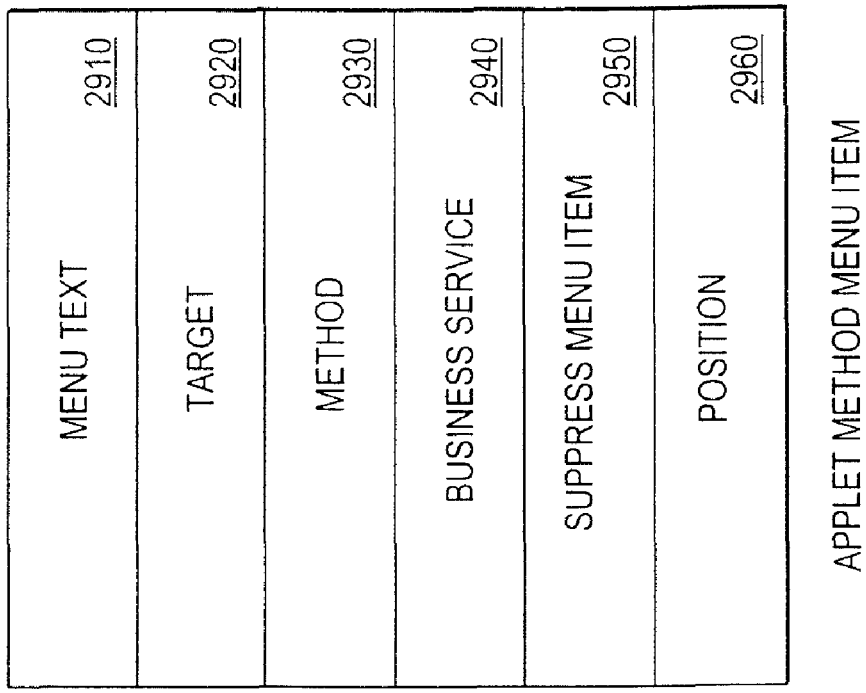
FIG. 29 illustrates the properties of an applet method menu item object according to one embodiment of the present invention.

FIG. 29 illustrates the properties of an applet method menu item object according to one embodiment of the present invention. In one embodiment, an applet method menu item object may include the following properties: Menu Text property 2910, Target property 2920, Method property 2930, Business Service property 2940, Suppress Menu Item property 2950, and Position property 2960. These properties are described in more details below.

Menu Text property. In one embodiment, this property is used to specify the text displayed in the menu item.

Target property. In one embodiment, this property is used to specify which entity handles the invoke method specified in the Method property. In one embodiment, the following options are available:

Browser. In this case, the method handler can be a JavaScript service on the browser, or the JavaScript applet class (or secondarily the JavaScript business component class) on the browser, depending on whether or not a service is specified in the Business Service property.

Server. In this case, the method handler can be an object manager service on the server, or the applet and business component and their superclasses, depending on whether or not a service is specified in the Business Service property.

Method property. In one embodiment, this property is used to specify the method to be invoked when the corresponding menu item is selected.

Business Service property. If specified, this property identifies the service on which to invoke the specified method. If unspecified, the specified method is invoked on the applet class on the browser or server (as specified in the Target property) with subsequent retargeting if unhandled.

Suppress Menu Item property. In one embodiment, the default for this property is set to FALSE. If this property is set to TRUE, it causes the class-level menu item of the specified name to be removed from the applet-level menu in the applet where this property is specified.

Position property. In one embodiment, this property is used to specify the sequence of the menu item in the single-level list of menu items.

Figures 30, 31:
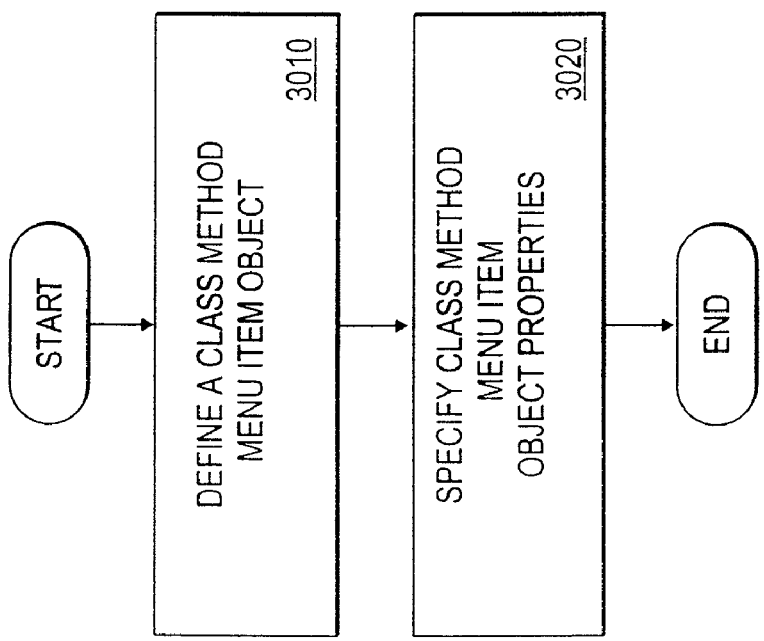
FIG. 30 shows a flow diagram of one embodiment of a process for creating a class method menu object in accordance with one embodiment of the present invention.
FIG. 31 illustrates properties of a class method menu item according to one embodiment of the present invention.

FIG. 30 shows a flow diagram of one embodiment of a process 3000 for creating a class method menu object in accordance with one embodiment of the present invention. In one embodiment, a class method menu item can be defined and configured to add or suppress a menu item on applet-level menus for all applets of the specified applet class and its subclasses. Creating a class method menu item object can generally include defining a class method menu item object (at block 3010) and specifying the properties for the defined class method menu item object (at block 3020).

FIG. 31 illustrates properties of a class method menu item according to one embodiment of the present invention. In one embodiment, a class method menu item object may include the following properties: Target property 3110, Menu Text property 3120, Method property 3130, Business Service property 3140, Suppress Menu Item property 3150, and Position property 3160. These properties are described in more details below.

Target property. In one embodiment, this property is used to specify which entity handles the invoke method specified in the Method property. In one embodiment, the following options are available:

Browser. In this case, the method handler can be a JavaScript service on the browser, or the JavaScript applet class (or secondarily the JavaScript business component class) on the browser, depending on whether or not a service is specified in the Business Service property.

Server. In this case, the method handler can be an object manager service on the server, or the applet and business component and their superclasses, depending on whether or not a service is specified in the Business Service property.

Menu Text property. In one embodiment, this property is used to specify the text displayed in the menu item.

Method property. In one embodiment, this property is used to specify the method to be invoked when the corresponding menu item is selected.

Business Service property. If specified, this property identifies the service on which to invoke the specified method. If unspecified, the specified method is invoked on the applet class on the browser or server (as specified in the Target property) with subsequent retargeting if unhandled.

Suppress Menu Item property. In one embodiment, the default for this property is set to FALSE. If this property is set to TRUE, it causes the applet-level menu items of the specified name to be removed from the applet-level menu in all applets derived from this class and its subclasses.

Position property. In one embodiment, this property is used to specify the sequence of the menu item in the single-level list of menu items.

Figure 32:
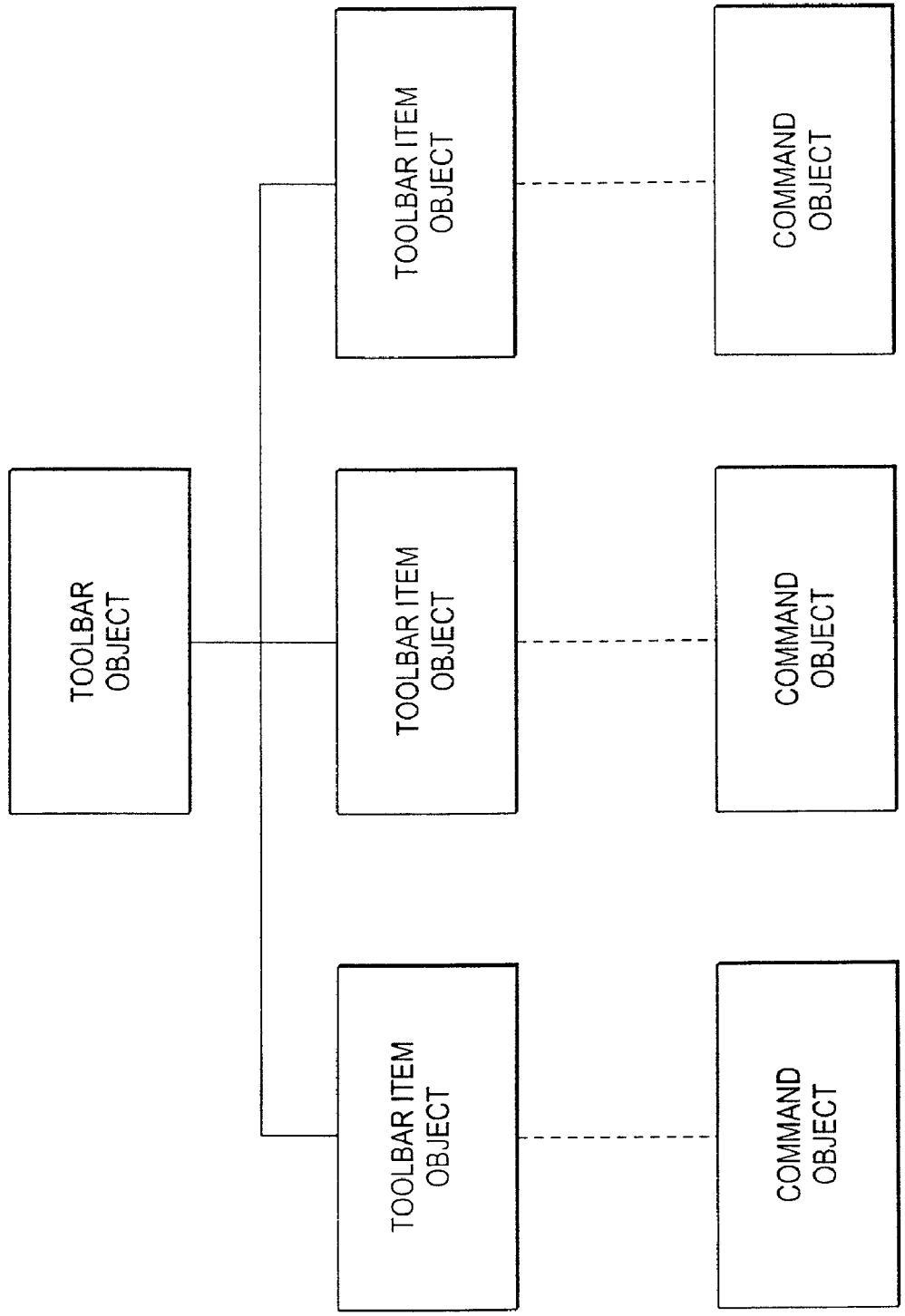
FIG. 32 is a diagram illustrating the relationship between toolbar objects, toolbar item objects, and command objects in accordance with one embodiment of the present invention.
Figure 33:
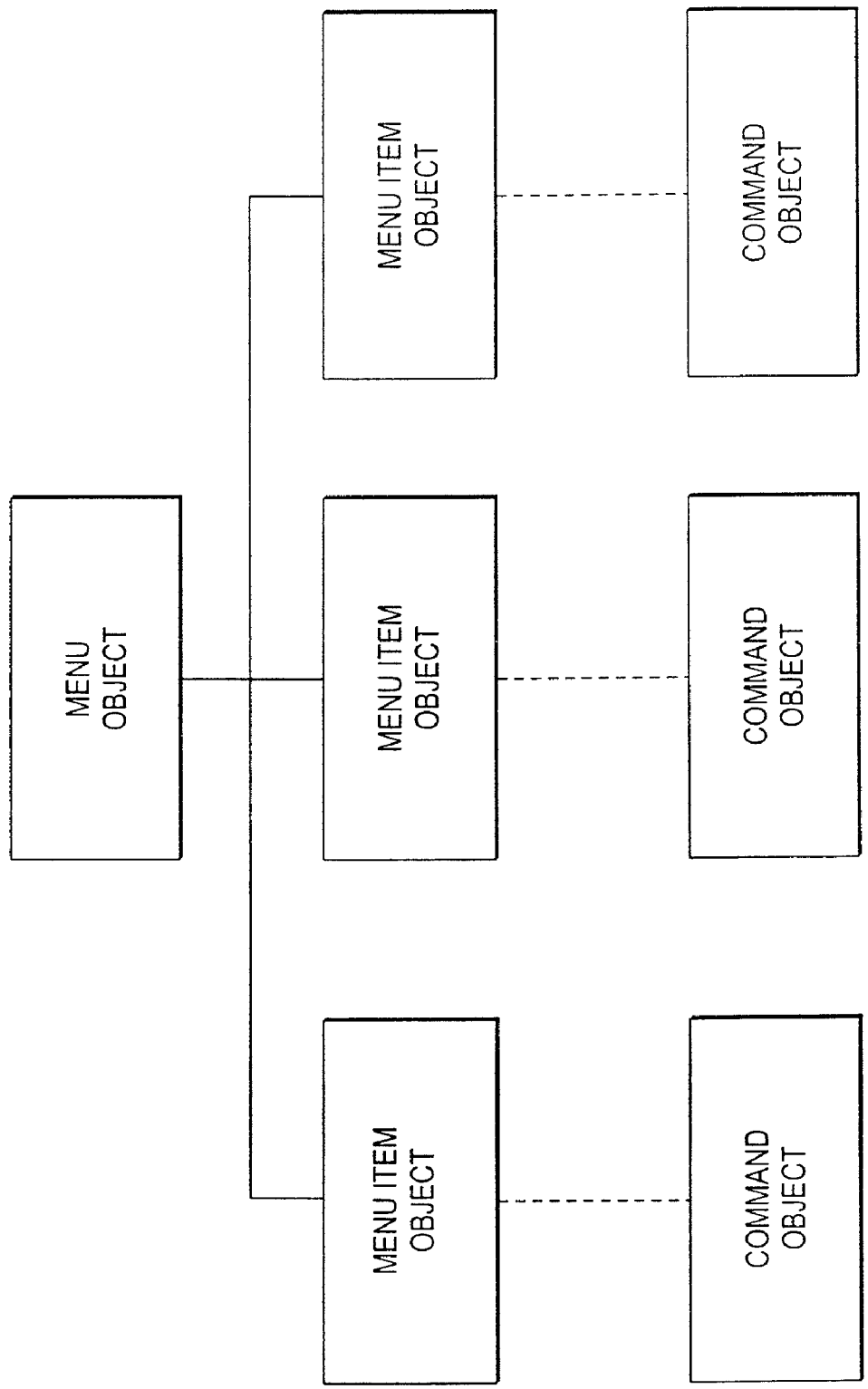
FIG. 33 is a diagram illustrating the relationship between a menu object, menu item objects, and command objects.

FIG. 32 is a diagram illustrating the relationship between toolbar objects, toolbar item objects, and command objects in accordance with one embodiment of the present invention. As shown in FIG. 32, a toolbar object as described herein can generally be associated to one or more toolbar item objects. In one embodiment, each toolbar item object can be associated or mapped to a corresponding command object (e.g., by using the command property of the respective toolbar item object). In other words, a command object can be referenced by a toolbar item object using the command property of the toolbar item object to specify the name of the command object as described above FIG. 33 is a diagram illustrating the relationship between a menu object, menu item objects, and command objects. As shown in FIG. 33, a menu object as described herein can generally be associated to one or more menu item objects. In one embodiment, each menu item object can be associated or mapped to a corresponding command object (e.g., by using the command property of the respective menu item object). In other words, a command object can be referenced by a menu item object using the command property of the menu item object to specify the name of the command object as described above.

Figure 34:
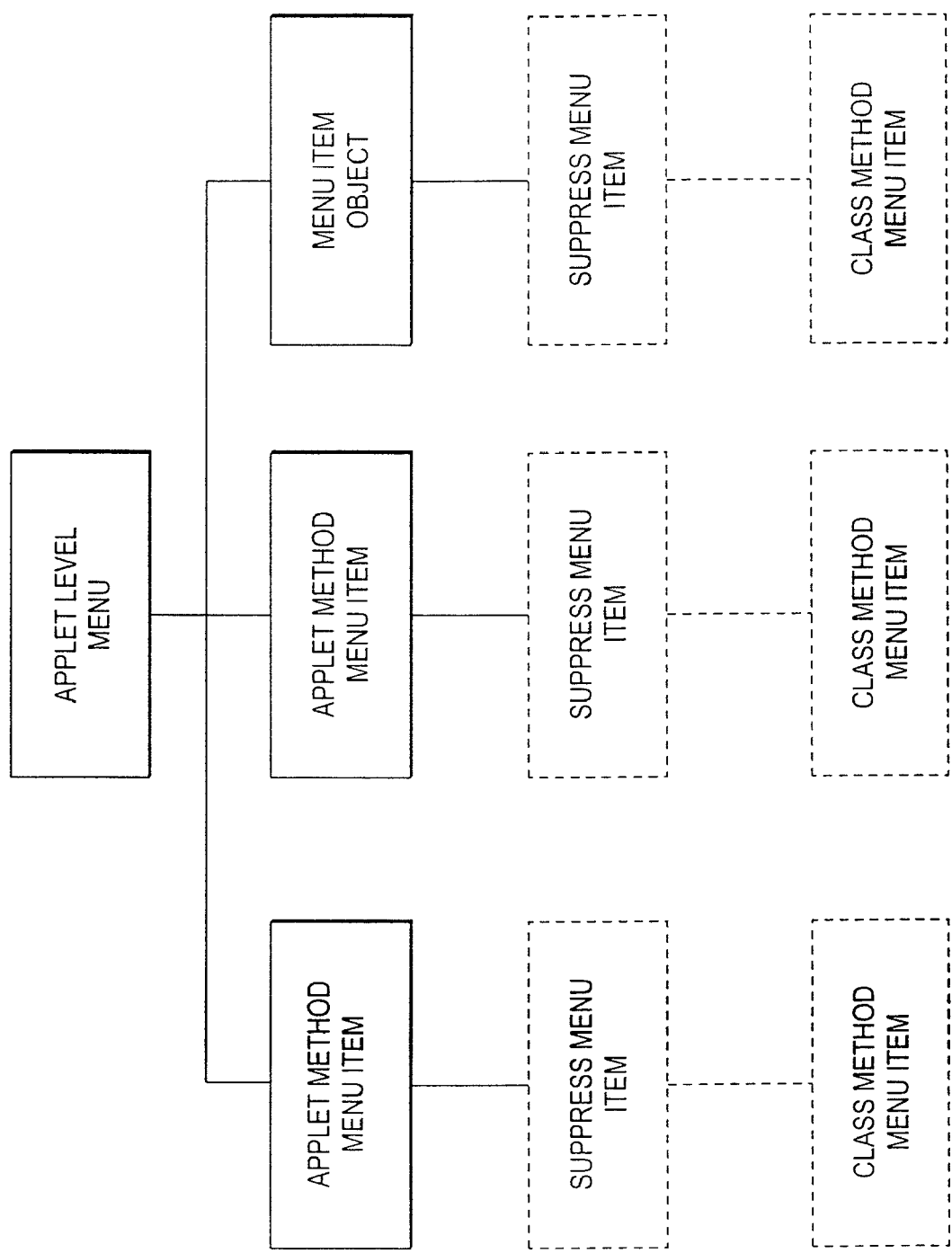
FIG. 34 is a diagram illustrating the relationship between an applet level menu object, applet method menu item objects, and class method menu item objects.

FIG. 34 is a diagram illustrating the relationship between an applet level menu object, applet method menu item objects, and class method menu item objects. As shown in FIG. 34, an applet level menu can generally be associated to one or more applet method menu item objects. In one embodiment, each applet method menu item object can be associated or mapped to a class method menu item object (e.g., by using the Suppression Menu Item property as described herein).

Menu Item and Toolbar Item Activation and Suppression

In one embodiment of the present invention, menu items (e.g., both application-level and applet-level) and toolbar items can be enabled or disabled at runtime, by using the CanInvokeMethod mechanism. In one embodiment, CanInvokeMethod (for the method specified in the Command, Applet Method Menu Item or Class Method Menu Item object, etc.) will be called automatically for each item prior to displaying the menu or toolbar. If CanInvokeMethod returns FALSE, the toolbar item or menu item disabled (e.g., is not displayed). The CanInvokeMethod logic generally is retargeted from the browser application to the applet class hierarchy on the server, and from there to the business component class hierarchy. The targeting sequence is described in more details below.

As described herein, in one embodiment, suppression and activation of individual applet-level menu items at design time is supported by using the Suppress Menu Item property in the Class Method Menu Item and Applet Method Menu Item object types. In one embodiment, this mechanism or feature is applicable to applet-level menus, not application-level menus or toolbars, in which the item is added or removed explicitly. Design-time menu activation/suppression for applet-level menus provides the mechanism to make a menu item available globally for applets of a given class and its subclasses, and then suppress it in particular applets where it is not desired. For example, various applet-level menu items appear in virtually all applets (such as Copy, Edit and Delete, etc.), others appear in virtually all list applets (such as Columns Displayed), and so on, but there can be some cases in which a "standard" menu item for the applet's class needs to be suppressed for a specific applet.

In one embodiment, to add applet-class-level menu items, a Class Method Menu Item is added for a standard menu item for a given applet class. In one embodiment, this menu item would not need to be re-included as Applet Method Menu Item object definitions in applets in which the menu item is to appear. In one embodiment, Applet Method Menu Item object definitions are created in two circumstances: to add a menu item (not already provided by the applet's class) to the applet, or to suppress display of an applet-class-level item that the applet would normally inherit. In the latter case, an Applet Method Menu Item object definition is created with the same name as the applet-class-level menu item which is to be suppressed, and a value of FALSE is entered for the Suppress Menu Item property.

Invoke Method Targeting

According to one embodiment of the present invention as described herein, the Method, Business Service and Target properties are included in the Command object type (for use in toolbars and application-level menus) and in the Class Method Menu Item and Applet Method Menu Item object types (for use in applet-level menus). In one embodiment, two settings or options are available for the Target property, with the following behavior:

Browser target: the method handler for this target can be the JavaScript application, a JavaScript applet, or a JavaScript service, on the browser side. In one embodiment, regardless of which entity is the method handler, a method name needs to be specified in the Method property. In one embodiment, a service is targeted if a service name is specified in the Service property. If a service is not specified in the Service property, method handling differs based on whether the calling entity is application-level or applet-level, as follows:

Application-level: targets to the specified method in the JavaScript application. There is no retarget in this case.

Applet-level: targets to the specified method in the JavaScript applet. If not handled, retargets to the specified method in the corresponding JavaScript business component. There is no inheritance or additional retargeting in this case.

Server target: this target is for invoking a method on a server (e.g., a method in a C++ class on the server), either on a service or on the infrastructure. If a Service property value is not specified, the invoke method is targeted to the infrastructure. It will target the infrastructure differently depending on whether the menu or toolbar icon invoking the method is applet-level (menu only) or application-level (menu or toolbar), as follows:

Application-level: the method handler is initially the SWE UDF loader on the server side, and secondarily the model.

Applet-level: the method handler is initially the applet class to which the applet belongs, and is retargeted successively up through the applet class hierarchy to CSSSWEFrame. If still unhandled, handling is retargeted to the business component class of the applet's business component, and successively upwards through the business component class hierarchy to CSSBusComp.

If a service is specified in the Service property, the method handler is the specified service. This targeting is also dependent on whether the calling menu item or toolbar icon is applet-level or application-level, as follows:

Application-level: the method handler is the specified OM service. There is no retarget in this case.

Applet-level: the method handler performs a SetBC call to set to the business component of the applet, and then calls the specified OM service. There is no retarget in this case.

The following matrix or table illustrates the results of the possible settings of the Target and Business Service properties at the applet and application levels, in accordance with one embodiment of the present invention:

| Toolbar/<br>Menu Level | Target | Service | Result |
| --- | --- | --- | --- |
| Application-level | Server | specified | The method handler is the specified OM service. It does not retarget. |
| | | unspecified | The method handler is initially the SWE UDF loader on the server side, and secondarily the model. |
| | Browser | specified | Targets to the method in the specified browser-side service. Does not retarget. |
| | | unspecified | Targets to the specified method in the JavaScript application. Does not retarget. |
| Applet-level | Server | specified | The method handler performs a SetBC call to set the business component of the service to the business component of the applet, and then calls the specified OM service. It does not retarget. |
| | | unspecified | The method handler is initially the applet class to which the applet belongs, and is retargeted successively up through the applet class hierarchy to CSSSWEFrame. If still unhandled, handling is retargeted to the business component class of the applet's business component, and successively upwards through the business component class hierarchy to CSSBusComp. |
| | Browser | specified | Targets to the method in the specified browser-side service. Does not retarget. |
| | | unspecified | Targets to the specified method in the JavaScript applet. If not handled, retargets to the specified method in the corresponding JavaScript business component. No inheritance or additional retargeting. |

Figure 35:
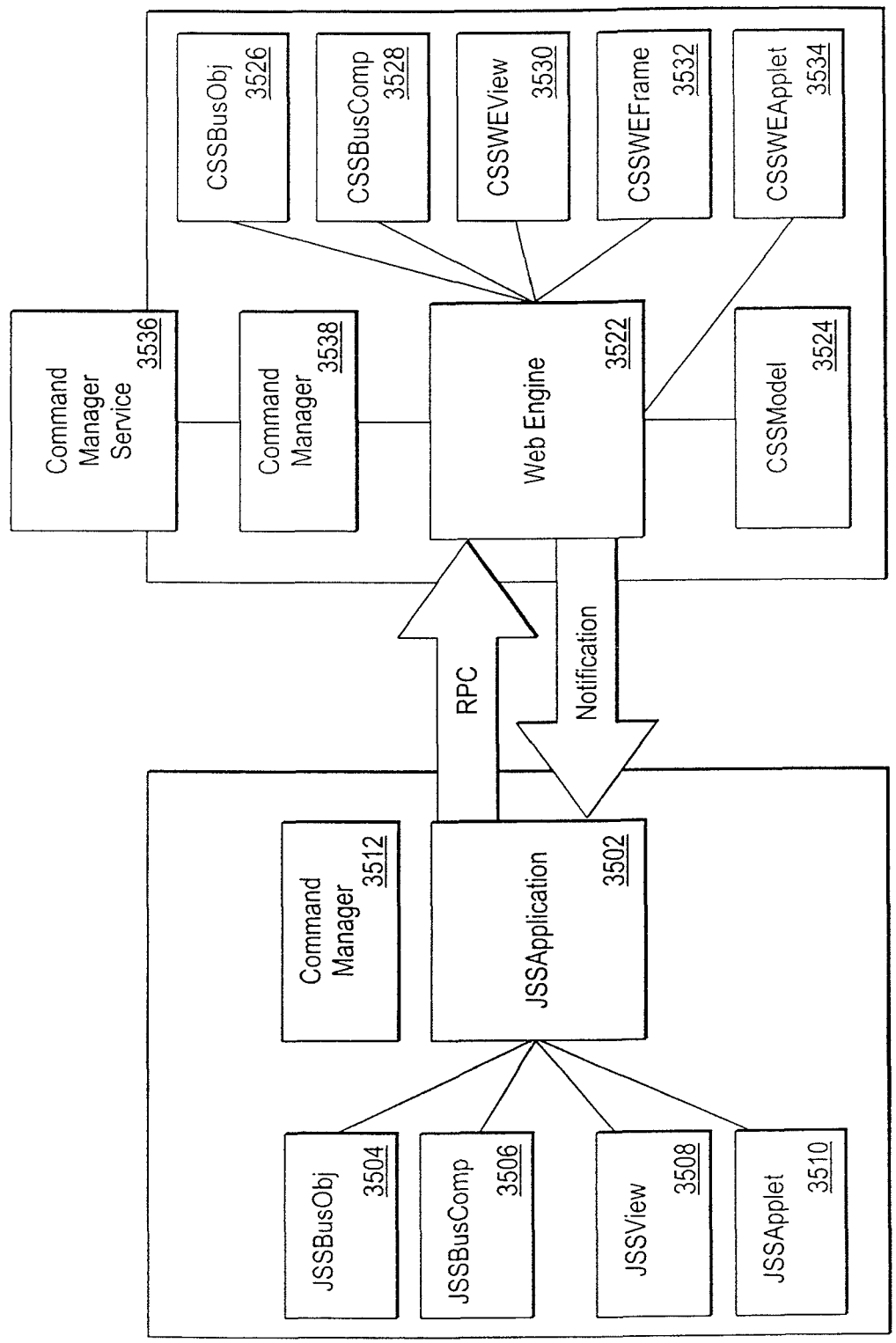
FIG. 35 illustrates a block diagram of one embodiment of a system configuration 3500 in which the teachings of the present invention may be implemented.

FIG. 35 illustrates a block diagram of one embodiment of a system configuration 3500 in which the teachings of the present invention may be implemented. The system configuration 3500 includes a client-side command manager that is configured to manage the processing of various commands that are initiated by a user of the system, based upon the information that are specified in the properties associated with the respective commands. As shown in FIG. 35, the system configuration further includes, on the server side, a command manager service and a server-side command manager. In one embodiment, the command manager service is configured to receive from the client-side command manager those commands that are targeted for the server. In one embodiment, the command manager service acts as a focal point for receiving and forwarding the received commands to the server-side command manager. In one embodiment, the server-side command manager is configured to process those commands that are targeted to the server. In one embodiment, the server-side command manager is configured to determine, based upon the properties associated with the respective commands, which entity to handle the method specified in the respective command. As described above, a command can be mapped to a user interface item (also called a command item, control or control item herein) such as a toolbar item, a menu item, a keyboard accelerator item (also called keyboard shortcut or shortcut key), etc. In general, the user's selection or initiation of a command (e.g., by clicking on a toolbar icon, menu item or by pressing a keyboard combination, etc.) is translated into a call to an invoke method which may reside in a service on the browser or the server, or in the corresponding classes in the browser application or server infrastructure (e.g., applet or business component classes, etc.). As described above, a toolbar icon, menu item, or a keyboard accelerator item is configured to target a method, a method handler (from which it may be automatically retargeted if not found), and optionally a service.

Figure 36:
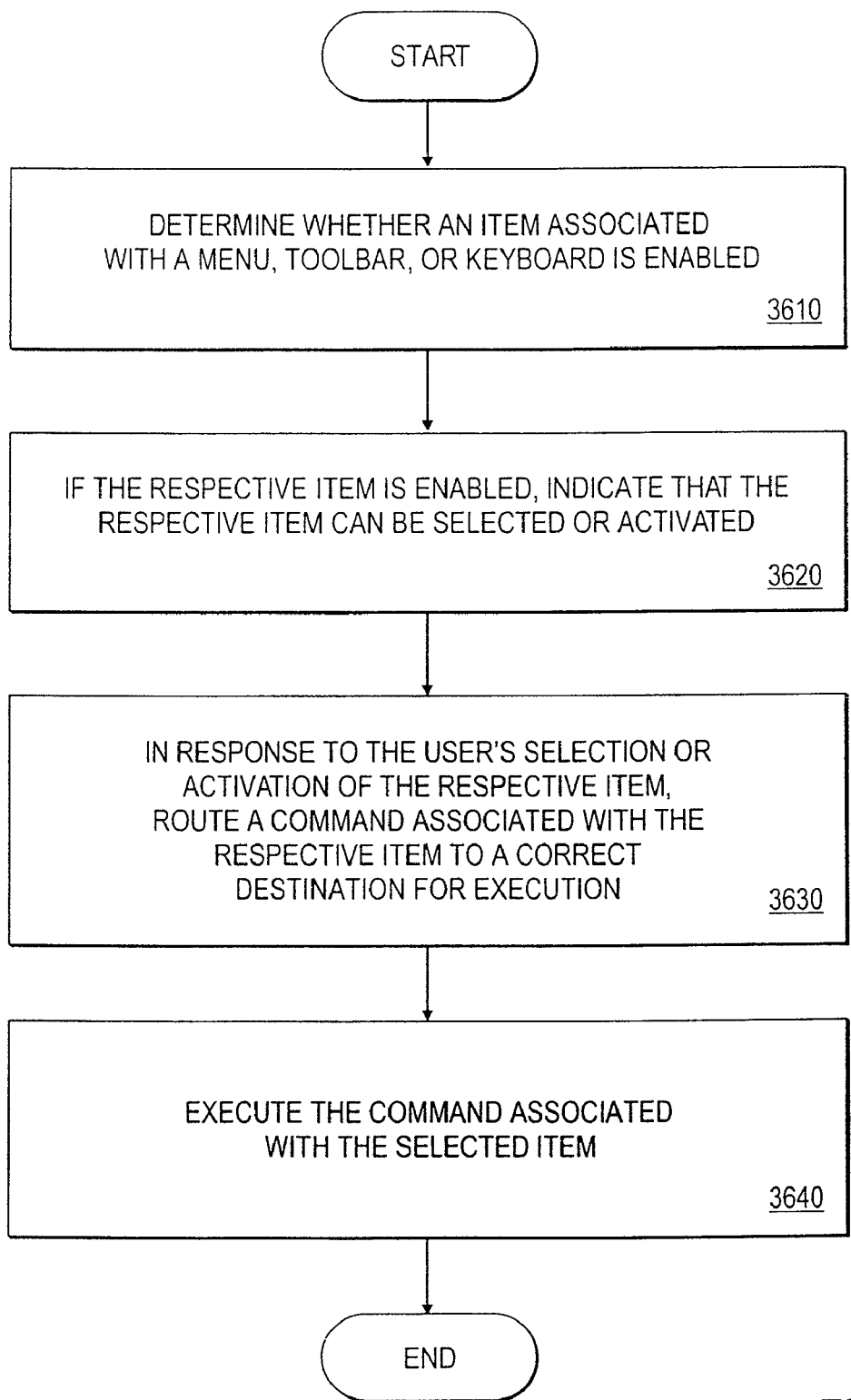
FIG. 36 shows a flow diagram of a process in accordance with one embodiment of the present invention.

FIG. 36 shows a flow diagram of a process 3600 in accordance with one embodiment of the present invention. At block 3610, it is determined whether a command item associated with a menu, toolbar, or keyboard is enabled (e.g., whether the method associated with the command item can be invoked). As described above, menu items (both application-level and applet-level) and toolbar items can be enabled or disabled at runtime by using the CanInvokeMethod mechanism as described above. In one embodiment, CanInvokeMethod is called for each item prior to displaying the menu or toolbar. In one embodiment, the CanInvokeMethod returns a value (e.g., FALSE) to indicate that the command item is not enabled (e.g., the method cannot be invoked) and another value (e.g., TRUE) to indicate that the command item is enabled (e.g., the method can be invoked). In one embodiment, if the respective command item is not enabled (e.g., CanInvokeMethod returns FALSE value), then the respective item is not accessible by the user (e.g., the menu or toolbar item is not displayed, or dimmed out, etc.). At block 3620, if the respective item is enabled (e.g., CanInvokeMethod returns TRUE value), then indicate to the user that the respective item can be selected (e.g., displaying the menu item or toolbar item to the user). At block 3630, in response to the user's selection of the respective command item (e.g., user clicking on the menu or toolbar item or pressing the shortcut key, etc.), the command associated with the respective item is routed to an appropriate destination (e.g., the method handler) for processing, based upon the target and service properties and whether the calling entity is applet-level or application-level, as described above. At block 3640, the command associated with the selected command item is processed.

Figure 37:
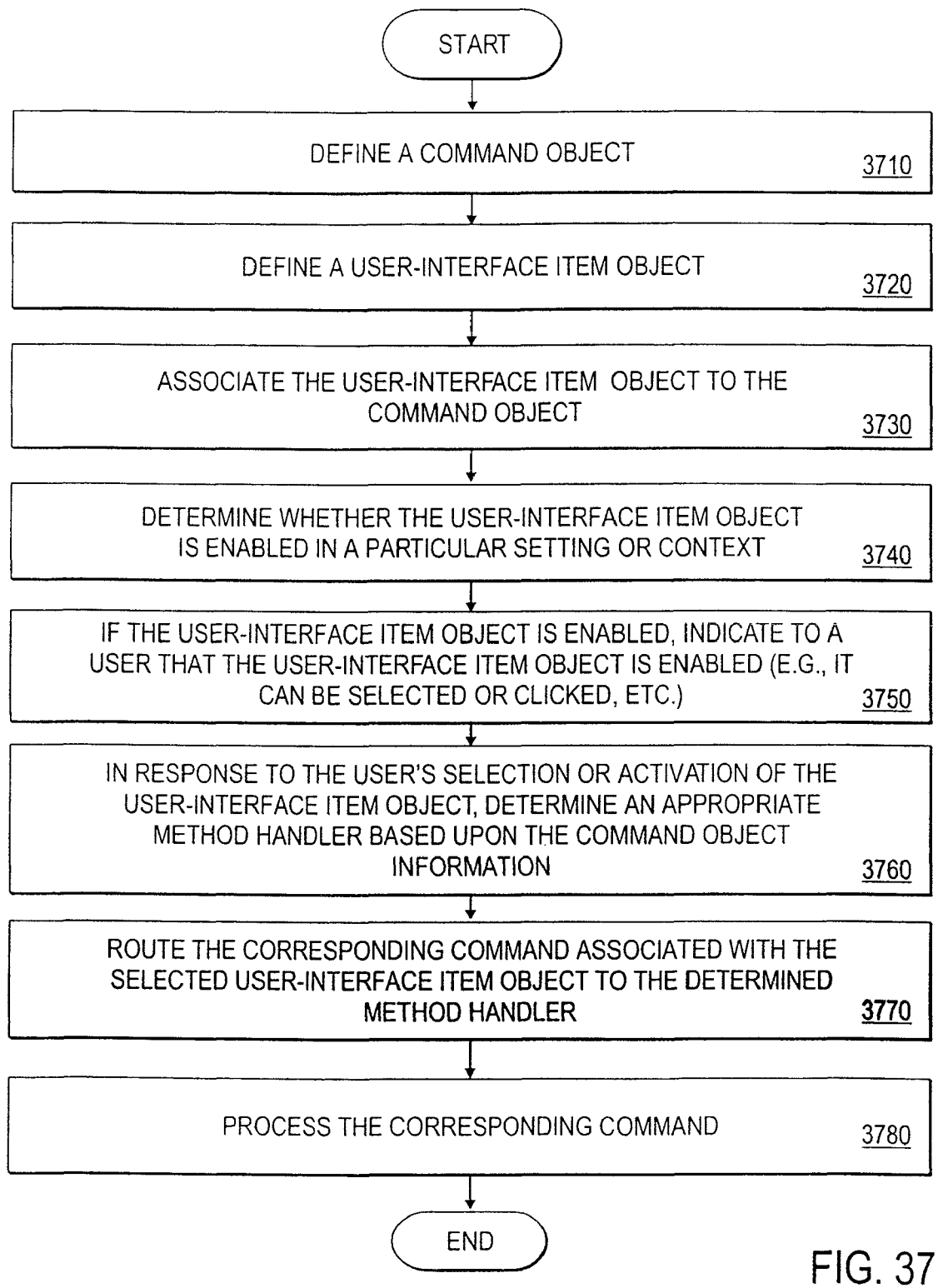
FIG. 37 is a flow diagram of a process according to one embodiment of the present invention.

FIG. 37 is a flow diagram of a process 3700 according to one embodiment of the present invention. At block 3710, a command object is defined as described above. At block 3720, a user interface item object (e.g., a toolbar item object, a menu item object, a keyboard accelerator item object, etc.) is defined as described above. At block 3730, a user interface item object is associated to a corresponding command object. In one embodiment, at run time, the server prepares commands based on the command object definitions. In one embodiment, the various commands are then attached to their corresponding command items (e.g., menu items, toolbar items, keyboard accelerator items, etc.). In one embodiment, a command is prepared as a string containing the properties that are necessary for the processing of the command when selected or initiated by the user (e.g., target property, method property, business service property, etc.). At block 3740, it is determined whether the user-interface item (e.g., menu item, toolbar item, etc.) is enabled, as described above. At block

3750, if the item is enabled, indicate to the user that it can be selected. At block 3760, in response to the user's selection of the command item, determine an appropriate entity (e.g., method handler) to process the selected command based on various factors as described above including the target property and the business service property associated with the selected command and whether the calling entity is applet-level or application-level. At block 3770, the selected command is routed to the determined target (the method handler). At block 3780, the selected command is processed (e.g., invoke the specified method associated with the selected command).

Immediate Post-When-Change

Figure 38:
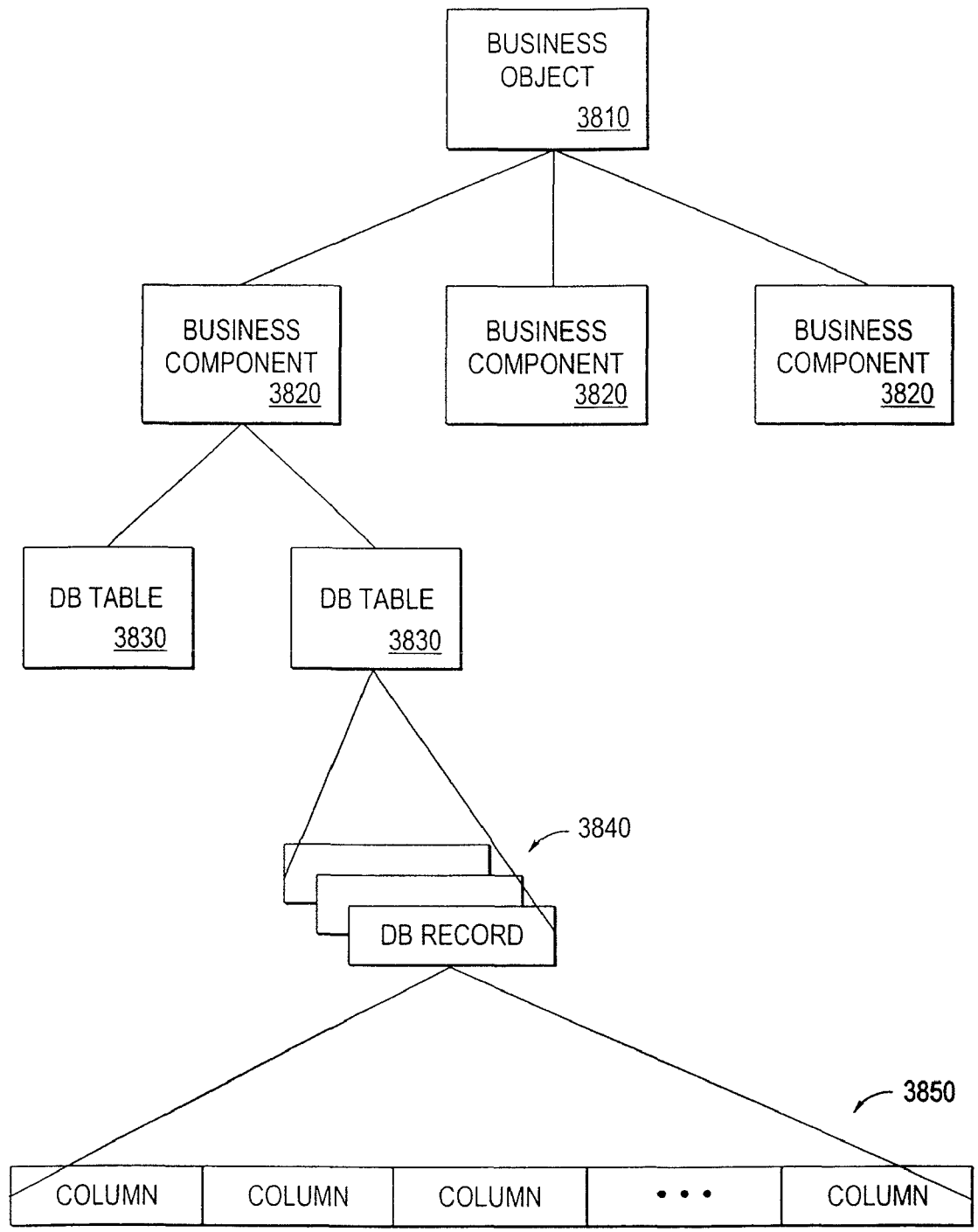
FIG. 38 shows a block diagram illustrating the relationship between various objects according to one embodiment of the present invention.

FIG. 38 shows a block diagram illustrating the relationship between various objects according to one embodiment of the present invention. As shown in FIG. 38, a business object can be defined and configured as a logical grouping or mapping of various business components (e.g., a business object typically groups one or more business components into a logical unit of information). As described herein and shown in FIG. 38, a business component can be defined and configured as a logical grouping or mapping of underlying tables (e.g., database tables). In other words, a business component typically provides a layer of wrapping over underlying tables. Each underlying table (e.g., database table) typically contains a number of records or rows. Each record or row may include a plurality of columns or fields.

Figure 39:
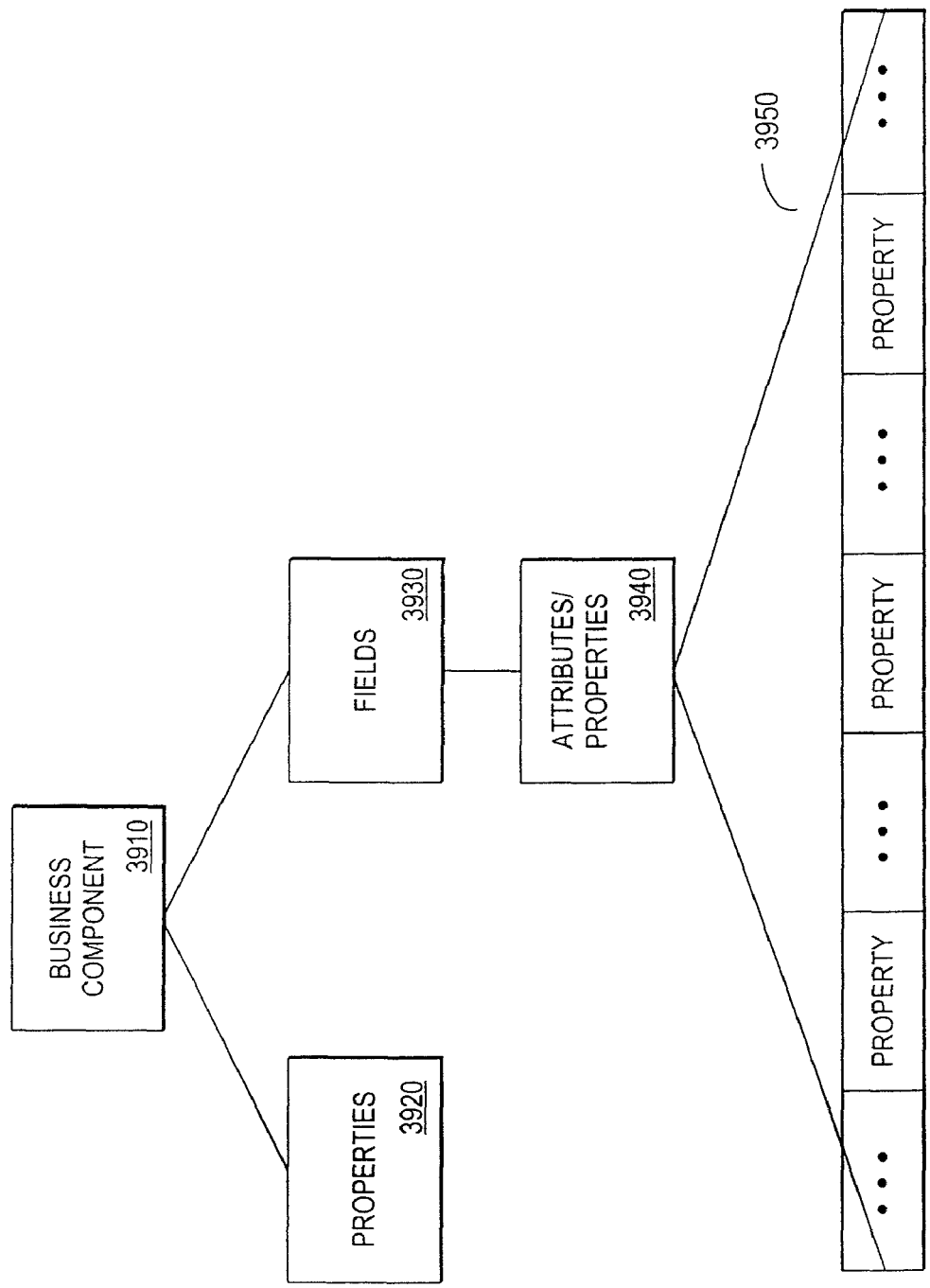
FIG. 39 shows a block diagram of a logical structure of a business component in accordance with one embodiment of the present invention.

FIG. 39 shows a block diagram of a logical structure of a business component in accordance with one embodiment of the present invention. As shown in FIG. 39, a business component may include a set of properties that pertain to the respective business component (e.g., NAME which specifies the logical name of the business component, TABLE NAME which specifies the actual name of the underlying table, etc.). A business component also includes a set of fields each of which may have a set of associated properties. For example, a field may include a NAME property which identifies the name of the field, a COLUMN NAME which identifies the column of the underlying table to which the respective field is mapped, etc.

Typically, the value of a particular field may depend upon the value of another field. The dependency or inter-dependency between field values may exist in various ways. For example, assuming that a user wishes to enter an address which typically includes various fields, the value that the user enters for a particular field (e.g., State field) may determine the set of valid values that the user can enter in another field (e.g., City field). As another example, a particular field may become disabled or read-only when the value in another field changes. Furthermore, there may be cases where the type of user-interface control or format used to show a particular field may change based on the value entered in another field. For example, the user interface control for a particular field may be configured to change from a text box in which a user can enter any value into a combo-box where the user has to choose from a list of existing values.

Conventionally, in a client server environment, the client waits for the user to finish entering a set of changes, post the changes to the server for processing and then a shows the user another page with the dependent information between field values. For example, in a convention application or system, the client waits for the user to finish entering all the address information such as STATE, CITY, etc. and then posts all the changes to the server. The server will then send a new page to the client for display to the user which may include the relevant dependent information between fields. This conventional method or conventional way of handling and processing dependency or inter-dependency between field values is not effective because changes due to the inter-dependency between field values are not seen by the user immediately, thus making the user interface environment much less interactive. For example, after the user has changed the value of a particular field (upon which the value and/or layout of another field depends), the user will not recognize or see the effect of the change until after all the changes have been posted to the server and a new page is displayed.

To solve the problem described above, according to one aspect of the present invention, a method is provided in which a change in value of a field upon which the values, format, or functionality of other fields depend will be immediately posted to the server for processing (also referred to as the immediate post-when-change feature or immediate post-when-change mechanism herein).

According to one embodiment of the present invention, the fields upon which the other field(s) depend are marked for immediate post-when-change in the repository. This information is therefore available as part of the meta-data. In one embodiment, the client side framework uses this information to decide when to send changes to field values to the server for processing. The server will then respond using the notification mechanism described above to send back dependent changes as a result of the changes processed by the server. For example, upon detecting that the value of a particular field has changed (this particular field is marked for immediate post-when-change), the client will immediately submit the value of this particular field and the values of other client-side fields that have changed to the server for processing. The server will then respond using the notification mechanism to send back the dependent changes for the client to take appropriate actions based on the dependent changes. For example, if the change of value of a first field causes the value and/or format of a second field to be changed, upon receiving the notifications from the server, the client will change the value and/or the format of the second field accordingly. In one embodiment, the logic to perform the immediate post-when-change process is implemented as part of the Javascript code running on the client side.

Figure 40:
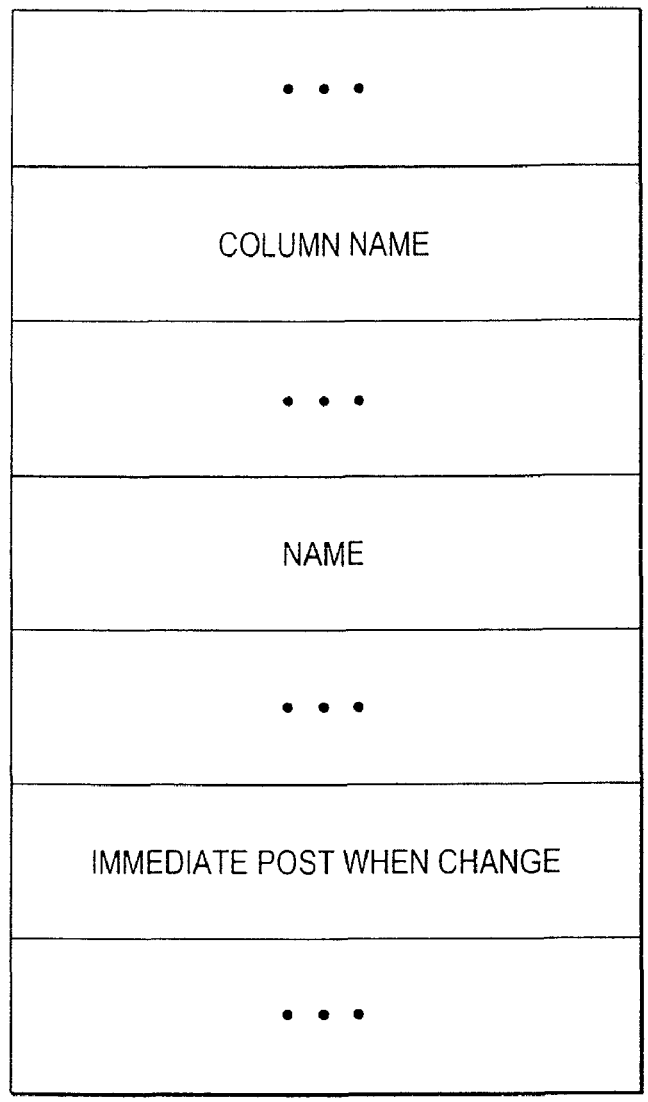
FIG. 40 shows some properties or attributes of a business component field in accordance with one embodiment of the present invention.

FIG. 40 shows some properties or attributes of a business component field in accordance with one embodiment of the present invention. In addition to the typical properties or attributes such as NAME, COLUMN NAME, etc., a business component field may also include a property or attribute that is used to mark the respective business component field for immediate post-when-change processing as described above. For explanation and illustration purposes, this property can be referred to as the IMMEDIATE POST-WHEN-CHANGE property. In one embodiment, this property can be set to one value (e.g., TRUE) to indicate that the corresponding business component field is marked for immediate post-when-change processing and set to another value (e.g., FALSE) otherwise. As described above, this information is used by the client side framework to decide when to send changes to field values to the server for processing.

Figure 41:
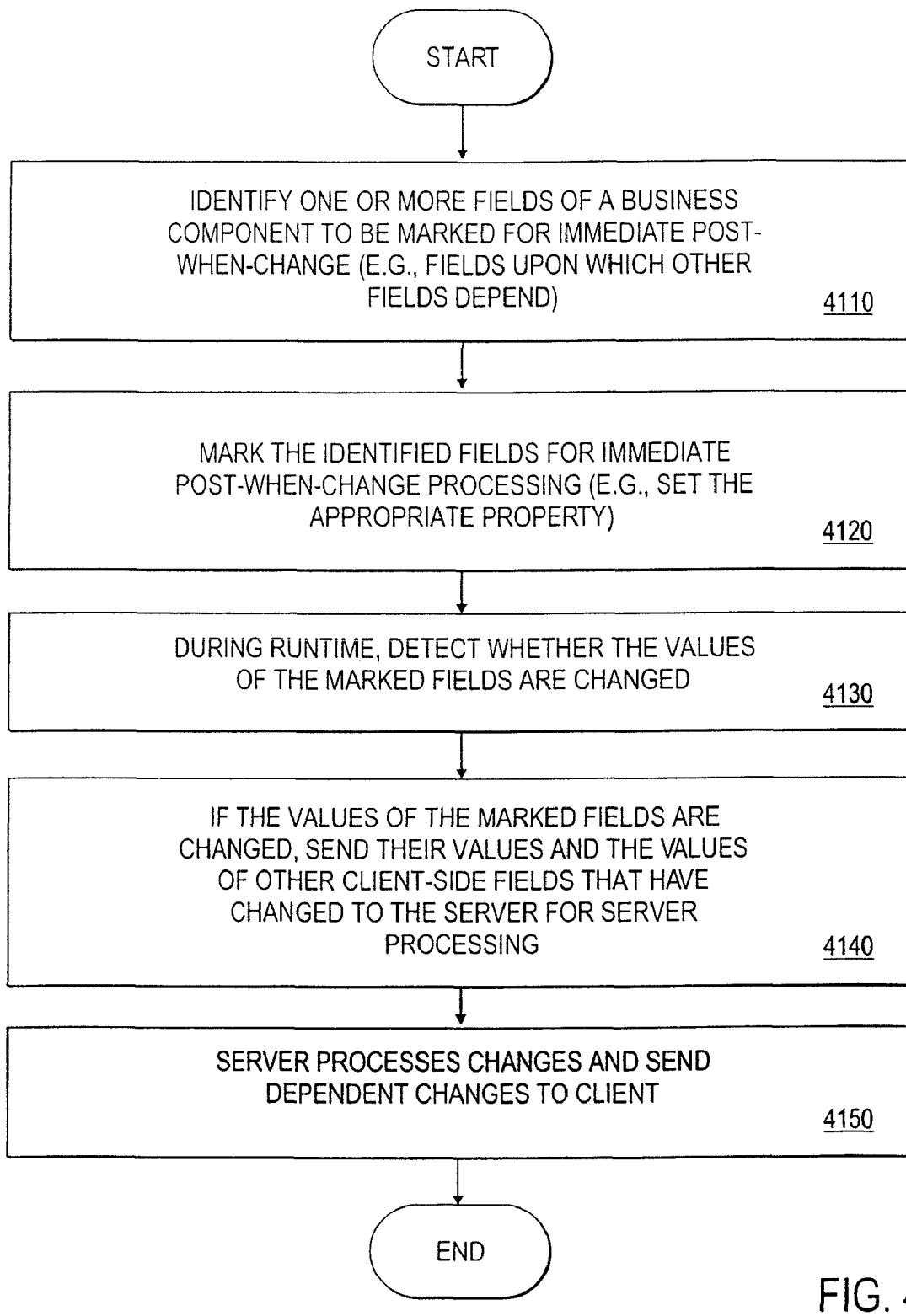
FIG. 41 shows a flow diagram of one embodiment of a process according to the teachings of the present invention.

FIG. 41 shows a flow diagram of one embodiment of a process according to the teachings of the present invention. At block 4110, one or more fields upon which other field(s) depend are identified. At block 4120, the identified fields are marked for immediate post-when-change processing. As described above, in one embodiment, the identified fields are marked in the repository (e.g., by setting the appropriate property of these fields to a specific value) and hence this information is available as part of the meta-data. At block 4130, during runtime, the client detects whether the values of the marked fields are changed. At block 4140, if the values of the marked fields have changed, the client sends their values and the values of other client-side fields that have changed to the server for processing. At block 4150, the server processes the changes and responds using the notification mechanism to send back the dependent changes to the client.

Busy State Manager

One of the problems experienced in a traditional HTML or web-based application is that once a client (e.g., the browser) sends a request to a server for processing, it will time out if the server does not respond within a certain period of time. This time out condition occurs in spite of the fact that certain requests may take a long time to process depending upon various factors such as the type of the request, the available resources on the server, and the number of requests being processed or waiting to be processed by the server, etc. For example, a client in a traditional web-based or HTML application may submit a request that involves a very time-consuming query operation in a large database. This request may not be finished before the time out condition occurs.

According to one embodiment of the present invention, a mechanism is provided so that when a client submits a request to a server that involves long-running or time-consuming operations on the server side, the server can inform the client accordingly using the notifications mechanism described above. Based upon the information provided by the server regarding the request, the client can take appropriate actions to inform a user of the status of the request (e.g., by displaying a progress bar showing how much of the task has been completed thus far, etc.). In one embodiment, the communications regarding the status and progress of the request can be managed as described in more details below.

Figure 42:
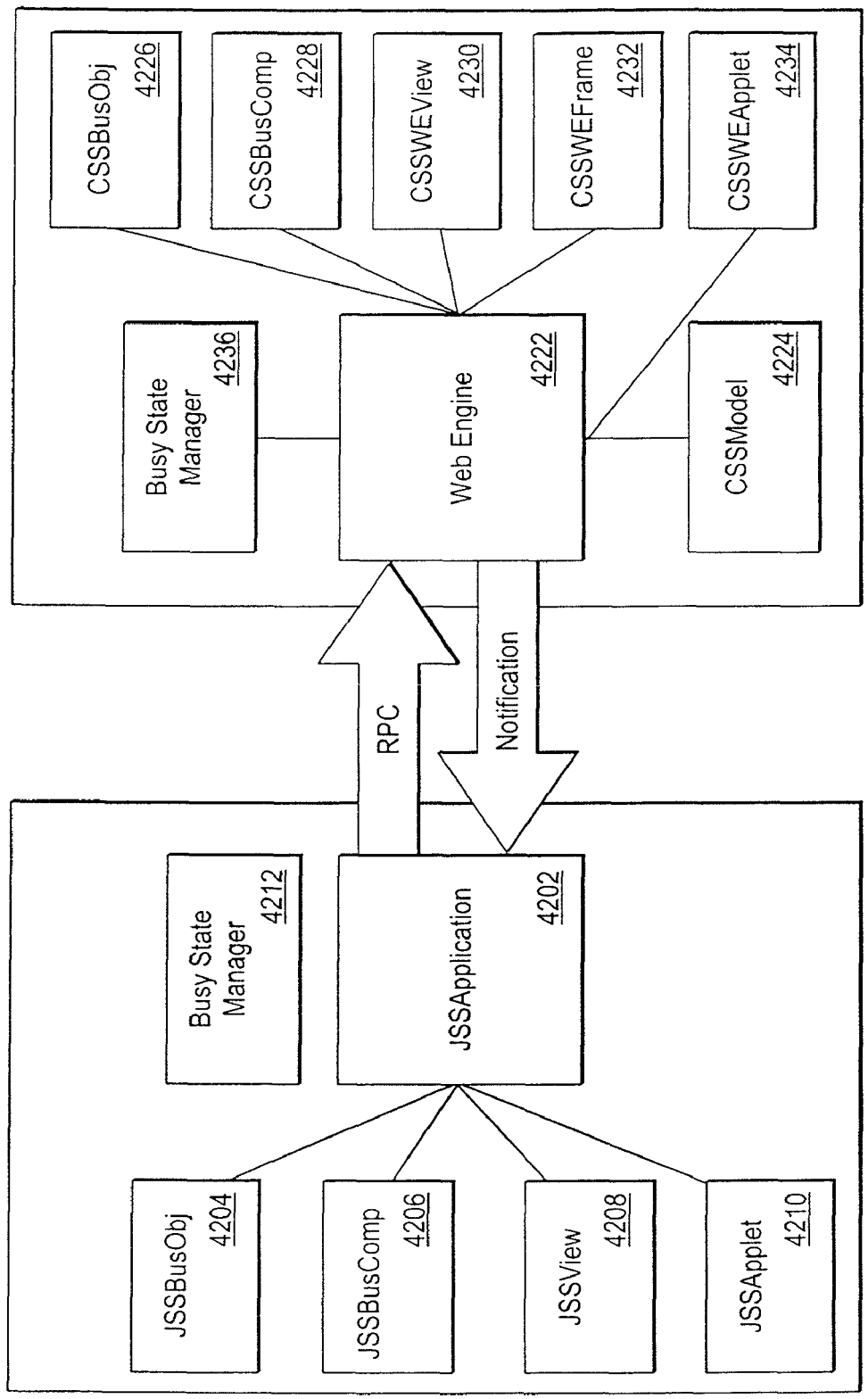
FIG. 42 shows a block diagram of one embodiment of a system configuration according to the teachings of the present invention.

FIG. 42 shows a block diagram of one embodiment of a system configuration according to the teachings of the present invention. As illustrated in FIG. 42, the client can include a component called a busy-sate manager that is configured to monitor and inform a user of the status and progress of a request submitted to the server, based upon information provided by the server (e.g., notifications provided by the server regarding the status and progress of the request processing). In one embodiment, the server can also include a busy-state manager on the server side that is configured to inform the client of the status and progress of the request received from the client. In one embodiment, the busy-state manager on the server side is configured to determine, upon receiving the request from the client, whether the request may involve long-running server operations or may take a long time to finish, based upon various factors. In one embodiment, these various factors may include the type of the request, the priority of the request, the resources available for request processing, the number of pending requests which may include requests that are being processed and requests that are waiting in a queue to be processed by the server, etc.

In one embodiment, upon determining that the request received from the client may take a long time to process (e.g., the request involves long-running server operations, etc.), the server will notify the client accordingly. In one embodiment, once the client is informed by the server that the request may take a long time to process, the client can inform the user that the request processing has started and lock the user interface during the time the request is being processed by the server. In one embodiment, the server will continue to inform the client of the progress of the request and the client can take appropriate actions to inform the user accordingly, until the request processing is finished. For example, upon receiving the progress information from the server via the notifications, the client can update a progress bar to show the user how much of the task has been completed at that point in time. In one embodiment, the user interface will continue to be locked until the request processing is completed.

Figure 43:
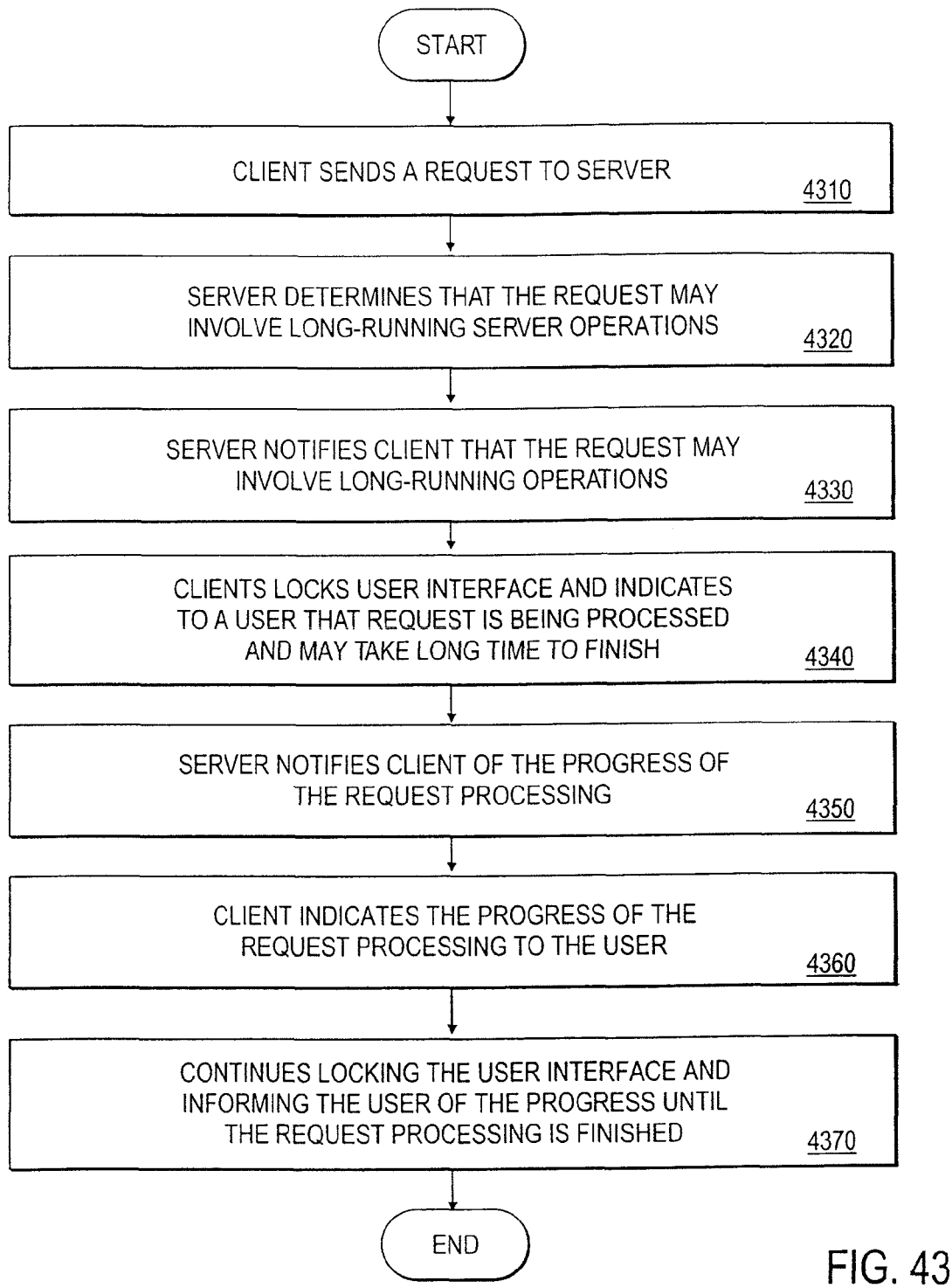
FIG. 43 is a flow diagram of a process in accordance with one embodiment of the present invention.

FIG. 43 is a flow diagram of a process 4300 in accordance with one embodiment of the present invention. At block 4310, the client sends a request to a server. At block 4320, the server determines that the request may take a long time to process (e.g., the request involves long-running server operations, etc.). At block 4330, the server notifies the client that the request may take a long time to finish. In one embodiment, the server communicates this information to the client using the notification mechanism described above. At block 4340, the client locks the user interface and informs the user that the request processing has started and may take a long time to finish. At block 4350, the server notifies the client of the progress the request processing. At block 4360, the client informs the user of the progress of the request processing (e.g., using a progress bar), based on the information provided by the server. At block 4370, the client continues to lock the user interface and inform the user of the progress of the request based on the progress information provided by the server, until the request processing is completed.

III. Caching

As stated above, objects on the browser and objects managed by the OM can be configured to reside and operate on one or multiple computing devices. As shown above, FIG. 6A illustrates an exemplary configuration 600 in which objects 502 on the browser and objects 504 managed by the OM reside and operate on multiple computing devices 602 and 604, including a client 602 and a server 604. FIG. 6B illustrates an exemplary configuration 650 in which objects 502 on the browser and objects 504 managed by the OM reside and operate on one computing device 652.

Figure 44:
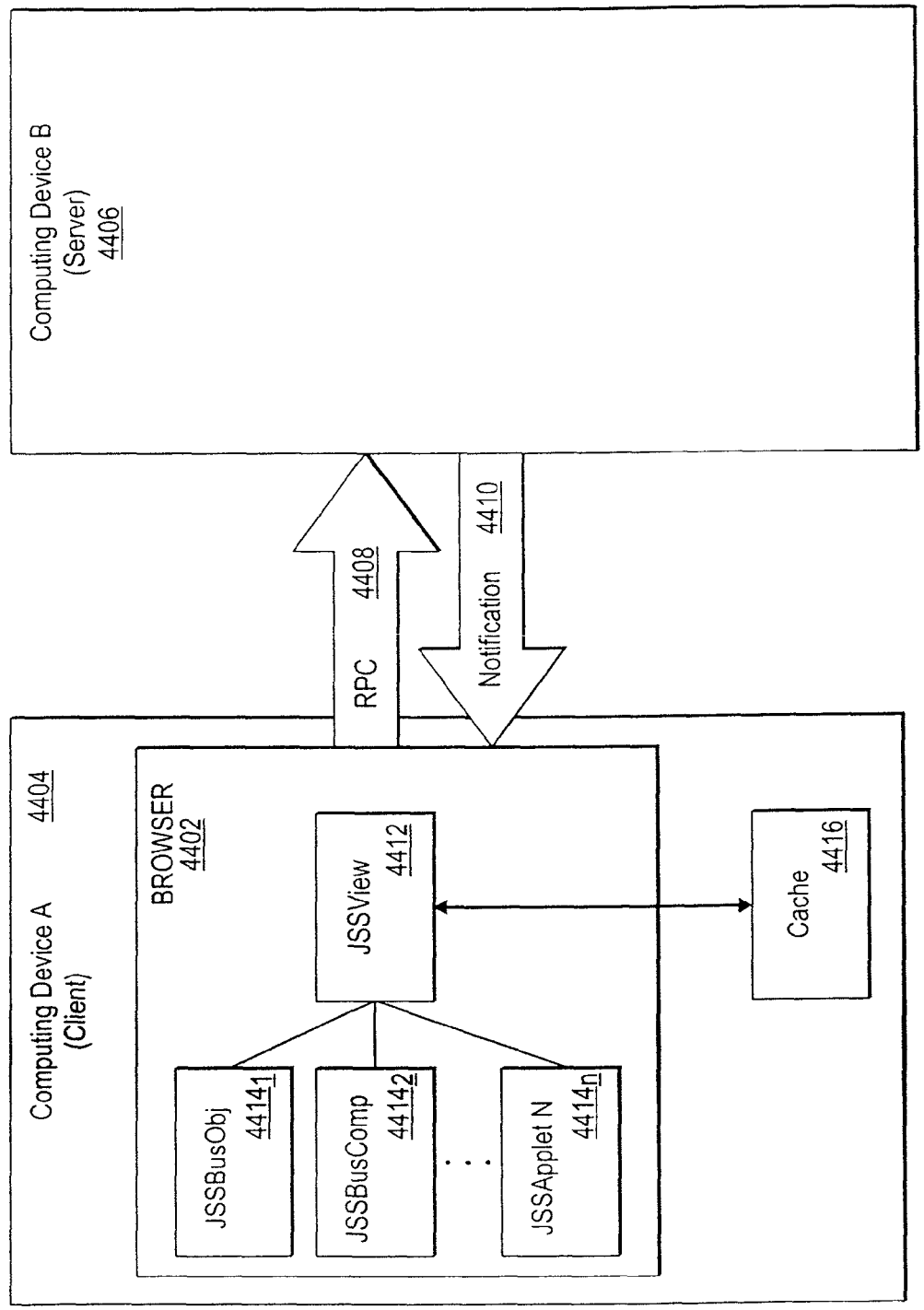
FIG. 44 is generally a partially block diagram of a frame or infrastructure operating on a multiple-device configuration similar to the configuration shown in FIG. 6A and described above in the text accompanying FIG. 6A.

FIG. 44 is generally a partially block diagram of a frame or infrastructure operating on a multiple-device configuration 4400 similar to the configuration 600 shown in FIG. 6A and described above in the text accompanying FIG. 6A. FIG. 44 shows a browser 4402 running on the client 4404. The browser 4402 communicates with the server 4406 using the RPC mechanism 4408 and the notification mechanism 4410, which have been described above in more details.

A view or JSSView object 4412 and a plurality of applets or JSSApplet objects 4414$_1$, 4414$_2$, . . . , 4414$_N$, where N is a positive integer are shown to be running on the browser 4402. The JSSView object 4412 generally represents a view. As stated above, a view is generally a display panel consisting of a particular arrangement of applets. As previously discussed, an applet is generally a visual application unit that appears on the screen as part of a view. Each applet or JSSApplet object 4414$_1$, 4414$_2$, . . . , 4414$_N$ represents an applet that is associated to the view represented by the view or JSSView object.

The client 4404 includes a cache 4416 to generally store views to improve performance. At times, the user can navigate or switch to new views causing the client 4404 to submit corresponding requests to navigate to new views to the server 4406. As previously discussed, when the client 4404 submits a request to navigate to a view to the server 4406, the server 4406 would send a response or notification containing the view layout that is devoid of data. Accordingly, a round trip to the server 4406 (including a request from the client 4404 to the server 4406 and a response or notification from the server 4406 to the client 4404) would typically be needed to retrieve the view layout and the view custom options from the server 4406. The view layout and the view custom options will be generally shown in FIG. 45 and generally described below in the text that accompanies FIG. 45. It should be noted that each round trip would take up valuable computing resources and would cause time delays. After sending the view layout and the view custom options to the client 4404, the server 4406 would then send a response containing data to populate the view.

To improve performance, one or more view layouts and view custom options can be stored in the cache. Once its layout and customer options are stored in the cache, the view can generally be referred to as a cached view. If the user navigates to a cached view, the client 4404 can retrieve the view layout and view custom options from the cache instead of the server. By retrieving the view layout and the view custom options from the cache, a round trip to the server 4406 can be eliminated, thereby improve system performance.

Figure 45:
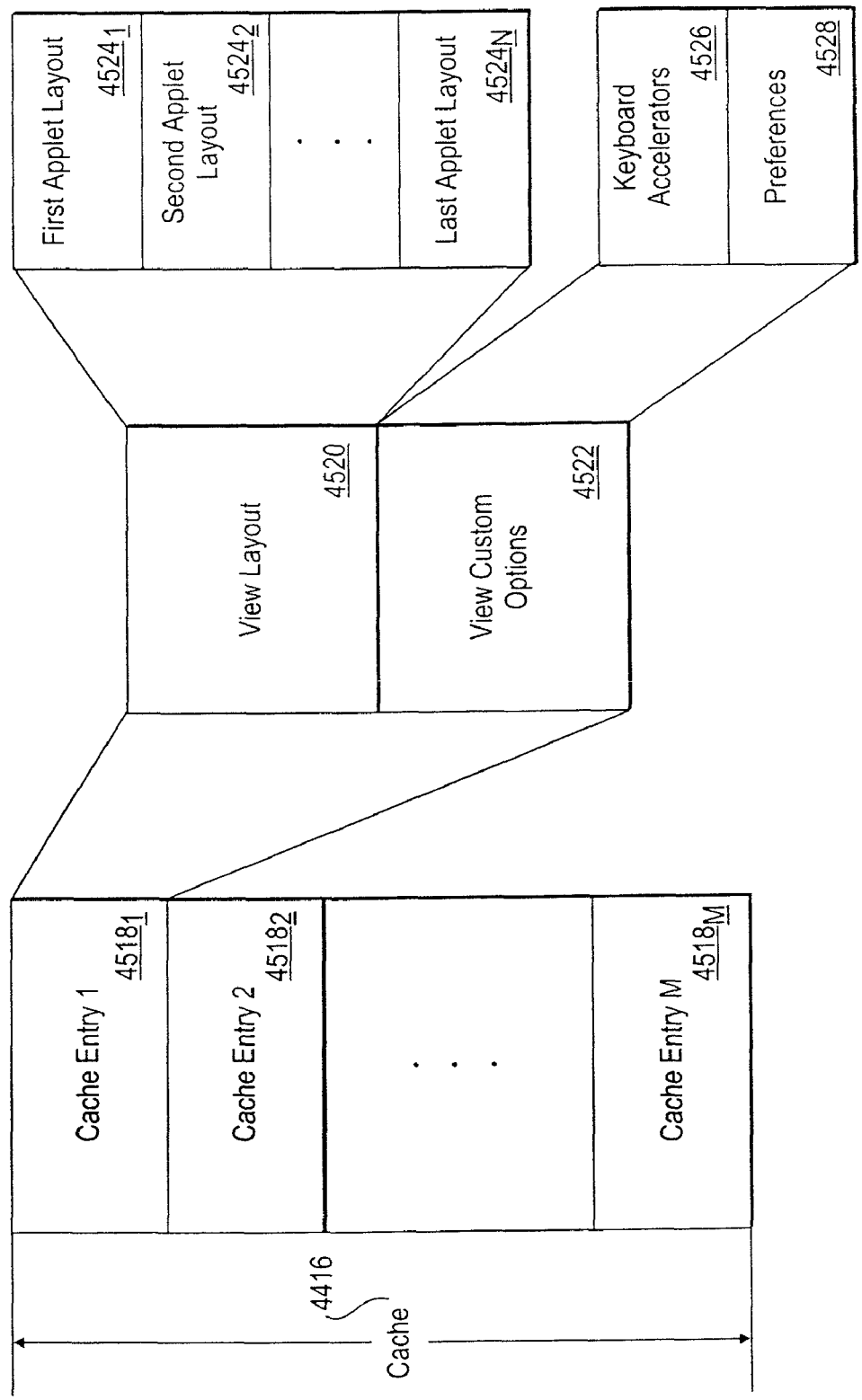
FIG. 45 generally shows the structure of an exemplary cache according with one embodiment of the present invention.

FIG. 45 generally shows the structure of an exemplary cache 4416 in accordance with one embodiment of the present invention. As shown in the figure, the cache 4416 can include a plurality of cache entries $4518_1, 4518_2, \ldots, 4518_M$, where M is a positive integer. In one embodiment, each cache entry $4518_1, 4518_2, \ldots, 4518_M$ can be designed to store a layout 4520 of the view. As stated above, a view is generally a display panel consisting of a particular arrangement of applets. Accordingly, the layout of the view can generally include the layouts $4524_1, 4524_2, \ldots, 4524_N$ of the applets associated with the view.

In one embodiment, each cache entry $4518_1, 4518_2, \ldots, 4518_M$ can also be designed to customized options 4522 associated with the view. In one embodiment, the view customized options 4522 can include keyboard accelerators 4526 and preferences 4528. A keyboard accelerator 4526 is generally a sequence of keys or keystrokes that is mapped to a command object. An exemplary command object is shown and generally described above. Preferences 4528 are generally either default or user-selected display options. Exemplary preferences can include font, font size, font colors, width of columns and rows, etc.

Figure 46:
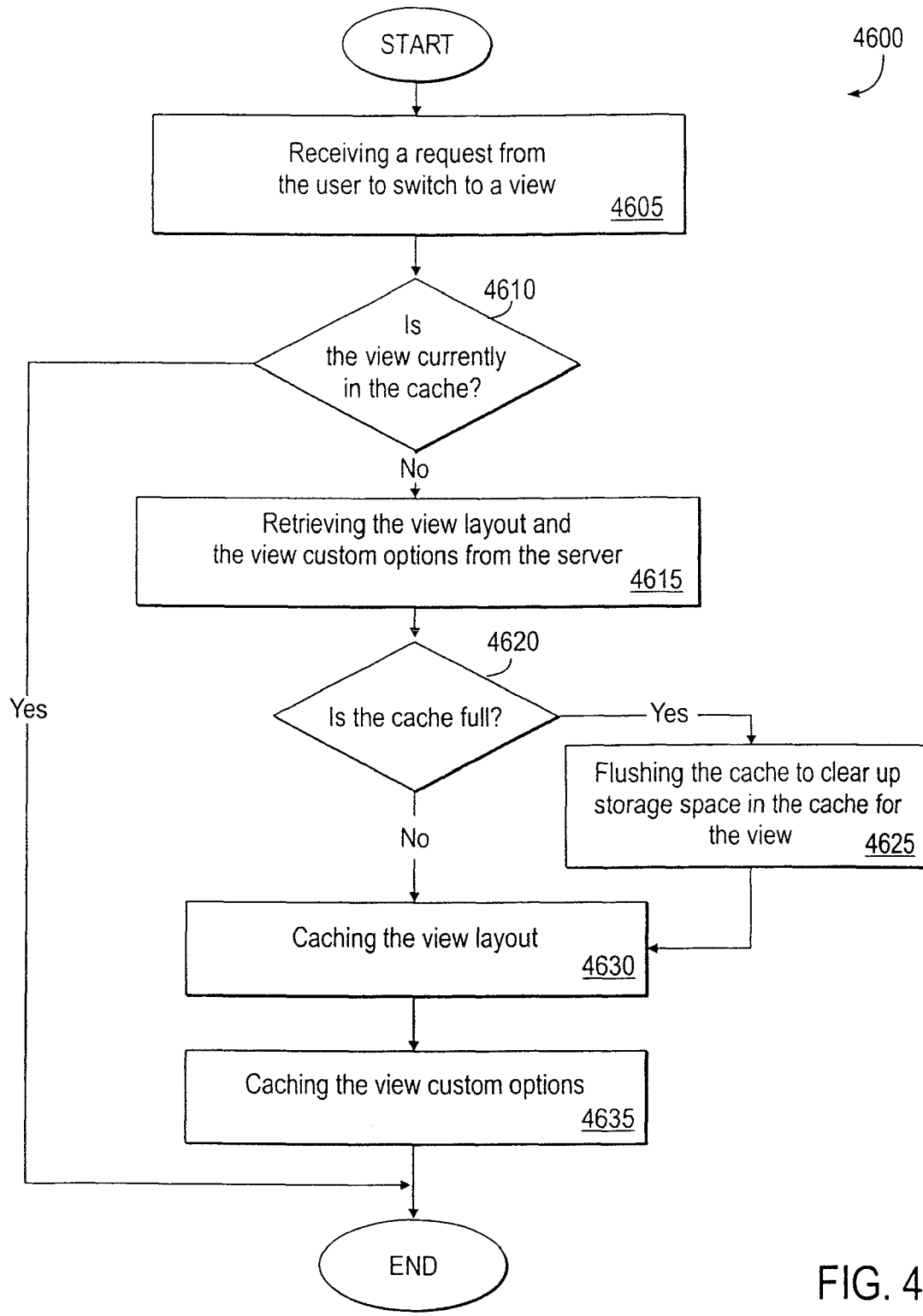
FIG. 46 generally outlines an exemplary process of caching a view according with one embodiment of the present invention.

FIG. 46 generally outlines an exemplary process 4600 of caching a view. In block 4605, the client receives a request from the user to switch to a view. The client determines whether the view is currently saved in the cache (block 4610). If the view is currently not saved in the cache, the client retrieves the view layout and the view custom options from the server (block 4615). The view layout and the view custom options are shown in FIG. 45 and described above in the text accompanying the figure. In block 4620, the client determines whether the cache is full. If the cache still has storage space available, the client proceeds with caching the view. If the cache is full, the client flushes the cache to clear up storage space in the cache for the view (block 4625), then proceeds with caching the view. The caching of the view can include caching the view layout (block 4630). The caching of the view can further include caching the view custom options (block 4635).

Figure 47:
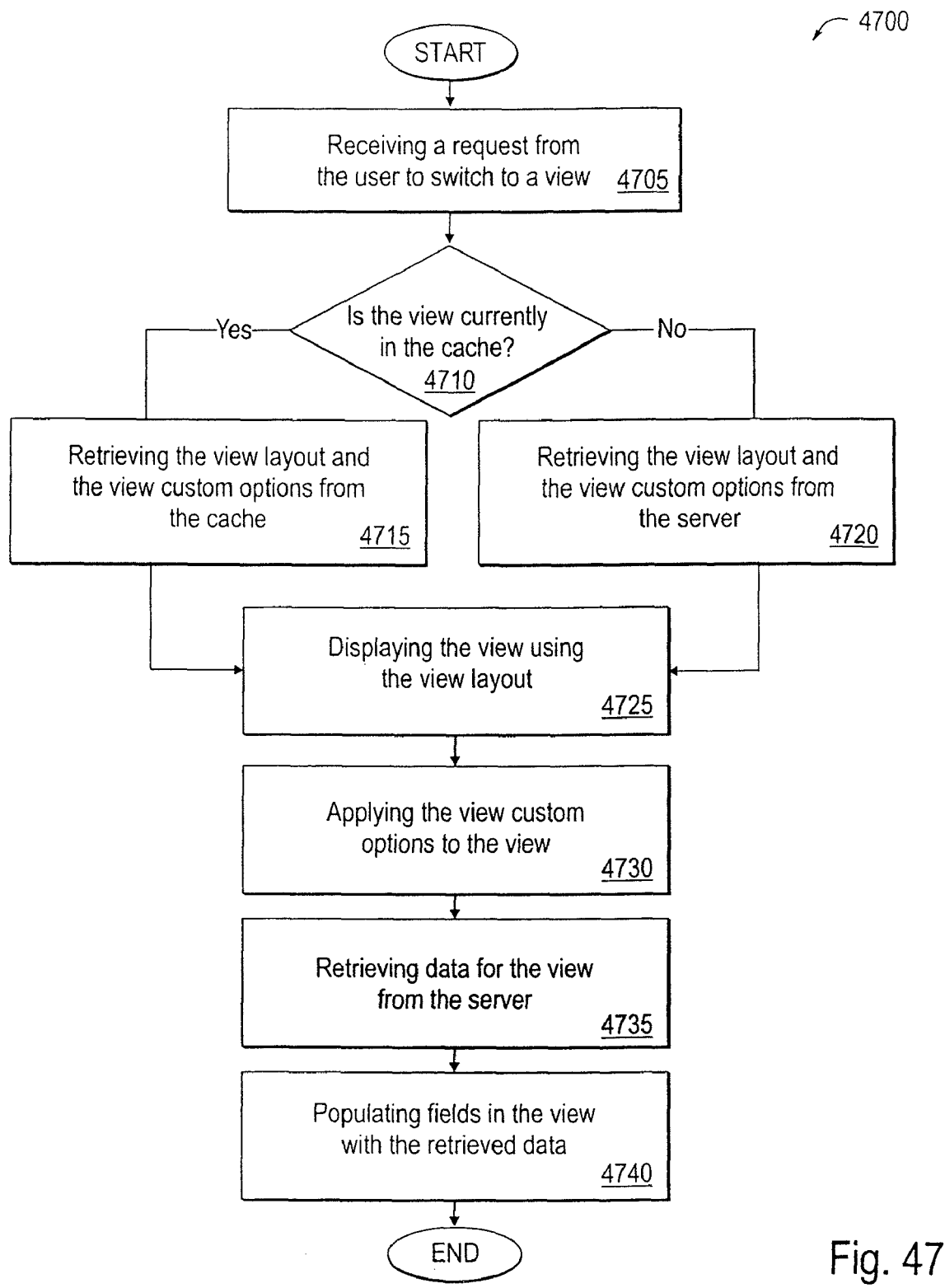
FIG. 47 generally outlines an exemplary process of switching to a view according with one embodiment of the present invention.

FIG. 47 generally outlines an exemplary process 4700 of switching to a view. In block 4705, the client receives a request from the user to switch to a view. The client determines whether the view is currently saved in the cache (block 4710). If the view is currently not saved in the cache, the client retrieves the view layout and the view custom options from the server (block 4715). It should be noted that the view layout and the view custom options are shown in FIG. 45 and generally described above in the text accompanying the figure.

If the view is currently saved in the cache, the client retrieves the view layout and the view custom options from the cache (block 4720). It should be noted that the client would save a round trip to the server by retrieving the view layout and the view custom options from the cache, thereby improving system performance. After retrieving the view layout and the view custom options, the client displays the view using the view layout (block 4725) and applies the view custom options to the view (4730). After displaying the view, the client retrieves data for the view from the server (block 4735). After receiving the data from the server, the client populates fields in the view with the retrieved data (block 4740).

It should be noted that functional components, as shown above in the figures and described in the text accompanying the figures, could be implemented using software code segments. If the aforementioned functional components are implemented using software code segments, these code segments can be stored on a machine-readable medium, such as floppy disk, hard drive, CD-ROM, DVD, tape, memory, or any storage device that is accessible by a computing machine.

The invention has been described in conjunction with the preferred embodiment. It is evident that numerous alternatives, modifications, variations and uses will be apparent to those skilled in the art in light of the foregoing description.

What is claimed is:

1. A system, comprising:
   a set of server-side objects managed by an object manager on a server in a client-server environment;
   a set of browser-side objects running on a browser on a client in the client-server environment, wherein
      a browser-side object in the set of browser-side objects comprises a plurality of fields, and
      one or more of a value and a format of a first field in the plurality of fields depends on a second field in the plurality of fields;
   the client is configured to detect a change in the second field and, upon detecting said change, to submit the changed second field to the server using a remote procedure call, wherein
      the client performs said detecting in response to an identifier corresponding to the second field being tagged for submitting the second field to the server upon a change in the second field, and
      with the changed second field, the client further submits to the server changes to any other fields not previously submitted; and
   a data transmission mechanism configured to facilitate transmission of a notification from the server to the client, wherein
      the notification comprises a message comprising information instructing the client as to how to change the first field in response to the changed second field, and
      the client is configured to apply the change to the first field of the browser-side object upon receiving the notification from the server.

2. The system of claim 1, wherein the notification is transmitted from server-side objects to browser-side objects to update data in browser-side objects.

3. The system of claim 1 further comprising:
   a notification gathering mechanism configured to gather the notification; and
   the data transmission mechanism is further configured to collectively transmit a set of gathered notifications to the browser-side objects.

4. The system of claim 3, wherein the set of gathered notifications includes a start notification of the set of notifications and an end notification of the set of notifications.

5. The system of claim 1, wherein the notification comprises a generic notification, the generic notification including a parameter providing a name to distinguish one type of generic notification from another type of generic notification.

6. The system of claim 1, wherein:
the set of browser-side objects and the set of server-side objects are configured to reside and operate on a single computing device; and
the data transmission mechanism is configured to facilitate transmission of the notification between the server-side objects and the browser-side objects residing on the single computing device.

7. The system of claim 1, wherein:
the set of browser-side objects and the set of server-side objects are configured to reside and operate on multiple computing devices; and
the data transmission mechanism is configured to facilitate transmission of the notification between the server-side objects and the browser-side objects residing and operating on the multiple computing devices.

8. The system of claim 1 wherein the client is further configured to provide an indicator for said second field to indicate inter-dependence between said first and said second fields.

9. The system of claim 8 wherein said indicator is part of a meta-data for said browser-side object comprising said second field.

10. A method, comprising:
providing a set of server-side objects managed by an object manager on a server in a client-server environment;
loading a set of browser-side objects on a browser on a client in the client-sever environment, wherein
a browser-side object in the set of browser-side objects comprises a plurality of fields, and
one or more of a value and format of a first field in the plurality of fields depends on a second field in the plurality of fields;
detecting a change in the second field at the client and, upon detecting said change, submitting the changed second field to the server using a remote procedure call, wherein
the client performs said detecting in response to an identifier corresponding to the second field being tagged for submitting the second field to the server upon a change in the second field, and
with the changed second field, the client further submits to the server changes to any other fields not previously submitted;
facilitating transmission of a notification from the server to the client, wherein
the notification comprises a message comprising information instructing the client as to how to change the first field in response to the changed second field; and
applying the change to the first field of the browser-side object upon receiving the notification from said server at the client.

11. The method of claim 10, further comprising transmitting the notification from server-side objects to browser-side objects to update data in browser-side objects.

12. The method of claim 10, further comprising gathering a plurality of notifications and transmitting the gathered notifications collectively to the browser-side objects.

13. The method of claim 12, further comprising providing a start notification of the gathered plurality of notifications and an end notification of the gathered plurality of notifications.

14. The method of claim 10, further comprising:
providing a generic notification including a parameter providing a name to distinguish one type of generic notification from another type of generic notification.

15. The method of claim 10, further comprising:
configuring the set of browser-side objects and the set of server-side objects to reside and operate on a single computing device; and
configuring a data transmission mechanism to facilitate transmission of the notification between the server-side objects and the browser-side objects residing on the single computing device.

16. The method of claim 10, further comprising:
configuring the set of browser-side objects and the set of server-side objects to reside and operate on multiple computing devices; and
configuring a data transmission mechanism to facilitate transmission of the notification between the server-side objects and the browser-side objects residing and operating on the multiple computing devices.

17. The method of claim 10 wherein the client is further configured to provide an indicator for said second field as part of a meta-data for said browser-side object comprising said second field, wherein said indicator is configured to indicate inter-dependence between said first and said second fields.

18. A machine-readable medium comprising instructions which, when executed by a machine, cause the machine to perform operations comprising:
providing a set of server-side objects managed by an object manager on a server in a client-server environment;
loading a set of browser-side objects on a browser on a client in the client-server environment, wherein
a browser-side object in the set of browser-side objects comprises a plurality of fields, and
one or more of a value and format of a first field in the plurality of fields depends on a second field in the plurality of fields;
detecting a change in the second field at the client and, upon detecting said change, submitting the changed second field to the server using a remote procedure call, wherein
the client performs said detecting in response to an identifier corresponding to the second field being tagged for submitting the second field to the server upon a change in the second field, and
with the changed second field, the client further submits to the server changes to any other fields not previously submitted;
facilitating transmission of a notification from the server to the client, wherein
the notification comprises a message comprising information instructing the client as to how to change the first field in response to the changed second field; and
applying the change to the first field of the browser-side object upon receiving the notification from said server at the client.

19. The machine-readable medium of claim 18, further comprising instructions which, when executed by the machine, cause the machine to perform operations comprising transmitting the notification from server-side objects to browser-side objects to update data in browser-side objects.

20. The machine-readable medium of claim 18, further comprising instructions which, when executed by the machine, cause the machine to perform operations comprising gathering a plurality of notifications and transmitting the gathered notifications collectively to the browser-side objects.

21. The machine-readable medium of claim 20, further comprising instructions which, when executed by the machine, cause the machine to perform operations comprising providing a start notification of the gathered plurality of notifications and an end notification of the gathered plurality of notifications.

22. The machine-readable medium of claim 18, further comprising instructions which, when executed by the machine, cause the machine to perform operations comprising:

providing a generic notification including a parameter providing a name to distinguish one type of generic notification from another type of generic notification.

23. The machine-readable medium of claim 18 further comprising instructions which, when executed by the machine, cause the machine to perform operations comprising:

further configuring said client to provide an indicator for said second field as part of a meta-data for said browser-side object comprising said second field, wherein said indicator is configured to indicator inter-dependence between said first and said second fields.

* * * * *

UNITED STATES PATENT AND TRADEMARK OFFICE
CERTIFICATE OF CORRECTION

| | |
|---|---|
| PATENT NO. | : 7,885,996 B2 |
| APPLICATION NO. | : 09/969798 |
| DATED | : February 8, 2011 |
| INVENTOR(S) | : Mukundan et al. |

It is certified that error appears in the above-identified patent and that said Letters Patent is hereby corrected as shown below:

On the title page:

On page 3, in column 2, under "Other Publications", line 49, delete "Ratcliff" and insert -- Hatcliff --, therefor.

In column 3, line 4, after "6A" insert -- ; --.

In column 12, line 45, after "communications" insert -- . --.

In column 12, line 62, delete "Oust" and insert -- (just --, therefor.

In column 15, line 46, after "unmarshalls" delete "490".

In column 17, line 8-9, delete "CSSSWEView" and insert -- CSSWEView --, therefor.

In column 17, line 19, after "notifications" insert -- . --.

In column 17, line 27, after "conditions" insert -- . --.

In column 20, line 31, delete "CopyErrormsg" and insert -- CopyErrorMsg --, therefor.

In column 20, line 33, delete "inputobject," and insert -- input object, --, therefor.

In column 20, line 36, delete ""% W"" and insert -- "% W" --, therefor.

In column 20, line 61, delete "SetErrorMog" and insert -- SetErrorMsg --, therefor.

In column 21, line 1, delete "(errCode, errmsg)" and insert -- (errCode,errMsg) --, therefor.

Signed and Sealed this
Twenty-seventh Day of September, 2011

David J. Kappos
*Director of the United States Patent and Trademark Office*

CERTIFICATE OF CORRECTION (continued)
U.S. Pat. No. 7,885,996 B2

In column 23, line 44, delete "Set WSFrame" and insert -- SetWSFrame --, therefor.

In column 24, line 44, delete "EnumPields" and insert -- EnumFields --, therefor.

In column 25, line 6, delete "GetFieldValue" and insert -- GetFieldValue --, therefor.

In column 27, line 4, delete "(nthyld,size)" and insert -- (ntfyld,size) --, therefor.

In column 27, line 61, delete "service?" and insert -- service. --, therefor.

In column 28, line 8, delete "whenthestring" and insert -- when the string --, therefor.

In column 28, line 11, delete "Invokemethod" and insert -- InvokeMethod --, therefor.

In column 28, line 28, after "set" insert -- . --.

In column 30, line 21, delete "HTUL" and insert -- HTML --, therefor.

In column 30, line 47, delete "SetparentApplet" and insert -- SetParentApplet --, therefor.

In column 35, line 63, delete "handier" and insert -- handler --, therefor.

In column 37, line 17, after "above" insert -- . --.

In column 38, line 57-58, delete "CSSSWEFrame." and insert -- CSSWEFrame. --, therefor.

In column 39, line 33, delete "CSSSWEFrame." and insert -- CSSWEFrame. --, therefor.

In column 41, line 60, after "then" delete "a".

In column 42, line 40, delete "Javascript" and insert -- JavaScript --, therefor.

In column 47, line 31, in Claim 10, delete "sever" and insert -- server --, therefor.

In column 50, line 12, in Claim 23, delete "indicator" and insert -- indicate --, therefor.